US009674827B2

(12) United States Patent
Liu et al.

(10) Patent No.: US 9,674,827 B2
(45) Date of Patent: Jun. 6, 2017

(54) CONTROL CHANNEL TRANSMISSION METHOD AND APPARATUS

(71) Applicant: Huawei Technologies Co., Ltd., Shenzhen (CN)

(72) Inventors: Jianqin Liu, Beijing (CN); Kunpeng Liu, Beijing (CN); Qiang Wu, Beijing (CN); Jianghua Liu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 173 days.

(21) Appl. No.: 14/610,879

(22) Filed: Jan. 30, 2015

(65) Prior Publication Data

US 2015/0156752 A1 Jun. 4, 2015

Related U.S. Application Data

(63) Continuation of application No. PCT/CN2012/082395, filed on Sep. 28, 2012.

(30) Foreign Application Priority Data

Aug. 1, 2012 (WO) ................ PCT/CN2012/079525

(51) Int. Cl.
*H04W 72/04* (2009.01)
*H04L 5/00* (2006.01)

(52) U.S. Cl.
CPC ......... *H04W 72/042* (2013.01); *H04L 5/0053* (2013.01); *H04L 5/0064* (2013.01); *H04W 72/0406* (2013.01)

(58) Field of Classification Search
CPC ............ H04W 72/042; H04W 72/0406; H04L 5/0053; H04L 5/0058; H04L 5/0064
See application file for complete search history.

(56) References Cited

U.S. PATENT DOCUMENTS

2010/0103881 A1 4/2010 Roh et al.
2013/0010724 A1 1/2013 Han et al.
(Continued)

FOREIGN PATENT DOCUMENTS

CN 102082600 A 6/2011
CN 102083225 A 6/2011
(Continued)

OTHER PUBLICATIONS

"3rd Generation Partnership Project; Technical Specification Group Radio Access Network; Evolved Universal Terrestrial Radio Access (E-UTRA); Physical Channels and Modulation (Release 10)," 3GPP TS 36.211, V10.5.0, Jun. 2012, 101 pages.
(Continued)

*Primary Examiner* — Paul H Masur
(74) *Attorney, Agent, or Firm* — Slater Matsil, LLP

(57) ABSTRACT

Embodiments of the present invention relate to the communications field and provide a control channel transmission method and apparatus. The method includes: grouping REs except a DMRS in each physical resource block pair of L determined physical resource block pairs used to transmit a control channel into N eREGs, and calculating the number of valid REs except other overheads in each eREG of the N eREGs; and then mapping each of the eCCEs onto M eREGs according to the number of valid REs included in each eREG of the N eREGs of each physical resource block pair, and sending the eCCE by using the resource elements included in the eREG.

17 Claims, 10 Drawing Sheets

(56) References Cited

U.S. PATENT DOCUMENTS

2013/0039284 A1* 2/2013 Marinier ................. H04L 5/001 370/329
2013/0107822 A1* 5/2013 Papasakellariou .... H04L 1/0045 370/329
2013/0286980 A1* 10/2013 Liao .................... H04W 72/042 370/329
2013/0301562 A1* 11/2013 Liao .................... H04W 72/042 370/329

FOREIGN PATENT DOCUMENTS

| | | | |
|---|---|---|---|
| CN | 102316495 | A | 1/2012 |
| CN | 102420685 | A | 4/2012 |
| EP | 2779774 | A1 | 9/2014 |
| RU | 2432687 | C2 | 10/2011 |
| WO | 2011099722 | A2 | 8/2011 |

OTHER PUBLICATIONS

NTT DOCOMO “Resource Mapping Scheme for E-PDCCH,” 3GPP TSG RAN WG1 Meeting #68bis, R1-121477, Mar. 26-30, 2012, 6 pages.
MediaTek, Inc., “eCCE Structure of ePDCCH,” 3GPP TSG-RAN WG1 #69, R1-122167, May 21-25, 2012, 6 pages.
NEC Group, “ePDCCH Search Space Design,” 3GPP TSG RAN WG1 Meeting #69, R1-122595, May 21-25, 2012, 10 pages.
ZTE: “Details of REG-Level Interleaving and REG Size for R-PDCCH,” TSG-RAN WG1 Meeting #62b, R1-105447, Oct. 11-15, 2010, 5 pages, Xi’an, China.

* cited by examiner

CONTROL CHANNEL TRANSMISSION METHOD AND APPARATUS

CROSS-REFERENCE TO RELATED APPLICATIONS

This application is a continuation of International Application No. PCT/CN2012/082395, filed on Sep. 28, 2012, which claims priority to PCT Patent Application No. PCT/CN2012/079525, filed on Aug. 1, 2012, both of which are hereby incorporated by reference in their entireties.

TECHNICAL FIELD

The present invention relates to the communications field, and in particular, to a control channel transmission method and apparatus.

BACKGROUND

In a radio communications system, such as a Long Term Evolution (Long Term Evolution, LTE) system or a Long Term Evolution Advanced (Long Term Evolution Advanced, LTE-A) system, an orthogonal frequency division multiple access (Orthogonal Frequency Division Multiple Access, OFDMA) manner is generally used as a downlink multiple access manner. Downlink resources of the system are divided into orthogonal frequency division multiplexing (Orthogonal Frequency Division Multiplexing, OFDM) symbols from a perspective of time, and are divided into subcarriers from a perspective of frequency.

In a communications system, a normal downlink subframe includes two slots (slot), and each slot has 7 or 6 OFDM symbols. A normal downlink subframe includes 14 OFDM symbols or 12 OFDM symbols in total. The LTE Release 8/9/10 standard also defines a size of a resource block (Resource Block, RB). A resource block includes 12 subcarriers on a frequency domain, and is half a subframe duration (that is, one slot) on a time domain, that is, includes 7 or 6 OFDM symbols. In one subframe, a pair of resource blocks of two slots is called a resource block pair (RB pair, RB pair). In actual sending, a resource block pair used on a physical resource is called a physical resource block pair (Physical RB pair, PRB pair). To facilitate calculation of the size of resources included in each elementary resource block pair, a resource element RE (Resource Element, resource element) is defined. A subcarrier on an OFDM symbol is called an RE, and an elementary resource block pair includes multiple RE groups: REG (Resource Element Group, RE group).

The mapping of all types of data borne in the subframe is organized by dividing physical time-frequency resources of the subframe into various physical channels. On the whole, various physical channels may be classified into two types: control channels and traffic channels. Correspondingly, data borne on a control channel may be called control data (which can be generally called control information), and data borne on a traffic channel may be called traffic data (which can be generally called data). An essential objective of sending a subframe is to transmit service data, and the control channel serves the purpose of assisting in transmission of the service data.

In an LTE system, when control channel transmission is performed, a complete physical downlink control channel (Physical Downlink Control Channel, PDCCH) may be formed by aggregating one or more control channel elements (Control Channel Element, CCE). The CCE is formed by multiple REGs.

Due to introductions of technologies such as multi-user multi-input multi-output (Multiple Input Multiple Output, MIMO) and coordinated multiple points (Coordinated Multiple Points, CoMP), a PDCCH transmitted based on a precoding manner is introduced, that is, an enhanced physical downlink control channel (enhanced Physical Downlink Control Channel, ePDCCH). The ePDCCH may be demodulated based on a UE-specific reference signal, that is, a demodulation reference signal (Demodulation Reference Signal, DMRS). Each ePDCCH may be formed by aggregating up to L logical elements similar to the CCE, that is, enhanced control channel elements (enhanced Control Channel Element, eCCE). One eCCE is mapped onto M enhanced resource element groups (enhanced Resource Element Group, eREG) similar to the REGs.

It is assumed that an elementary resource block pair includes N eREGs, L eCCEs are mapped onto the N eREGs, and each eCCE is mapped onto M eREGs. Therefore, the method for mapping the L eCCEs onto the N eREGs in the prior art is: Fixedly, the first M eREGs of the N numbered eREGs correspond to an eCCE, and similarly, the next M continuous eREGs correspond to another eCCE, and finally L eCCEs are formed.

In fact, when the ePDCCH is mapped onto the eREG corresponding to each eCCE, because the number of valid resource elements varies between the eREGs after deduction of overhead such as a CRS (Common Reference Signal, common reference signal), a PDCCH (Physical Downlink Control Channel, physical downlink control channel), a PRS (Positioning Reference Signal, positioning reference signal), a PBCH (Physical Broadcast Channel, physical broadcast channel), and a PSS (Primary Synchronization Signal, primary synchronization signal) or an SSS (Secondary Synchronization Signal, secondary synchronization signal), the actual size of the M eREGs corresponding to one eCCE is imbalanced, which leads to imbalanced performance of demodulating each eCCE, and increases implementation complexity of a scheduler.

SUMMARY

Embodiments of the present invention provide a control channel transmission method and apparatus, which can ensure a balance between actual sizes of eCCEs mapped from control channels, further ensure a performance balance when demodulating each eCCE, and reduce implementation complexity of a scheduler.

According to a first aspect, an embodiment of the present invention provides a control channel transmission method, including:

determining L physical resource block pairs that are used to transmit a control channel, where L is an integer greater than 0, and the control channel is formed by at least one eCCE;

grouping resource elements except a demodulation reference signal DMRS in each physical resource block pair of the L physical resource block pairs into N eREGs, and calculating the number of valid resource elements except other overheads in each eREG of the N eREGs in each of the physical resource block pairs, where N is an integer greater than 0, and the other overheads include at least one of the following: a common reference signal CRS, a physical downlink control channel PDCCH, a physical broadcast channel PBCH, a positioning reference signal PRS, a primary synchronization signal PSS, and a secondary synchronization signal SSS;

mapping each of the eCCEs onto M eREGs according to the number of valid resource elements included in each eREG of the N eREGs, where M is an integer greater than 0; and sending the eCCE by using the resource elements included in the eREG.

In a first possible implementation manner, the mapping each of the eCCEs onto M eREGs according to the number of valid resource elements included in each eREG of the N eREGs includes:

grouping N eREGs in each of the physical resource block pairs into a first eREG group and a second eREG group according to the number of valid resource elements included in the eREG, and mapping each eCCE onto M eREGs of the first eREG group and the second eREG group, where: in the M eREGs mapped from each eCCE, the first M/2 eREGs of the M eREGs are in the first eREG group, the number of valid resource elements included in each eREG of the first M/2 eREGs is a different value, the last M/2 eREGs of the M eREGs are in the second eREG group, and the number of valid resource elements included in each eREG of the last M/2 eREGs is a different value.

In a second possible implementation manner, the mapping each of the eCCEs onto M eREGs according to the number of valid resource elements included in each eREG of the N eREGs includes:

numbering the N eREGs in each of the physical resource block pairs as 0, 1, 2, . . . , N−1, and using $S^i$ to denote a set of eREGs in the N eREGs, where the number of valid resource elements included in each eREG in the set is $D^i$ (i=1, 2, . . . , t), $D^1<D^2< \ldots <D^t$, and t is an integer greater than 0; selecting one eREG respectively from each of the sets $S^1$, $S^t$, $S^2$, $S^{t-1}$ . . . sequentially until M eREGs are selected in total, and mapping one eCCE in the at least one eCCE onto M eREGs; and removing the selected eREGs from corresponding sets, reselecting M eREGs, and mapping another eCCE in the at least one eCCE onto the reselected M eREGs until all the N eREGs of the physical resource block pair are mapped onto.

In a third possible implementation manner, the mapping each of the eCCEs onto M eREGs according to the number of valid resource elements included in each eREG of the N eREGs includes:

numbering the N eREGs in each of the physical resource block pairs as 0, 1, 2, . . . , N−1, and using $S^i$ to denote a set of eREGs in the N eREGs, where the number of valid resource elements included in each eREG in the set is $D^i$ (i=1, 2, . . . , t), $D^1<D^2< \ldots <D^t$, and t is an integer greater than 0; and sorting the $S^i$ in ascending order of $D^i$ in the $S^i$ into $S^1$, $S^2$, . . . , $S^t$, where the eREGs in the set $S^i$ are sorted in ascending order of sequence numbers of the eREGs;

grouping the sorted N eREGs into p groups by putting every M/2 eREGs into one group, where the $k^{th}$ group includes a $((k-1)*M/2+1)^{th}$ eREG, a $((k-1)*M/2+2)^{th}$ eREG, . . . , and a $(k*M/2)^{th}$ eREG in a sorted sequence, where k=0, 1, . . . , p; and mapping the eCCEs onto the eREGs included in the $x^{th}$ group and the $(p-x)^{th}$ group, where x is any value in 0, 1, . . . , p.

In a fourth possible implementation manner, the mapping each of the eCCEs onto M eREGs according to the number of valid resource elements included in each eREG of the N eREGs includes:

step 21: numbering the N eREGs in each of the physical resource block pairs as 0, 1, 2, . . . , N−1, using $S^i$ to denote a set of eREGs in the N eREGs, where the number of valid resource elements included in each eREG in the set is $D^i$ (i=1, 2, . . . , t), $D^1<D^2< \ldots <D^t$, and t is an integer greater than 0, and sorting the $S^i$ in ascending order of $D^i$ in the $S^i$ into:

$S^1$, $S^2$, . . . , $S^t$, where the eREGs in the set $S^i$ are sorted in ascending order of sequence numbers of the eREGs;

step 22: according to the set sorting in step 21, expressing $S^1 \ldots S^a$ sorted out of the sets $S^i$ to $S^a$ as a sequential set group, and expressing $S^t \ldots S^{a+1}$ sorted out of the set $S^{a+1}$ to the set $S^t$ as a reverse set group; and selecting a set $S^i$ in the sequential set group and the reverse set group alternately and sequentially according to a value of i, selecting one eREG from one set $S^i$ respectively according to a sequence number of the eREG in the set $S^i$ until M eREGs are selected, and mapping one eCCE in the at least one eCCE onto the selected M eREGs, where a=t/2 when t is an even number, and a=(t+1)/2 when t is an odd number; and step 23: removing the selected eREGs from corresponding sets, performing sorting again and reselecting M eREGs according to step 21 and step 22, and mapping another eCCE in the at least one eCCE onto the reselected M eREGs until all the N eREGs of the physical resource block pair are mapped onto.

In a fifth possible implementation manner, L (L>1) physical resource block pairs have the same overhead, and the mapping each of the eCCEs onto M eREGs according to the number of valid resource elements included in each eREG of the N eREGs includes:

step 31: numbering the N eREGs in each of the physical resource block pairs as 0, 1, 2, . . . , N−1, using $S^i$ to denote a set of eREGs in the N eREGs, where the number of valid resource elements included in each eREG in the set is $D^i$ (i=1, 2, . . . , t), $D^1<D^2< \ldots <D^t$, and t is an integer greater than 0, and sorting the $S^i$ in ascending order of the number $D^i$ of valid resource elements in each eREG in the $S^i$ into:

$S^1$, $S^2$, $S^t$, where the eREGs in the set $S^i$ are sorted in ascending order of sequence numbers of the eREGs;

step 32: according to the set sorting in step 31, expressing $S^1 \ldots S^a$ sorted out of the sets $S^1$ to $S^a$ as a sequential set group, and expressing $S^t \ldots S^{a+1}$ sorted out of the set $S^{a+1}$ to the set $S^t$ as a reverse set group; and selecting a set $S^i$ in the sequential set group and the reverse set group alternately and sequentially according to a value of i, and selecting one eREG from one set $S^i$ respectively according to a sequence number of the eREG in the set $S^i$ until a group of M eREGs are selected, where a=t/2 when t is an even number, and a=(t+1)/2 when t is an odd number; and step 33: removing the selected eREGs from corresponding sets, and performing sorting again and selecting another group of M eREGs according to step 31 and step 32 until all the N eREGs of the physical resource block pair are selected; and step 34: grouping the L physical resource block pairs into floor(L/M) physical resource block groups by putting every M physical resource block pairs into one group, mapping the selected M eREGs in each group onto M physical resource block pairs in each of the floor(L/M) physical resource block groups respectively, and mapping each eCCE in the L physical resource block pairs onto the M eREGs respectively, where floor refers to rounding down.

In the fifth possible implementation manner, L (L>1) physical resource block pairs have different overheads, the overheads of some physical resource block pairs of the L physical resource block pairs include a PBCH and a PSS/

SSS, and the overheads of other physical resource block pairs do not include the PBCH or the PSS/SSS, and the mapping each of the eCCEs onto M eREGs according to the number of valid resource elements included in each eREG of the N eREGs includes:

mapping, according to steps 31 to 35, one eCCE in the at least one eCCE onto P eREGs in the physical resource block pairs that include the PBCH and the PSS/SSS and onto (M-P) eREGs in the physical resource block pairs that do not include the PBCH or the PSS/SSS until all the eREGs in the L physical resource block pairs are mapped onto.

In a sixth possible implementation manner, the eREGs corresponding to the resource elements of the physical resource block pairs have sequence numbers, and a specific implementation manner of mapping each of the eCCEs onto M eREGs is:

calculating the sequence numbers, in the corresponding physical resource block pairs, of the M eREGs mapped from each eCCE; and mapping each of the eCCEs onto M eREGs corresponding to M eREG sequence numbers corresponding to the sequence numbers according to the sequence numbers.

The calculating the sequence numbers, in the corresponding physical resource block pairs, of the M eREGs mapped from each eCCE includes:

when L=1, calculating a sequence number of the $j^{th}$ eREG corresponding to the $i^{th}$ eCCE by using Loc_eCCE_i_j=(i+j*K) mod N, so as to calculate the sequence numbers, in the L=1 physical resource block pair, of the M eREGs corresponding to each eCCE; or when L>1, first, calculating the sequence number of the $j^{th}$ eREG corresponding to the $i^{th}$ eCCE by using Dis_eCCE_i_j=(Loc_eCCE_t_j+p*K) mod N, and then calculating the sequence number of a corresponding physical resource block pair of the L physical resource block pairs that include the $j^{th}$ eREG corresponding to the $i^{th}$ eCCE by using R=(floor(i/(M*K))*M+j) mod L, so as to calculate the sequence numbers, in the corresponding physical resource block pair, of the M eREGs corresponding to each eCCE, where Loc_eCCE_t_j=(t+j*K) mod N, t=floor(i/L), p=i mod L, and R=0, 1, . . . , or L−1; or when L>1, first, calculating the sequence number of the $j^{th}$ eREG corresponding to the $i^{th}$ eCCE by using Dis_eCCE_i_j=((t+j*K) mod N+p*K)mod N, and then calculating the sequence number of a corresponding physical resource block pair of the L physical resource block pairs that include the $j^{th}$ eREG corresponding to the $i^{th}$ eCCE by using R=(floor(i/(M*K))*M+j) mod L, so as to calculate the sequence numbers, in the corresponding physical resource block pair, of the M eREGs corresponding to each eCCE, where t=floor(i/L), p=i mod L, and R=0, 1, . . . , or L−1; or when L>1, first, calculating the sequence number of the $j^{th}$ eREG corresponding to the $i^{th}$ eCCE by using Dis_eCCE_i_j=(i+j*K) mod N, and then calculating the sequence number of a corresponding physical resource block pair of the L physical resource block pairs that include the $j^{th}$ eREG corresponding to the $i^{th}$ eCCE by using R=(floor(i/(M*K))*M+j) mod L, so as to calculate the sequence numbers, in the corresponding physical resource block pair, of the M eREGs corresponding to each eCCE, where N is the number of eREGs of each physical resource block pair, K is the number of eCCEs of each physical resource block pair, M is the number of eREGs corresponding to each eCCE, i is the sequence numbers of the eCCEs that form the control channel, i=0, 1, . . . , or L*K−1, and j is the sequence numbers of the eREGs included in the physical resource block pair, j=0, 1, . . . , or M−1. When L=1, the sequence numbers of the eCCEs corresponding to an eREG in each physical resource block pair are calculated according to the following formula:

the sequence number of the eCCE corresponding to the $j^{th}$ eREG of each physical resource block pair is Loc_eCCE_i=j mod K, where K is the number of eCCEs borne in each physical resource block pair, and j=0, 1, . . . , or K−1.

When the number L of configured physical resource block pairs is greater than the number M of eREGs mapped from each eCCE, it is only needed to group the L configured physical resource block pairs into floor(L/M) or (floor(L/M)+1) groups first by putting every M physical resource block pairs into one group, where the number of physical resource block pairs included in each group is M or L−floor(L/M). In each group (at this time, the number of physical resource block pairs in each group is L1=M or L−floor(L/M)), the foregoing formula is applied respectively to obtain the eCCE-to-eREG mapping on all the L physical resource block pairs. A sequence number $w_i$ of a PRB pair in the $i^{th}$ group, which is obtained according to the foregoing formula, is operated according to a formula $w=w_i+i*M$ to obtain a sequence number w of the PRB pair in all the L physical resource block pairs, where i=0, 1, . . . , floor(L/M)−1 or floor(L/M).

For example, when L=16 and M=8, the L physical resource block pairs are grouped into two groups first by putting every 8 physical resource block pairs into one group. For example, the first 8 physical resource block pairs form a first group, and the last 8 physical resource block pairs form a second group. In the first group, L=8 and M=8 are substituted into the foregoing formula to obtain the eREGs mapped from all eCCEs in the first 8 physical resource block pairs and obtain sequence numbers $w_1$ of corresponding PRB pairs in this group; and $w_1$ is substituted into a formula $w_1+0*8$ to obtain the sequence numbers w of the PRB pairs in the L physical resource block pairs. Similarly, in the second group, L=8 and M=8 are substituted into the foregoing formula to obtain the eREGs mapped from all eCCEs in the last 8 physical resource block pairs and obtain sequence numbers $w_2$ of corresponding PRB pairs in this group; and $w_2$ is substituted into a formula $w_2+1*8$ to obtain the sequence numbers w of the PRB pairs in the L physical resource block pairs.

According to a second aspect, an embodiment of the present invention provides a control channel transmission method, including:

determining L physical resource block pairs that are used to transmit a control channel, and grouping resource elements except a demodulation reference signal DMRS in each physical resource block pair of the L physical resource block pairs into at least one eREG, where L is an integer greater than 0;

obtaining, according to an aggregation level of the control channel, the number of eCCEs that form the control channel and sequence numbers of eREGs mapped from each eCCE;

when L is greater than 1, numbering the eREGs differently in different physical resource block pairs of the L physical resource block pairs; or, when L is equal to 1, numbering the eREGs of the physical resource block pair differently according to different transmitting time points of the control channel; and sending the eCCE by using the resource elements included in the eREGs corresponding to the sequence numbers of the eREGs mapped from the eCCE.

In a first possible implementation manner, the numbering the eREGs differently in different physical resource block pairs of the L physical resource block pairs includes:

numbering the eREGs in a first physical resource block pair of the L physical resource block pairs; and performing a cyclic shift for the sequence numbers of the eREGs in the first physical resource block pair to obtain sequence numbers of the eREGs in a second physical resource block pair of the L physical resource block pairs.

The numbering the eREGs differently in different physical resource block pairs of the L physical resource block pairs includes:

numbering the eREGs in a first physical resource block pair of the L physical resource block pairs; and performing L−1 cyclic shifts for the sequence numbers of the eREGs in the first physical resource block pair to obtain sequence numbers of the eREGs in other L−1 physical resource block pairs except the first physical resource block pair of the L physical resource block pairs respectively.

According to another aspect, a control channel transmission method is provided and includes:

determining L physical resource block pairs that are used to transmit a control channel, and grouping resource elements except a demodulation reference signal DMRS in each physical resource block pair of the L physical resource block pairs into at least one eREG, where L is an integer greater than 0;

obtaining, according to an aggregation level of the control channel, eCCEs that form the control channel and sequence numbers of eREGs mapped from each eCCE;

mapping the eREGs onto the resource elements in the physical resource block pairs corresponding to different subframes or different slots; and sending the eCCE by using the resource elements included in the eREGs corresponding to the sequence numbers of eREGs mapped from the eCCE.

The mapping the eREGs onto the resource elements in the physical resource block pairs corresponding to different subframes or different slots includes:

numbering the eREGs corresponding to the resource elements in a physical resource block corresponding to a first subframe or a first slot;

performing a cyclic shift for the sequence numbers of the eREGs corresponding to the resource elements in the physical resource block corresponding to the first subframe or the first slot to obtain sequence numbers of the eREGs corresponding to the resource elements in a physical resource block corresponding to a second subframe or a second slot; and mapping the eREGs onto the resource elements in the corresponding physical resource block according to the sequence numbers of the eREGs corresponding to the resource elements in the physical resource block corresponding to the second subframe or the second slot.

A rule for mapping the eREGs onto the resource elements in the physical resource block pairs corresponding to different subframes or different slots includes:

in the $f^{th}$ subframe or slot, a sequence number of an eREG corresponding to a first RE in a physical resource block pair corresponding to the $f^{th}$ subframe or slot slot being:

$K^f=((K+p) \bmod N)$, where $K^f$ is a sequence number of an eREG corresponding to the first RE in the physical resource block pair corresponding to the $f^{th}$ subframe or slot, K is a sequence number of an eREG corresponding to an RE corresponding to a first subframe or slot and located in the same location as the first RE on a time domain and a frequency domain, and p is a step length of a cyclic shift.

The performing a cyclic shift for the sequence numbers of the eREGs corresponding to the resource elements in the physical resource block corresponding to the first subframe or the first slot to obtain sequence numbers of the eREGs corresponding to the resource elements in a physical resource block corresponding to a second subframe or a second slot includes:

classifying resource elements in the physical resource block corresponding to the first slot or the first subframe into resource elements used to transmit a DMRS and resource elements not used to transmit the DMRS, performing a cyclic shift for a sequence number of an eREG corresponding to a resource element used to transmit the DMRS in the physical resource block corresponding to the first slot or the first subframe to obtain a sequence number of an eREG corresponding to a resource element used to transmit the DMRS in the physical resource block corresponding to the second slot or the second subframe, and performing a cyclic shift for a sequence number of an eREG corresponding to a resource element not used to transmit the DMRS in the physical resource block corresponding to the first slot or the first subframe to obtain a sequence number of an eREG corresponding to a resource element not used to transmit the DMRS in the physical resource block corresponding to the second slot or the second subframe.

A mapping rule for mapping each eCCE onto the eREGs includes:

in the $f^{th}$ subframe or slot, a sequence number of the $n^{th}$ eREG in a physical resource block pair corresponding to the $f^{th}$ subframe or slot slot being:

$K^f(n)=K((n+p) \bmod N)$, where $K^f(n)$ is the sequence number of the $n^{th}$ eREG corresponding to a first eCCE in the physical resource block pair in the $f^{th}$ subframe or slot, K(n) is the sequence number of the $n^{th}$ eREG corresponding to the first eCCE in the physical resource block pair in a first subframe or a first slot slot, n=0, 1, . . . , or N−1, and p is a step length of the cyclic shift.

According to a third aspect, an embodiment of the present invention provides a control channel transmission method, including:

determining L physical resource block pairs that are used to transmit a control channel, and grouping resource elements except a demodulation reference signal DMRS in each physical resource block pair of the L physical resource block pairs into at least one eREG, where L is an integer greater than 0;

obtaining, according to an aggregation level of the control channel, the number of eCCEs that form the control channel and eREGs mapped from each eCCE, where a rule for determining the eREGs mapped from each eCCE is related to a cell ID or a user equipment UE ID; and sending the eCCE by using the resource elements included in the eREG.

That a rule for determining the eREGs mapped from each eCCE is related to a cell ID or a user equipment UE ID includes:

that the rule for determining the eREGs mapped from each eCCE is cell-specific or user equipment-specific.

The cell includes an actual physical cell, or a virtual cell or carrier configured in a system.

The determining rule is a cell-specific or user equipment-specific function, and the function satisfies the following formula:

$$R(i)=\left(\frac{n_s}{2}*2^9+N_{ID}\right) \bmod N+R_0(i),$$

where $n_s$ is a slot number, N is the number of eREGs in each physical resource block pair, $R^0$ (i) is a sequence number of the $i^{th}$ eREG included in a reference eCEE in a set reference physical resource block pair, R(i) is a sequence number of the $i^{th}$ eREG mapped from a corresponding eCCE in a physical resource block pair corresponding to the cell or the UE, and $N_{ID}$ is a parameter corresponding to the cell or the UE.

The determining rule is:

$$eREG_t(i)=eREG((i+X)\mathrm{mod}\ N)$$

where, $eREG_t(i)$ is the sequence number of the $i^{th}$ eREG mapped from a first eCCE corresponding to the first cell or the first UE, eREG(i) is the sequence number of the $i^{th}$ eREG mapped from a second eCCE of the first one of the cell or user equipment corresponding to a second cell or a second UE, X is a parameter related to a virtual cell or a physical cell or a carrier, i=0, 1, . . . , or N−1, and N is the number of eREGs included in each physical resource block pair.

According to another aspect, a control channel transmission method is provided and includes:

determining L physical resource block pairs that are used to transmit a control channel, and grouping resource elements except a demodulation reference signal DMRS in each physical resource block pair of the L physical resource block pairs into at least one eREG, where L is an integer greater than 1;

obtaining, according to an aggregation level of the control channel, eCCEs that form the control channel, and mapping the eCCEs onto the eREG, where REs included in the eREG mapped from the eCCEs are located in the same locations on a time domain and a frequency domain in the corresponding physical resource block pairs; and mapping the eREG onto a corresponding resource element in the L physical resource block pairs, where a sequence number of an eREG corresponding to an RE of a second physical resource block pair of the L physical resource block pairs is obtained by performing a cyclic shift for a sequence number of an eREG corresponding to an RE of a first physical resource block pair of the L physical resource block pairs; and sending the eCCE by using the resource elements included in the eREG mapped from the eCCE.

The obtaining a sequence number of an eREG corresponding to an RE of a second physical resource block pair of the L physical resource block pairs by performing a cyclic shift for a sequence number of an eREG corresponding to an RE of a first physical resource block pair of the L physical resource block pairs includes:

numbering the L physical resource block pairs, and performing a cyclic shift at a step length of p for the sequence number of the eREG corresponding to the RE of the $m^{th}$ physical resource block pair against the sequence number of the eREG corresponding to the RE of the first physical resource block pair, where the sequence number of the eREG corresponding to the RE in the $m^{th}$ physical resource block pair is:

$K^m=(K_0+m*p)\mathrm{mod}\ N)$, where $K^m$ represents the sequence number of the eREG corresponding to the first RE in the $m^{th}$ physical resource block pair, and $K^0$ represents the sequence number of the eREG corresponding to an RE located in the same location as the first RE on the time domain and the frequency domain in the first physical resource block pair.

A mapping rule for mapping the eCCE onto the eREGs includes:

$K^m(n)=K_0((n+m*p)\mathrm{mod}\ N)$, where $K^m(n)$ is the sequence number of the $n^{th}$ eREG corresponding to a first eCCE in the $m^{th}$ physical resource block pair, $K_0(n)$ is the sequence number of the $n^{th}$ eREG corresponding to the first eCCE in the first physical resource block pair, n=0, 1, . . . , or N−1, and p is the step length of the cyclic shift.

According to a fourth aspect, an embodiment of the present invention provides a control channel transmission method, including:

determining L physical resource block pairs that are used to transmit a control channel, and grouping resource elements except a demodulation reference signal DMRS in each physical resource block pair of the L physical resource block pairs into at least one eREG, where L is an integer greater than 1;

obtaining, according to an aggregation level of the control channel, eCCEs that form the control channel, and mapping the eCCEs onto the eREG, where REs included in the eREG mapped from the eCCEs are located in the same locations on a time domain and a frequency domain in the corresponding physical resource block pairs; and mapping the eREG onto a corresponding resource element in the L physical resource block pairs, where a sequence number of an eREG corresponding to an RE of a second physical resource block pair of the L physical resource block pairs is obtained by performing a cyclic shift for a sequence number of an eREG corresponding to an RE of a first physical resource block pair of the L physical resource block pairs; and sending the eCCE by using the resource elements included in the eREG mapped from the eCCE.

The obtaining a sequence number of an eREG corresponding to an RE of a second physical resource block pair of the L physical resource block pairs by performing a cyclic shift for a sequence number of an eREG corresponding to an RE of a first physical resource block pair of the L physical resource block pairs includes:

numbering the L physical resource block pairs, and performing a cyclic shift at a step length of p for the sequence number of the eREG corresponding to the RE of the $m^{th}$ physical resource block pair against the sequence number of the eREG corresponding to the RE of the first physical resource block pair, where the sequence number of the eREG corresponding to the RE in the $m^{th}$ physical resource block pair is:

$K^m=(K_0+m*p)\mathrm{mod}\ N)$, where $K^m$ represents the sequence number of the eREG corresponding to the first RE in the $m^{th}$ physical resource block pair, and $K^0$ represents the sequence number of the eREG corresponding to an RE located in the same location as the first RE on the time domain and the frequency domain in the first physical resource block pair.

A mapping rule for mapping the eCCE onto the eREGs includes:

$K^m(n)=K_0((n+m*p)\mathrm{mod}\ N)$, where $K^m(n)$ is the sequence number of the $n^{th}$ eREG corresponding to a first eCCE in the $m^{th}$ physical resource block pair, $K_0(n)$ is the sequence number of the $n^{th}$ eREG corresponding to the first eCCE in the first physical resource block pair, n=0, 1, . . . , or N−1, and p is the step length of the cyclic shift.

According to a fifth aspect, an embodiment of the present invention provides a control channel transmission method, including:

determining L physical resource block pairs of a first transmission node that is used to transmit a control channel, and grouping resource elements except a demodulation reference signal DMRS in each physical resource block pair of the L physical resource block pairs into at least one eREG, where L is an integer greater than 0;

obtaining, according to an aggregation level of the control channel, eCCEs that form the control channel, mapping the eCCEs onto the eREG, and mapping the eREG onto corresponding resource elements in the L physical resource block pairs, where a sequence number of an eREG corresponding to an RE of a first physical resource block pair of the L physical resource block pairs of the first transmission node is obtained by performing a cyclic shift for a sequence number of an eREG corresponding to an RE of a first physical resource block pair in physical resource block pairs of a second transmission node; and sending the eCCE by using the resource elements included in the eREG mapped from the eCCE.

The obtaining a sequence number of an eREG corresponding to an RE of a first physical resource block pair of the L physical resource block pairs of the first transmission node by performing a cyclic shift for a sequence number of an eREG corresponding to an RE of a first physical resource block pair in physical resource block pairs of a second transmission node includes:

determining the sequence number of the eREG corresponding to the RE of the first physical resource block pair of the physical resource block pairs of the first transmission node by using the following formula:

$$K^t=(K+X)\bmod N$$

where, $K^t$ is the sequence number of the eREG corresponding to the RE in the first physical resource block pair of the first transmission node, K is the sequence number of the eREG corresponding to the RE in the first physical resource block pair of the second transmission node, X is a parameter related to a virtual cell or a physical cell or a carrier, for example, X is a virtual cell ID and a value of X is the same as a value of X in a DMRS scrambling sequence generator of an ePDCCH or a PDSCH, and N is the number of eREGs included in each physical resource block pair.

A rule for mapping the eCCE onto the eREGs is determined by the following rule:

determining, by using the following formula, a sequence number of the $i^{th}$ eREG mapped from the eCCE of the control channel transmitted by the first transmission node:

$$K^t(i)=K(i+X)\bmod N$$

where, $K^t$ is a sequence number of the $i^{th}$ eREG mapped from the eCCE of the control channel transmitted by the first transmission node, K is a sequence number of the $i^{th}$ eREG mapped from the eCCE of the control channel transmitted by the second transmission node, X is a parameter related to a virtual cell or a physical cell or a carrier, for example, X is a virtual cell ID and a value of X is the same as a value of X in a DMRS scrambling sequence generator of an ePDCCH or a PDSCH, N is the number of eREGs in each physical resource block pair, and i=0, 1, . . . , or N−1.

According to a sixth aspect, an embodiment of the present invention provides a control channel transmission apparatus, including:

a determining unit, configured to determine L physical resource block pairs that are used to transmit a control channel, where L is an integer greater than 0, and the control channel is formed by at least one eCCE;

a grouping and calculating unit, configured to group resource elements except a demodulation reference signal DMRS in each physical resource block pair of the L physical resource block pairs determined by the determining unit into N eREGs, and calculate the number of valid resource elements except other overheads in each eREG of the N eREGs in each of the physical resource block pairs, where N is an integer greater than 0, and the other overheads include at least one of the following: a common reference signal CRS, a physical downlink control channel PDCCH, a physical broadcast channel PBCH, a positioning reference signal PRS, a primary synchronization signal PSS, and a secondary synchronization signal SSS;

a mapping unit, configured to map each of the eCCEs onto M eREGs according to the number of valid resource elements included in each eREG of the N eREGs of each physical resource block pair, where the number of valid resource elements is calculated by the grouping and calculating unit, and M is an integer greater than 0; and a sending unit, configured to send the eCCE by using the resource elements included in the eREG mapped by the mapping unit.

In a first possible implementation manner of the sixth aspect, the mapping unit is specifically configured to group N eREGs in each of the physical resource block pairs into a first eREG group and a second eREG group according to the number of valid resource elements included in the eREG, and map each eCCE onto M eREGs of the first eREG group and the second eREG group, where: in the M eREGs mapped from each eCCE, the first M/2 eREGs of the M eREGs are in the first eREG group, the number of valid resource elements included in each eREG of the first M/2 eREGs is a different value, the last M/2 eREGs of the M eREGs are in the second eREG group, and the number of valid resource elements included in each eREG of the last M/2 eREGs is a different value.

In a second possible implementation manner of the sixth aspect, the mapping unit is specifically configured to perform the following steps: numbering the N eREGs in each of the physical resource block pairs as 0, 1, 2, . . . , N−1, and using $S^i$ to denote a set of eREGs in the N eREGs, where the number of valid resource elements included in each eREG in the set is $D^i$ (i=1, 2, . . . , t), $D^1<D^2< \ldots <D^t$, and t is an integer greater than 0; selecting one eREG respectively from each of the sets $S^1$, $S^t$, $S^2$, $S^{t-1}$ . . . sequentially until M eREGs are selected in total, and mapping one eCCE in the at least one eCCE onto M eREGs; and removing the selected eREGs from corresponding sets, reselecting M eREGs, and mapping another eCCE in the at least one eCCE onto the reselected M eREGs until all the N eREGs of the physical resource block pair are mapped onto.

In a third possible implementation manner of the sixth aspect, the mapping unit is specifically configured to number the N eREGs in each of the physical resource block pairs as 0, 1, 2, . . . , N−1, and use $S^i$ to denote a set of eREGs in the N eREGs, where the number of valid resource elements included in each eREG in the set is $D^i$ (i=1, 2, . . . , t), $D^1<D^2< \ldots <D^t$, and t is an integer greater than 0; sort the $S^i$ in ascending order of $D^i$ in the $S^i$ into $S^i$, $S^2$, . . . , $S^t$, where the eREGs in the set $S^i$ are sorted in ascending order of sequence numbers of the eREGs; group the sorted N eREGs into p groups by putting every M/2 eREGs into one group, where the $k^{th}$ group includes a $((k-1)*M/2+1)^{th}$ eREG, a $((k-1)*M/2+2)^{th}$ eREG, . . . , and a $(k*M/2)^{th}$ eREG in a sorted sequence, where k=0, 1, . . . , p; and map the eCCEs onto the eREGs included in the $x^{th}$ group and the $(p-x)^{th}$ group, where x is any value in 0, 1, . . . , p.

In a fourth possible implementation manner of the sixth aspect, the mapping unit includes a first sorting subunit, a first mapping subunit, and a cyclic selecting unit;

the first sorting subunit is configured to perform step 21, where step 21 is: numbering the N eREGs in each of the physical resource block pairs as 0, 1, 2, . . . , N−1, using $S^i$ to denote a set of eREGs in the N eREGs, where the number of valid resource elements included in each eREG in the set is $D^i$ (i=1, 2, . . . , t), $D^1<D^2< \ldots <D^t$, and t is an integer greater than 0, and sorting the $S^i$ in ascending order of $D^i$ in the $S^i$ into:

$S^1, S^2, \ldots, S^t$, where the eREGs in the set $S^i$ are sorted in ascending order of sequence numbers of the eREGs;

the first mapping subunit is configured to perform step 22, where step 22 is: according to the sorting of the set $S^i$ in the first sorting subunit, expressing $S^1 \ldots S^a$ sorted out of the sets $S^1$ to $S^a$ as a sequential set group, and expressing $S^t \ldots S^{a+1}$ sorted out of the set $S^{a+1}$ to the set $S^t$ as a reverse set group; and selecting a set $S^i$ in the sequential set group and the reverse set group alternately and sequentially according to a value of i, selecting one eREG from one set $S^i$ respectively according to a sequence number of the eREG in the set $S^i$ until M eREGs are selected, and mapping one eCCE in the at least one eCCE onto the selected M eREGs, where a=t/2 when t is an even number, and a=(t+1)/2 when t is an odd number;

the cyclic selecting unit is further configured to perform step 23, where step 23 is: removing the selected eREGs from a sorted sequence;

the first sorting subunit performs sorting again according to step 21; and the first mapping subunit reselects M eREGs according to step 22, and maps another eCCE in the at least one eCCE onto the reselected M eREGs until all the N eREGs of the physical resource block pair are mapped onto.

In a fifth possible implementation manner of the sixth aspect, the mapping unit specifically includes a second sorting subunit, a second mapping subunit, a second cyclic selecting unit, a shift combining subunit, and a correspond-mapping subunit;

the second sorting subunit is configured to number the N eREGs in each of the physical resource block pairs as 0, 1, 2, . . . , N−1, use $S^i$ to denote a set of eREGs in the N eREGs, where the number of valid resource elements included in each eREG in the set is $D^i$ (i=1, 2, . . . , t), $D^1<D^2< \ldots <D^t$, and t is an integer greater than 0, and sort the $S^i$ in ascending order of the number $D^i$ of valid resource elements in each eREG in the $S^i$ into:

$S^1, S^2, \ldots, S^t$, where the eREGs in the set $S^i$ are sorted in ascending order of sequence numbers of the eREGs;

the second selecting subunit is configured to: according to the sorting of the set $S^i$ in the second sorting subunit, express $S^i \ldots S^a$ sorted out of the sets $S^1$ to $S^a$ as a sequential set group, and express $S^t \ldots S^{a+1}$ sorted out of the set $S^{a+1}$ to the set $S^t$ as a reverse set group; and select a set $S^i$ in the sequential set group and the reverse set group alternately and sequentially according to a value of i, and select one eREG from one set $S^i$ respectively according to a sequence number of the eREG in the set $S^i$ until a group of M eREGs are selected, where a=t/2 when t is an even number, and a=(t+1)/2 when t is an odd number;

the second cyclic selecting unit is configured to perform step 33, where step 33 is: removing, from a sorted sequence, the eREGs selected by the second selecting subunit;

the second sorting subunit performs sorting again according to step 31;

the second selecting subunit reselects another group of M eREGs according to step 32 until all the N eREGs of the physical resource block pair are selected; and the correspond-mapping subunit is configured to perform step 34, where step 34 is: grouping the L physical resource block pairs into floor(L/M) physical resource block groups by putting every M physical resource block pairs into one group, mapping the selected M eREGs in each group onto M physical resource block pairs in each of the floor(L/M) physical resource block groups respectively, and mapping each eCCE in the L physical resource block pairs onto the M eREGs respectively, where floor refers to rounding down.

In a sixth possible implementation manner of the sixth aspect, the L (L>1) physical resource block pairs have different overheads, the overheads of some physical resource block pairs of the L physical resource block pairs include a PBCH and a PSS/SSS, and the overheads of other physical resource block pairs do not include the PBCH or the PSS/SSS; and the mapping unit is specifically configured to map, according to steps 31 to 35, one eCCE in the at least one eCCE onto P eREGs in the physical resource block pairs that include the PBCH and the PSS/SSS and onto (M-P) eREGs in the physical resource block pairs that do not include the PBCH or the PSS/SSS until all the eREGs in the L physical resource block pairs are mapped onto.

In a sixth possible implementation manner, the eREGs corresponding to the resource elements of the physical resource block pairs have sequence numbers; and the mapping unit includes a calculating subunit and a mapping subunit, where the calculating subunit is configured to calculate the sequence numbers, in the corresponding physical resource block pairs, of the M eREGs mapped from each eCCE; and the mapping subunit is configured to map each of the eCCEs onto M eREGs corresponding to M eREG sequence numbers corresponding to the sequence numbers according to the sequence numbers.

The calculating subunit is configured to:

when L=1, calculate a sequence number of the $j^{th}$ eREG corresponding to the $i^{th}$ eCCE by using Loc_eCCE_i_j=(i+j*K) mod N, and then calculate the sequence numbers, in the L=1 physical resource block pair, of the M eREGs corresponding to each eCCE; or when L>1, first, calculate the sequence number of the $j^{th}$ eREG corresponding to the $i^{th}$ eCCE by using Dis_eCCE_i_j=(Loc_eCCE_t_j+p*K) mod N, and then calculate the sequence number of a corresponding physical resource block pair of the L physical resource block pairs that include the $j^{th}$ eREG corresponding to the $i^{th}$ eCCE by using R=(floor(i/(M*K))*M+j) mod L, so as to calculate the sequence numbers, in the corresponding physical resource block pair, of the M eREGs corresponding to each eCCE, where Loc_eCCE_t_j=(t+j*K) mod N, t=floor(i/L), p=i mod L, and R=0, 1, . . . , or L−1; or when L>1, first, calculate the sequence number of the $j^{th}$ eREG corresponding to the $i^{th}$ eCCE by using Dis_eCCE_i_j=((t+j*K) mod N+p*K)mod N, and then calculate the sequence number of a corresponding physical resource block pair of the L physical resource block pairs that include the $j^{th}$ eREG corresponding to the $i^{th}$ eCCE by using R=(floor(i/(M*K))*M+j) mod L, so as to calculate the sequence numbers, in the corresponding physical resource block pair, of the M eREGs corresponding to each eCCE, where t=floor(i/L), p=i mod L, and R=0, 1, . . . , or L−1; or when L>1, first, calculate the sequence number of the $j^{th}$ eREG corresponding to the $i^{th}$ eCCE by using Dis_eCCE_i_j=(i+j*K) mod N, and then calculate the sequence number of a corresponding physical resource block pair of the L physical resource block pairs that include the $j^{th}$ eREG corresponding to the $i^{th}$ eCCE by using R=(floor(i/(M*K))*M+j) mod L, so as to calculate the sequence numbers, in the corresponding physical resource block pair, of the M eREGs corresponding to each eCCE, where N is the number of eREGs of each physical resource block pair, K is the number of eCCEs of each physical resource block pair, M is the number of eREGs corresponding to each eCCE, i is the sequence numbers of the eCCEs that form the control channel, i=0, 1, . . . , or L*K−1, and j is the sequence numbers of the eREGs included in the physical resource block pair, j=0, 1, . . . , or M−1.

The calculating subunit is configured to:

calculate the sequence number of the eCCE corresponding to the $j^{th}$ eREG of each physical resource block pair by using Loc_eCCE_i=j mod K, where K is the number of eCCEs borne in each physical resource block pair, and j=0, 1, . . . , or K−1.

When the number L of configured physical resource block pairs is greater than the number M of eREGs mapped from each eCCE, it is only needed to group the L configured physical resource block pairs into floor(L/M) or (floor(L/M)+1) groups first by putting every M physical resource block pairs into one group, where the number of physical resource block pairs included in each group is M or L−floor (L/M). In each group (at this time, the number of physical resource block pairs in each group is L1=M or L−floor(L/M)), the foregoing formula is applied respectively to obtain the eCCE-to-eREG mapping on all the L physical resource block pairs. A sequence number $w_i$ of a PRB pair in the $i^{th}$ group, which is obtained according to the foregoing formula, is operated according to a formula $w=w_i+i*M$ to obtain a sequence number w of the PRB pair in all the L physical resource block pairs, where i=0, 1, . . . , floor(L/M)−1 or floor(L/M).

For example, when L=16 and M=8, the L physical resource block pairs are grouped into two groups first by putting every 8 physical resource block pairs into one group. For example, the first 8 physical resource block pairs form a first group, and the last 8 physical resource block pairs form a second group. In the first group, L=8 and M=8 are substituted into the foregoing formula to obtain the eREGs mapped from all eCCEs in the first 8 physical resource block pairs and obtain sequence numbers $w_1$ of corresponding PRB pairs in this group; and $w_1$ is substituted into a formula $w_1+0*8$ to obtain the sequence numbers w of the PRB pairs in the L physical resource block pairs. Similarly, in the second group, L=8 and M=8 are substituted into the foregoing formula to obtain the eREGs mapped from all eCCEs in the last 8 physical resource block pairs and obtain sequence numbers $w_2$ of corresponding PRB pairs in this group; and $w_2$ is substituted into a formula $w_2+1*8$ to obtain the sequence numbers w of the PRB pairs in the L physical resource block pairs.

According to a seventh aspect, an embodiment of the present invention provides a control channel transmission apparatus, including:

a determining and grouping unit, configured to determine L physical resource block pairs that are used to transmit a control channel, and group resource elements except a demodulation reference signal DMRS in each physical resource block pair of the L physical resource block pairs into at least one eREG, where L is an integer greater than 0;

an obtaining unit, configured to obtain, according to an aggregation level of the control channel, the number of eCCEs that form the control channel and sequence numbers of eREGs mapped from each eCCE;

a numbering unit, configured to: when L is greater than 1, number the eREGs differently in different physical resource block pairs of the L physical resource block pairs; or, when L is equal to 1, number the eREGs of the physical resource block pair differently according to different transmitting time points of the control channel; and a mapping sending unit, configured to send the eCCE by using the resource elements included in the eREGs corresponding to the sequence numbers of the eREGs mapped from the eCCE.

The numbering unit is configured to:

number the eREGs in a first physical resource block pair of the L physical resource block pairs; and perform a cyclic shift for the sequence numbers of the eREGs in the first physical resource block pair to obtain sequence numbers of the eREGs in a second physical resource block pair of the L physical resource block pairs.

According to an eighth aspect, an embodiment of the present invention further provides a control channel transmission apparatus, including:

a determining and grouping unit, configured to determine L physical resource block pairs that are used to transmit a control channel, and group resource elements except a demodulation reference signal DMRS in each physical resource block pair of the L physical resource block pairs into at least one eREG, where L is an integer greater than 0;

an obtaining unit, configured to obtain, according to an aggregation level of the control channel, the number of eCCEs that form the control channel and eREGs mapped from each eCCE, where a rule for determining the eREGs mapped from each eCCE is related to a cell ID or a user equipment UE ID; and a sending unit, configured to send the eCCE by using the resource elements included in the eREG.

The cell may be an actual physical cell, or a virtual cell or carrier configured in a system.

That a rule for determining the eREGs mapped from each eCCE is related to a cell ID or a user equipment UE ID includes:

that the rule for determining the eREGs mapped from each eCCE is cell-specific or user equipment-specific.

The determining rule is a cell-specific or user equipment-specific function, and the function satisfies the following formula:

$$R(i)=\left(\frac{n_s}{2}*2^9+N_{ID}\right)\bmod N+R_0(i),$$

where $n_s$ is a slot number, N is the number of eREGs in each physical resource block pair, $R^0$ (i) is a sequence number of the $i^{th}$ eREG included in a reference eCEE in a set reference physical resource block pair, R(i) is a sequence number of the $i^{th}$ eREG mapped from a corresponding eCCE in a physical resource block pair corresponding to the cell or the UE, and $N_{ID}$ is a parameter corresponding to the cell or the UE.

The determining rule is:

$$eREG_t(i)=eREG((i+X)\bmod N)$$

where, $eREG_t(i)$ is the sequence number of the $i^{th}$ eREG mapped from a first eCCE corresponding to the first cell or the first UE, eREG(i) is the sequence number of the $i^{th}$ eREG mapped from a second eCCE of the first one of the cell or user equipment corresponding to a second cell or a second UE, X is a parameter related to a virtual cell or a physical cell or a carrier, i=0, 1, . . . , or N−1, and N is the number of eREGs included in each physical resource block pair.

According to a ninth aspect, an embodiment of the present invention provides a control channel transmission apparatus, where the apparatus includes:

a third determining unit, configured to determine L physical resource block pairs that are used to transmit a control channel, and group resource elements except a demodulation reference signal DMRS in each physical resource block pair of the L physical resource block pairs into at least one eREG, where L is an integer greater than 1;

a mapping unit, configured to obtain, according to an aggregation level of the control channel, eCCEs that form the control channel, and map the eCCEs onto the eREG, where REs included in the eREG mapped from the eCCEs are located in the same locations on a time domain and a frequency domain in the corresponding physical resource block pairs; and map the eREG onto a corresponding resource element in the L physical resource block pairs, where a sequence number of an eREG corresponding to an RE of a second physical resource block pair of the L physical resource block pairs is obtained by performing a cyclic shift for a sequence number of an eREG corresponding to an RE of a first physical resource block pair of the L physical resource block pairs; and a sending unit, configured to send the eCCE by using the resource elements included in the eREG mapped from the eCCE.

The obtaining a sequence number of an eREG corresponding to an RE of a second physical resource block pair of the L physical resource block pairs by performing a cyclic shift for a sequence number of an eREG corresponding to an RE of a first physical resource block pair of the L physical resource block pairs includes:

numbering the L physical resource block pairs, and performing a cyclic shift at a step length of p for the sequence number of the eREG corresponding to the RE of the $m^{th}$ physical resource block pair against the sequence number of the eREG corresponding to the RE of the first physical resource block pair, where the sequence number of the eREG corresponding to the RE in the $m^{th}$ physical resource block pair is:

$K^m=(K_0+m*p) \bmod N$), where $K^m$ represents the sequence number of the eREG corresponding to the first RE in the $m^{th}$ physical resource block pair, and $K^0$ represents the sequence number of the eREG corresponding to an RE located in the same location as the first RE on the time domain and the frequency domain in the first physical resource block pair.

According to another aspect, a control channel transmission apparatus is provided and includes:

a second determining and grouping unit, configured to determine L physical resource block pairs that are used to transmit a control channel, and group resource elements except a demodulation reference signal DMRS in each physical resource block pair of the L physical resource block pairs into at least one eREG, where L is an integer greater than 0;

a second obtaining unit, configured to obtain, according to an aggregation level of the control channel, eCCEs that form the control channel and sequence numbers of eREGs mapped from each eCCE;

a second mapping unit, configured to map the eREGs onto the resource elements in the physical resource block pairs corresponding to different subframes or different slots; and a second sending unit, configured to send the eCCE by using the resource elements included in the eREGs corresponding to the sequence numbers of the eREGs mapped from the eCCE.

The second mapping unit is configured to:

number the eREGs corresponding to the resource elements in a physical resource block corresponding to a first subframe or a first slot;

perform a cyclic shift for the sequence numbers of the eREGs corresponding to the resource elements in the physical resource block corresponding to the first subframe or the first slot to obtain sequence numbers of the eREGs corresponding to the resource elements in a physical resource block corresponding to a second subframe or a second slot; and map the eREGs onto the resource elements in the corresponding physical resource block according to the sequence numbers of the eREGs corresponding to the resource elements in the physical resource block corresponding to the second subframe or the second slot.

A rule for mapping the eREGs onto the resource elements in the physical resource block pairs corresponding to different subframes or different slots includes:

in the $f^{th}$ subframe or slot, a sequence number of an eREG corresponding to a first RE in a physical resource block pair corresponding to the $f^{th}$ subframe or slot slot being:

$K^f=((K+p) \bmod N)$, where $K^f$ is a sequence number of an eREG corresponding to the first RE in the physical resource block pair corresponding to the $f^{th}$ subframe or slot, K is a sequence number of an eREG corresponding to an RE corresponding to a first subframe or slot and located in the same location as the first RE on a time domain and a frequency domain, and p is a step length of a cyclic shift.

The mapping unit is configured to:

classify resource elements in the physical resource block corresponding to the first slot or the first subframe into resource elements used to transmit a DMRS and resource elements not used to transmit the DMRS, perform a cyclic shift for a sequence number of an eREG corresponding to a resource element used to transmit the DMRS in the physical resource block corresponding to the first slot or the first subframe to obtain a sequence number of an eREG corresponding to a resource element used to transmit the DMRS in the physical resource block corresponding to the second slot or the second subframe, and perform a cyclic shift for a sequence number of an eREG corresponding to a resource element not used to transmit the DMRS in the physical resource block corresponding to the first slot or the first subframe to obtain a sequence number of an eREG corresponding to a resource element not used to transmit the DMRS in the physical resource block corresponding to the second slot or the second subframe; and map the eREGs onto the resource elements in the corresponding physical resource block according to the sequence numbers of the eREGs corresponding to the resource elements used to transmit a DMRS in the physical resource block corresponding to the second slot or the second subframe, or map the eREGs onto the resource elements in the corresponding physical resource block according to the sequence numbers of the eREGs corresponding to the resource elements not used to transmit the DMRS in the physical resource block corresponding to the second slot or the second subframe.

A mapping rule for mapping each eCCE onto the eREGs includes:

in the $f^{th}$ subframe or slot, a sequence number of the $n^{th}$ eREG in a physical resource block pair corresponding to the $f^{th}$ subframe or slot slot being:

$K^f(n)=K((n+p) \bmod N)$, where $K^f(n)$ is the sequence number of the $n^{th}$ eREG corresponding to a first eCCE in the physical resource block pair in the $f^{th}$ subframe or slot, K(n) is the sequence number of the $n^{th}$ eREG corresponding to the first eCCE in the physical resource block pair in a first subframe or a first slot slot, n=0, 1, . . . , or N−1, and p is a step length of the cyclic shift.

According to a tenth aspect, an embodiment of the present invention provides a control channel transmission apparatus, where the apparatus includes:

a determining unit, configured to determine L physical resource block pairs that are used to transmit a control channel, and group resource elements except a demodulation reference signal DMRS in each physical resource block pair of the L physical resource block pairs into at least one eREG, where L is an integer greater than 0;

an obtaining and mapping unit, configured to obtain, according to an aggregation level of the control channel, eCCEs that form the control channel, map the eCCEs onto the eREG, and map the eREG onto corresponding resource elements in the L physical resource block pairs, where a sequence number of an eREG corresponding to an RE of a first physical resource block pair of the L physical resource block pairs of the first transmission node is obtained by performing a cyclic shift for a sequence number of an eREG corresponding to an RE of a first physical resource block pair in physical resource block pairs of a second transmission node; and a sending unit, configured to send the eCCE by using the resource elements included in the eREG mapped from the eCCE.

The obtaining a sequence number of an eREG corresponding to an RE of a first physical resource block pair of the L physical resource block pairs of the first transmission node by performing a cyclic shift for a sequence number of an eREG corresponding to an RE of a first physical resource block pair in physical resource block pairs of a second transmission node includes:

determining the sequence number of the eREG corresponding to the RE of the first physical resource block pair of the physical resource block pairs of the first transmission node by using the following formula:

$$K^t=(K+X) \bmod N$$

where, $K^t$ is the sequence number of the eREG corresponding to the RE in the first physical resource block pair of the first transmission node, K is the sequence number of the eREG corresponding to the RE in the first physical resource block pair of the second transmission node, X is a parameter related to a virtual cell or a physical cell or a carrier, for example, X is a virtual cell ID and a value of X is the same as a value of X in a DMRS scrambling sequence generator of an ePDCCH or a PDSCH, and N is the number of eREGs included in each physical resource block pair.

A rule for mapping the eCCE onto the eREGs is determined by the following rule:

determining, by using the following formula, a sequence number of the $i^{th}$ eREG mapped from the eCCE of the control channel transmitted by the first transmission node:

$$K^t(i)=K(i+X) \bmod N$$

where, $K^t$ is a sequence number of the $i^{th}$ eREG mapped from the eCCE of the control channel transmitted by the first transmission node, K is a sequence number of the $i^{th}$ eREG mapped from the eCCE of the control channel transmitted by the second transmission node, X is a parameter related to a virtual cell or a physical cell or a carrier, for example, X is a virtual cell ID and a value of X is the same as a value of X in a DMRS scrambling sequence generator of an ePDCCH or a PDSCH, N is the number of eREGs in each physical resource block pair, and i=0, 1, . . . , or N−1.

According to an eleventh aspect, an embodiment of the present invention provides a control channel transmission apparatus, where the apparatus includes:

a first processor, configured to determine L physical resource block pairs that are used to transmit a control channel, where L is an integer greater than 0, and the control channel is formed by at least one eCCE, where the first processor is further configured to group resource elements except a demodulation reference signal DMRS in each physical resource block pair of the L physical resource block pairs into N eREGs, and calculate the number of valid resource elements except other overheads in each eREG of the N eREGs in each of the physical resource block pairs, where N is an integer greater than 0, and the other overheads include at least one of the following: a common reference signal CRS, a physical downlink control channel PDCCH, a physical broadcast channel PBCH, a positioning reference signal PRS, a primary synchronization signal PSS, and a secondary synchronization signal SSS; and the first processor is further configured to map each of the eCCEs onto M eREGs according to the number of valid resource elements included in each eREG of the N eREGs of each physical resource block pair, where M is an integer greater than 0; and the transmitter is further configured to send the eCCE by using the resource elements included in the eREG.

In a first possible implementation manner of the eleventh aspect, the first processor is specifically configured to group N eREGs in each of the physical resource block pairs into a first eREG group and a second eREG group according to the number of valid resource elements included in the eREG, and map each eCCE onto M eREGs of the first eREG group and the second eREG group, where: in the M eREGs mapped from each eCCE, the first M/2 eREGs of the M eREGs are in the first eREG group, the number of valid resource elements included in each eREG of the first M/2 eREGs is a different value, the last M/2 eREGs of the M eREGs are in the second eREG group, and the number of valid resource elements included in each eREG of the last M/2 eREGs is a different value.

In a second possible implementation manner of the eleventh aspect, the first processor is specifically configured to perform the following steps: numbering the N eREGs in each of the physical resource block pairs as 0, 1, 2, . . . , N−1, and using $S^i$ to denote a set of eREGs in the N eREGs, where the number of valid resource elements included in each eREG in the set is $D^i$ (i=1, 2, . . . , t), $D^1<D^2< \dots <D^t$, and t is an integer greater than 0; selecting one eREG respectively from each of the sets $S^1$, $S^t$, $S^2$, $S^{t-1}$ . . . sequentially until M eREGs are selected in total, and mapping one eCCE in the at least one eCCE onto M eREGs; and removing the selected eREGs from corresponding sets, reselecting M eREGs, and mapping another eCCE in the at least one eCCE onto the reselected M eREGs until all the N eREGs of the physical resource block pair are mapped onto.

With reference to the eleventh aspect and the second possible implementation manner of the eleventh aspect, in a third possible implementation manner, the first processor is specifically configured to number the N eREGs in each of the physical resource block pairs as 0, 1, 2, . . . , N−1, and use $S^i$ to denote a set of eREGs in the N eREGs, where the number of valid resource elements included in each eREG in the set is $D^i$ (i=1, 2, . . . , t), $D^1<D^2< \dots <D^t$, and t is an integer greater than 0; sort the $S^i$ in ascending order of $D^i$ in the $S^i$ into $S^1$, $S^2$, . . . , $S^t$, where the eREGs in the set $S^i$ are sorted in ascending order of sequence numbers of the eREGs; group the sorted N eREGs into p groups by putting every M/2 eREGs into one group, where the $k^{th}$ group includes a $((k-1)*M/2+1)^{th}$ eREG, a $((k-1)*M/2+2)^{th}$ eREG, . . . , and a $(k*M/2)^{th}$ eREG in a sorted sequence, where k=0, 1, . . . , p; and map the eCCEs onto the eREGs included in the $x^{th}$ group and the $(p-x)^{th}$ group, where x is any value in 0, 1, . . . , p.

In a fourth possible implementation manner of the eleventh aspect, the first processor is configured to perform step 21, where step 21 is: numbering the N eREGs in each of the physical resource block pairs as 0, 1, 2, . . . , N−1, using $S^i$ to denote a set of eREGs in the N eREGs, where the number of valid resource elements included in each eREG in the set is $D^i$ (i=1, 2, . . . , t), $D^1<D^2< \ldots <D^t$, and t is an integer greater than 0, and sorting the $S^i$ in ascending order of $D^i$ in the $S^i$ into:

$S^1, S^2, \ldots, S^t$, where the eREGs in the set $S^i$ are sorted in ascending order of sequence numbers of the eREGs;

the first processor is further configured to perform step 22, where step 22 is: according to the set sorting in step 21, expressing $S^1 \ldots S^a$ sorted out of the sets $S^1$ to $S^a$ as a sequential set group, and expressing $S^t \ldots S^{a+1}$ sorted out of the set $S^{a+1}$ to the set $S^t$ as a reverse set group; and selecting a set $S^i$ in the sequential set group and the reverse set group alternately and sequentially according to a value of i, selecting one eREG from one set $S^i$ respectively according to a sequence number of the eREG in the set $S^i$ until M eREGs are selected, and mapping one eCCE in the at least one eCCE onto the selected M eREGs, where a=t/2 when t is an even number, and a=(t+1)/2 when t is an odd number;

the first processor is further configured to perform step 23, where step 23 is: removing the selected eREGs from corresponding sets;

the first processor performs sorting again according to step 21; and the first processor selects M eREGs according to step 22, and maps another eCCE in the at least one eCCE onto the reselected M eREGs until all the N eREGs of the physical resource block pair are mapped onto.

In a fifth possible implementation manner of the eleventh aspect, the first processor is further configured to perform step 31, where step 31 is: numbering the N eREGs in each of the physical resource block pairs as 0, 1, 2, . . . , N−1, using $S^i$ to denote a set of eREGs in the N eREGs, where the number of valid resource elements included in each eREG in the set is $D^i$ (i=1, 2, . . . , t), $D^1<D^2< \ldots <D^t$, and t is an integer greater than 0, and sorting the $S^i$ in ascending order of the number $D^i$ of valid resource elements included in each eREG in the $S^i$ into:

$S^1, S^2, \ldots, S^t$, where the eREGs in the set $S^i$ are sorted in ascending order of sequence numbers of the eREGs;

the first processor is further configured to perform step 32, where step 32 is: according to the set sorting in step 31, expressing $S^1 \ldots S^a$ sorted out of the sets $S^1$ to $S^a$ as a sequential set group, and expressing $S^t \ldots S^{a+1}$ sorted out of the set $S^{a+1}$ to the set $S^t$ as a reverse set group; and selecting a set $S^i$ in the sequential set group and the reverse set group alternately and sequentially according to a value of i, and selecting one eREG from one set $S^i$ respectively according to a sequence number of the eREG in the set $S^i$ until a group of M eREGs are selected, where a=t/2 when t is an even number, and a=(t+1)/2 when t is an odd number;

the first processor is further configured to perform step 33: removing the selected eREGs from corresponding sets;

the first processor performs sorting again according to step 31;

the first processor reselects another group of M eREGs according to step 32 until all the N eREGs of the physical resource block pair are selected; and the first processor is further configured to perform step 34: grouping the L physical resource block pairs into floor(L/M) physical resource block groups by putting every M physical resource block pairs into one group, mapping the selected M eREGs in each group onto M physical resource block pairs in each of the floor(L/M) physical resource block groups respectively, and mapping each eCCE in the L physical resource block pairs onto the M eREGs respectively, where floor refers to rounding down.

In a sixth possible implementation manner of the eleventh aspect, the first processor maps, according to steps 31 to 35, one eCCE in the at least one eCCE onto P eREGs in the physical resource block pairs that include the PBCH and the PSS/SSS and onto (M-P) eREGs in the physical resource block pairs that do not include the PBCH or the PSS/SSS until all the eREGs in the L physical resource block pairs are mapped onto.

In a seventh possible implementation manner, the first processor is configured to: when L=1, calculate a sequence number of the $j^{th}$ eREG corresponding to the $i^{th}$ eCCE by using Loc_eCCE_i_j=(i+j*K) mod N, and then calculate the sequence numbers, in the L=1 physical resource block pair, of the M eREGs corresponding to each eCCE; or when L>1, first, calculate the sequence number of the $i^{th}$ eREG corresponding to the $i^{th}$ eCCE by using Dis_eCCE_i_j=(Loc_eCCE_t_j+p*K) mod N, and then calculate the sequence number of a corresponding physical resource block pair of the L physical resource block pairs that include the $j^{th}$ eREG corresponding to the $i^{th}$ eCCE by using R=(floor(i/(M*K))*M+j) mod L, so as to calculate the sequence numbers, in the corresponding physical resource block pair, of the M eREGs corresponding to each eCCE, where Loc_eCCE_t_j=(t+j*K) mod N, t=floor(i/L), p=i mod L, and R=0, 1, . . . , or L−1; or when L>1, first, calculate the sequence number of the $j^{th}$ eREG corresponding to the $i^{th}$ eCCE by using Dis_eCCE_i_j=((t+j*K) mod N+p*K)mod N, and then calculate the sequence number of a corresponding physical resource block pair of the L physical resource block pairs that include the $j^{th}$ eREG corresponding to the $i^{th}$ eCCE by using R=(floor(i/(M*K))*M+j) mod L, so as to calculate the sequence numbers, in the corresponding physical resource block pair, of the M eREGs corresponding to each eCCE, where t=floor(i/L), p=i mod L, and R=0, 1, . . . , or L−1; or when L>1, first, calculate the sequence number of the $j^{th}$ eREG corresponding to the $i^{th}$ eCCE by using Dis_eCCE_i_j=(i+j*K) mod N, and then calculate the sequence number of a corresponding physical resource block pair of the L physical resource block pairs that include the $j^{th}$ eREG corresponding to the $i^{th}$ eCCE by using R=(floor(i/(M*K))*M+j) mod L, so as to calculate the sequence numbers, in the corresponding physical resource block pair, of the M eREGs corresponding to each eCCE, where N is the number of eREGs of each physical resource block pair, K is the number of eCCEs of each physical resource block pair, M is the number of eREGs corresponding to each eCCE, i is the sequence numbers of the eCCEs that form the control channel, i=0, 1, . . . , or L*K−1, and j is the sequence numbers of the eREGs included in the physical resource block pair, j=0, 1, . . . , or M−1.

When the number L of configured physical resource block pairs is greater than the number M of eREGs mapped from each eCCE, it is only needed to group the L configured physical resource block pairs into floor(L/M) or (floor(L/M)+1) groups first by putting every M physical resource block pairs into one group, where the number of physical resource block pairs included in each group is M or L−floor (L/M). In each group (at this time, the number of physical resource block pairs in each group is L1=M or L−floor(L/M)), the foregoing formula is applied respectively to obtain the eCCE-to-eREG mapping on all the L physical resource block pairs. A sequence number $w_i$ of a PRB pair in the $i^{th}$ group, which is obtained according to the foregoing formula, is operated according to a formula $w=w_i+i*M$ to obtain a sequence number w of the PRB pair in all the L physical resource block pairs, where i=0, 1, . . . , floor(L/M)−1 or floor(L/M).

For example, when L=16 and M=8, the L physical resource block pairs are grouped into two groups first by putting every 8 physical resource block pairs into one group. For example, the first 8 physical resource block pairs form a first group, and the last 8 physical resource block pairs form a second group. In the first group, L=8 and M=8 are substituted into the foregoing formula to obtain the eREGs mapped from all eCCEs in the first 8 physical resource block pairs and obtain sequence numbers $w_1$ of corresponding PRB pairs in this group; and $w_1$ is substituted into a formula $w_1+0*8$ to obtain the sequence numbers w of the PRB pairs in the L physical resource block pairs. Similarly, in the second group, L=8 and M=8 are substituted into the foregoing formula to obtain the eREGs mapped from all eCCEs in the last 8 physical resource block pairs and obtain sequence numbers $w_2$ corresponding PRB pairs in this group; and $w_2$ is substituted into a formula $w_2+1*8$ to obtain the sequence numbers w of the PRB pairs in the L physical resource block pairs.

According to a twelfth aspect, an embodiment of the present invention provides a control channel transmission apparatus, including:

a second processor, configured to determine L physical resource block pairs that are used to transmit a control channel, and group resource elements except a demodulation reference signal DMRS in each physical resource block pair of the L physical resource block pairs into at least one eREG, where L is an integer greater than 0, where the second processor is further configured to obtain, according to an aggregation level of the control channel, the number of eCCEs that form the control channel and sequence numbers of eREGs mapped from each eCCE; and the second processor is further configured to: when L is greater than 1, number the eREGs differently in different physical resource block pairs of the L physical resource block pairs; or, when L is equal to 1, number the eREGs of the physical resource block pair differently according to different transmitting time points of the control channel; and the transmitter is further configured to send the eCCE by using the resource elements included in the eREGs corresponding to the sequence numbers of the eREGs mapped from the eCCE.

According to a thirteenth aspect, an embodiment of the present invention provides a control channel transmission apparatus, including:

a third processor, configured to determine L physical resource block pairs that are used to transmit a control channel, and group resource elements except a demodulation reference signal DMRS in each physical resource block pair of the L physical resource block pairs into at least one eREG, where L is an integer greater than 0, where the third processor is further configured to obtain, according to an aggregation level of the control channel, the number of eCCEs that form the control channel and eREGs mapped from each eCCE, where a rule for determining the eREGs mapped from each eCCE is related to a cell ID or a user equipment UE ID; and a fifth transmitter is further configured to send the eCCE by using the resource elements included in the eREG.

According to a fourteenth aspect, an embodiment of the present invention provides a control channel transmission apparatus, including:

a fourth processor, configured to determine L physical resource block pairs that are used to transmit a control channel, and group resource elements except a demodulation reference signal DMRS in each physical resource block pair of the L physical resource block pairs into at least one eREG, where L is an integer greater than 1, where the fourth processor is further configured to obtain, according to an aggregation level of the control channel, eCCEs that form the control channel, and map the eCCEs onto the eREG, where REs included in the eREG mapped from the eCCEs are located in the same locations on a time domain and a frequency domain in the corresponding physical resource block pairs; and map the eREG onto a corresponding resource element in the L physical resource block pairs, where a sequence number of an eREG corresponding to an RE of a second physical resource block pair of the L physical resource block pairs is obtained by performing a cyclic shift for a sequence number of an eREG corresponding to an RE of a first physical resource block pair of the L physical resource block pairs; and a third transmitter, configured to send the eCCE by using the resource elements included in the eREGs mapped from the eCCE.

According to a fifteenth aspect, an embodiment of the present invention provides a control channel transmission apparatus, including:

a fifth processor, configured to determine L physical resource block pairs that are used to transmit a control channel, and group resource elements except a demodulation reference signal DMRS in each physical resource block pair of the L physical resource block pairs into at least one eREG, where L is an integer greater than 0, where the fifth processor is further configured to obtain, according to an aggregation level of the control channel, eCCEs that form the control channel, map the eCCEs onto the eREG, and map the eREG onto corresponding resource elements in the L physical resource block pairs, where a sequence number of an eREG corresponding to an RE of a first physical resource block pair of the L physical resource block pairs of the first transmission node is obtained by performing a cyclic shift for a sequence number of an eREG corresponding to an RE of a first physical resource block pair in physical resource block pairs of a second transmission node; and a sixth transmitter, configured to send the eCCE by using the resource elements included in the eREGs corresponding to the sequence numbers of the eREGs mapped from the eCCE.

According to a sixteenth aspect, an embodiment of the present invention provides a control channel transmission apparatus, including:

a sixth processor, configured to determine L physical resource block pairs that are used to transmit a control channel, and group resource elements except a demodulation reference signal DMRS in each physical resource block pair of the L physical resource block pairs into at least one eREG, where L is an integer greater than 0, where the sixth processor is further configured to obtain, according to an aggregation level of the control channel, eCCEs that form the control channel and sequence numbers of eREGs mapped from each eCCE; and the sixth processor is further configured to map the eREGs onto the resource elements in the physical resource block pairs corresponding to different subframes or different slots; and a third transmitter, configured to send the eCCE by using the resource elements included in the eREGs corresponding to the sequence numbers of the eREGs mapped from the eCCE.

The sixth processor is configured to:

number the eREGs corresponding to the resource elements in a physical resource block corresponding to a first subframe or a first slot;

perform a cyclic shift for the sequence numbers of the eREGs corresponding to the resource elements in the physical resource block corresponding to the first subframe or the first slot to obtain sequence numbers of the eREGs corresponding to the resource elements in a physical resource block corresponding to a second subframe or a second slot; and map the eREGs onto the resource elements in the corresponding physical resource block according to the sequence numbers of the eREGs corresponding to the resource elements in the physical resource block corresponding to the second subframe or the second slot.

A rule for mapping the eREGs onto the resource elements in the physical resource block pairs corresponding to different subframes or different slots includes:

in the $f^{th}$ subframe or slot, a sequence number of an eREG corresponding to a first RE in a physical resource block pair corresponding to the $f^{th}$ subframe or slot slot being:

$K^f=((K+p) \bmod N)$, where $K^f$ is a sequence number of an eREG corresponding to the first RE in the physical resource block pair corresponding to the $f^{th}$ subframe or slot, K is a sequence number of an eREG corresponding to an RE corresponding to a first subframe or slot and located in the same location as the first RE on a time domain and a frequency domain, and p is a step length of a cyclic shift.

The sixth processor is configured to:

classify resource elements in the physical resource block corresponding to the first slot or the first subframe into resource elements used to transmit a DMRS and resource elements not used to transmit the DMRS, perform a cyclic shift for a sequence number of an eREG corresponding to a resource element used to transmit the DMRS in the physical resource block corresponding to the first slot or the first subframe to obtain a sequence number of an eREG corresponding to a resource element used to transmit the DMRS in the physical resource block corresponding to the second slot or the second subframe, and perform a cyclic shift for a sequence number of an eREG corresponding to a resource element not used to transmit the DMRS in the physical resource block corresponding to the first slot or the first subframe to obtain a sequence number of an eREG corresponding to a resource element not used to transmit the DMRS in the physical resource block corresponding to the second slot or the second subframe; and map the eREGs onto the resource elements in the corresponding physical resource block according to the sequence numbers of the eREGs corresponding to the resource elements used to transmit a DMRS in the physical resource block corresponding to the second slot or the second subframe, or map the eREGs onto the resource elements in the corresponding physical resource block according to the sequence numbers of the eREGs corresponding to the resource elements not used to transmit the DMRS in the physical resource block corresponding to the second slot or the second subframe.

A mapping rule for mapping each eCCE onto the eREGs includes:

in the $f^{th}$ subframe or slot, a sequence number of the $n^{th}$ eREG in a physical resource block pair corresponding to the $f^{th}$ subframe or slot slot being:

$K^f(n)=K((n+p) \bmod N)$, where $K^f(n)$ is the sequence number of the $n^{th}$ eREG corresponding to a first eCCE in the physical resource block pair in the $f^{th}$ subframe or slot, K(n) is the sequence number of the $n^{th}$ eREG corresponding to the first eCCE in the physical resource block pair in a first subframe or a first slot slot, n=0, 1, . . . , or N−1, and p is a step length of the cyclic shift.

Through the foregoing solutions, a certain number of eREGs are selected to form an eCCE according to the number of valid resource elements except overheads in each eREG, which can keep a balance between actual sizes of the formed eCCEs and further ensure a performance balance between the eCCEs. In addition, after the sequence numbers of the eREGs that form each eCCE are determined, the eREGs are numbered differently between the physical resource block pairs; or, the eREGs of each physical resource block pair are numbered differently at different transmitting time points of the control channel, or a cyclic shift is performed for the eREG-to-resource element mapping on the physical resource block pair between different subframes or slots; or, the cyclic shift is performed for the eREG-to-resource element mapping on the physical resource block pair between different transmission nodes; or, the cyclic shift is performed for the eREG-to-resource element mapping between different physical resource block pairs, which can also keep a balance between actual sizes of the formed eCCEs, further ensure a performance balance when demodulating each eCCE, and reduce implementation complexity of a scheduler.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Embodiment 1

Figure 1:
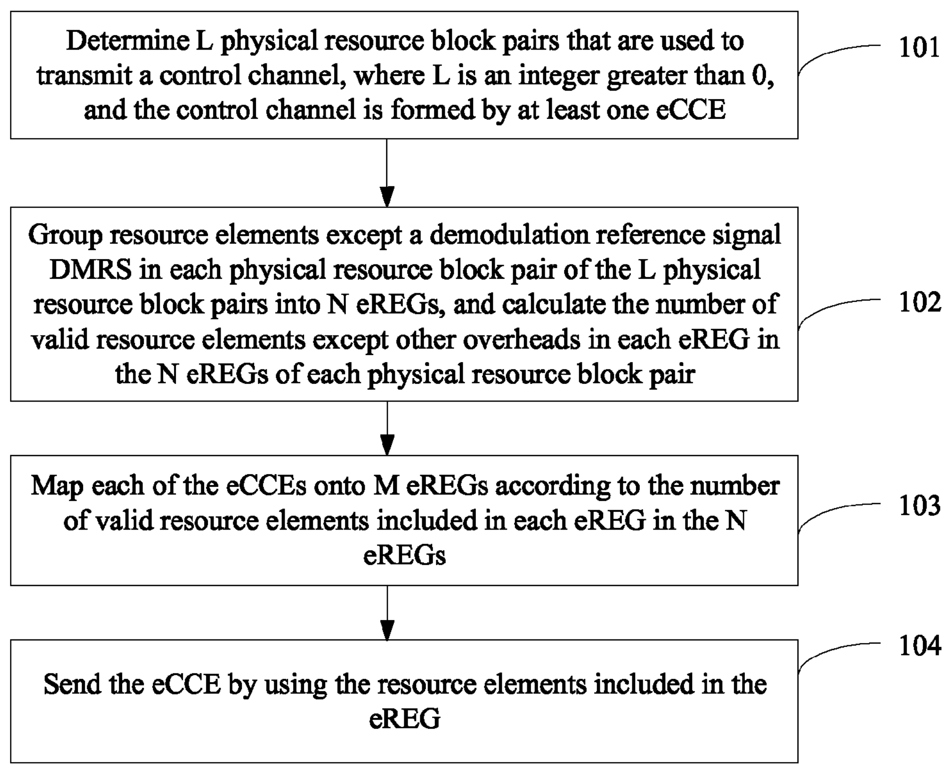
FIG. 1 is a schematic flowchart of a control channel transmission method according to Embodiment 1.

The embodiment of the present invention provides a control channel transmission method. As shown in FIG. 1, the method includes the following steps:

101. Determine L physical resource block pairs that are used to transmit a control channel, where L is an integer greater than 0, and the control channel is formed by at least one eCCE.

When data is transmitted on a control channel, the physical resource block pairs occupied by the control channel are determined first. In the embodiment of the present invention, it is assumed that the control channel occupies L physical resource block pairs. Meanwhile, the number of eCCEs that form the control channel can be obtained according to an aggregation level of the control channel. The control channel is formed by at least one eCCE.

102. Group resource elements except a demodulation reference signal DMRS in each physical resource block pair of the L physical resource block pairs into N eREGs, and calculate the number of valid resource elements except other overheads in each eREG of the N eREGs of each of the physical resource block pairs.

Each physical resource block pair of the L physical resource block pairs includes several REs. The REs except the DMRS in each physical resource block pair are grouped into N groups, that is, form N eREGs, where N is an integer greater than 0.

The N eREGs in each physical resource block pair may have different overheads. The overheads include at least one of the following: a CRS, a PDCCH, a PRS, a PBCH, a PSS, and an SSS; and may include no CSI-RS (Channel State Information-Reference Signal, channel state information-reference signal), which leads to a difference between the numbers of valid REs used to transmit the control channel in each eREG. The number of valid REs except the overhead in each eREG of the N eREGs of each physical resource block pair can be calculated.

103. Map each of the eCCEs onto M eREGs according to the number of valid resource elements included in each eREG of the N eREGs.

After the number of valid REs except the overhead in each eREG of the N eREGs of each physical resource block pair is calculated, every M eREGs may be selected to form an eCCE according to the number of valid REs included in each eREG of the N eREGs of each of the physical resource block pairs, so that the difference between the numbers of valid resource elements occupied by each eCCE is not greater than 5.

Optionally, N eREGs in each of the physical resource block pairs may be grouped into a first eREG group and a second eREG group according to the number of valid resource elements included in the eREG, and each eCCE may be mapped onto M eREGs of the first eREG group and the second eREG group, where: in the M eREGs mapped from each eCCE, the first M/2 eREGs of the M eREGs are in the first eREG group, the number of valid resource elements included in each eREG of the first M/2 eREGs is a different value, the last M/2 eREGs of the M eREGs are in the second eREG group, and the number of valid resource elements included in each eREG of the last M/2 eREGs is a different value.

After the number of valid REs except the overhead in each eREG of the N eREGs of each physical resource block pair is calculated, the N eREGs in each of the physical resource block pairs are grouped into two groups according to the number of valid resource elements: a first eREG group and a second eREG group. A maximum value of the number of valid REs included in the eREGs in one group is less than or equal to a minimum value of the number of valid REs included in the eREGs in the other group. The number of eREGs included in the first eREG group is equal to that in the second eREG group, or a difference between the numbers of eREGs included in the two groups is 1, depending on parity of N. When each of the eCCEs is mapped onto M eREGs, the first M/2 eREGs of the M eREGs are in the first eREG group, and the number of valid resource elements in each of the M/2 eREGs is a different value; and the last M/2 eREGs are in the second eREG group, and the number of valid resource elements in each of the M/2 eREGs is a different value. Certainly, when types of the numbers of valid resources of the eREGs are less than the value of M, the number of valid resource elements in each of the last M/2 eREGs or the first M/2 eREGs may also be a same value.

104. Send the eCCE by using the resource elements included in the eREG.

The eCCE is mapped to M eREGs according to step 103 until at least one eCCE that forms the control channel is mapped onto the different M eREGs respectively, so that the corresponding eCCE can be sent by using the REs included in the M eREGs.

Optionally, when the M eREGs mapped from the eCCE are on the same physical resource block pair, the selecting M eREGs to form an eCCE according to the number of actual REs included in each eREG of the N eREGs of each of the physical resource block pairs in step 103 includes: numbering the N eREGs in each of the physical resource block pairs as 0, 1, 2, . . . , N−1, and using $S^i$ to denote a set of eREGs in the N eREGs, where the number of valid resource elements included in each eREG in the set is $D^i$(i=1, 2, . . . , t), $D^1<D^2< \ldots <D^t$, and t is an integer greater than 0; selecting one eREG respectively from each of the sets $S^1$, $S^t$, $S^2$, $S^{t-1}$ . . . sequentially until M eREGs are selected in total, and mapping one eCCE in the at least one eCCE onto M eREGs; and removing the selected eREGs from corresponding sets, reselecting M eREGs, and mapping another eCCE in the at least one eCCE onto the reselected M eREGs until all the N eREGs of the physical resource block pair are mapped.

It is assumed that M=4 and N=8, and each of the eREGs numbered 0 and 3 in $S^1$ occupies 11 valid REs; each of the eREGs numbered 2 and 6 in $S^2$ occupies 12 valid REs; each of the eREGs numbered 1 and 4 in $S^3$ occupies 13 valid REs; and each of the eREGs numbered 5 and 7 in $S^4$ occupies 14 valid REs. First, according to the number of valid REs included in each eREG, the eREGs are sorted into: $S^1$, $S^2$, $S^3$, and $S^4$. Then one eREG is selected from $S^1$, $S^4$, $S^2$, and $S^3$ respectively, where the eREG whose sequence number is X is denoted by eREG#X, and therefore, the selected M=4 eREGs may be (eREG#0, eREG#7, eREG#2, and eREG#4). One eCCE in the at least one eCCE is mapped onto M eREGs. Then the selected eREGs (eREG#0, eREG#7, eREG#2, eREG#4) are removed from the sorted sequence, sorting is performed again, M=4 eREGs (eREG#3, eREG#5, eREG#6, eREG#1) are selected, and another eCCE in the at least one eCCE is mapped onto the reselected 4 eREGs. Now the sequence numbers of all the 8 eREGs of the physical resource block pair are mapped onto. In this way, the two eCCEs in the control channel can be transmitted on the corresponding mapped eREGs. The number of valid REs included in the eREG mapped from one of the eCCEs is 50, and the number of valid REs included in the eREG mapped from the other eCCE is also 50, so that the actual sizes of the two eCCEs are balanced.

Optionally, the mapping each of the eCCEs onto M eREGs according to the number of valid resource elements included in each eREG of the N eREGs may further include:

numbering the N eREGs in each of the physical resource block pairs as 0, 1, 2, . . . , N−1, and using $S^i$ to denote a set of eREGs in the N eREGs, where the number of valid resource elements included in each eREG in the set is $D^i$(i=1, 2, . . . , t), $D^1<D^2< \ldots <D^t$, and t is an integer greater than 0; sorting the $S^i$ in ascending order of $D^i$ in the $S^i$ into $S^1$. $S^2$, . . . , $S^t$, where the eREGs in the set $S^i$ are sorted in ascending order of sequence numbers of the eREGs; grouping the sorted N eREGs into p groups by putting every M/2 eREGs into one group, where the $k^{th}$ group includes a $((k-1)*M/2+1)^{th}$ eREG, a $((k-1)*M/2+2)^{th}$ eREG, . . . , and a $(k*M/2)^{th}$ eREG in a sorted sequence, where k=0, 1, p; and mapping the eCCEs onto the eREGs included in the $x^{th}$ group and the $(p-x)^{th}$ group, where x is any value in 0, 1, . . . , p.

Optionally, when the M eREGs mapped from the eCCE are on the same physical resource block pair, the mapping each eCCE onto the M eREGs according to the number of valid resource elements included in each eREG of the N eREGs in step 103 includes the following steps:

Step 21: Number the N eREGs in each of the physical resource block pairs as 0, 1, 2, . . . , N−1, and use $S^i$ to denote a set of eREGs in the N eREGs, where the number of valid resource elements included in each eREG in the set is $D^i$(i=1, 2, . . . , t), $D^1<D^2< \ldots <D^t$, and t is an integer greater than 0; and sort the $S^i$ in ascending order of $D^i$ in the $S^i$ into $S^1$, $S^2$, . . . , $S^t$, where the eREGs in the set $S^i$ are sorted in ascending order of sequence numbers of the eREGs.

The N eREGs included in each physical resource block pair in the L physical resource block pair are numbered 0, 1, 2, . . . , N−1. In step 102, the number of valid REs included in the N eREGs is calculated as D. Here, some eREGs in the N eREGs include valid REs of the same number, and other eREGs include valid REs of the different numbers. The numbers of valid REs included in eREGs comes in t types, which are $D^1$, $D^2$, . . . , $D^t$ respectively, where $D^1< D^2< \ldots <D^t$, t is an integer greater than or equal to 0 and less than or equal to N. $S^i$ denotes a set of all eREGs in the N eREGs, where the number of valid REs included in each eREG in the set is $D^i$, and therefore, the sets of eREGs in the physical resource block pair are $S^1$, $S^2$, . . . , and $S^t$. According to the number of included valid REs and the eREG sequence number, the N eREGs are sorted into $S^1$, $S^2$, . . . , and $S^t$, where the number of valid REs included in each eREG in the set $S^1$ is $D^1$. By analogy, the number of valid REs included in each eREG in the set $S^i$ is $D^i$. The number of valid REs included in each eREG in the set $S^1$ is the smallest, and the number of valid REs included in each eREG in the set $S^t$ is the greatest. The eREGs in the set $S^i$ are sorted in ascending order of the sequence numbers of the eREGs. For example, the sequence numbers of the eREGs in $S^i$ are 0, 4, and 3, in which the eREG whose sequence number is X is denoted by eREG#X, and therefore, the eREGs in $S^i$ are sorted into {eREG#0≤eREG#3≤eREG#4}.

Step 22: According to the set sorting in step 21, express $S^1 \ldots S^a$ sorted out of the sets $S^1$ to $S^a$ as a sequential set group, and express $S^1 \ldots S^{a+1}$ sorted out of the set $S^{a+1}$ to the set $S^t$ as a reverse set group; and select a set $S^i$ in the sequential set group and the reverse set group alternately and sequentially according to a value of i, select one eREG from one set $S^i$ respectively according to a sequence number of the eREG in the set $S^1$ until M eREGs are selected, and map one eCCE in the at least one eCCE onto the selected M eREGs, where a=t/2 when t is an even number, and a=(t+1)/2 when t is an odd number.

When M is greater than t, after t eREGs are selected from the sets $S^1$ to $S^t$ according to step 22, the selected eREGs are removed, and eREGs are still selected from the sets $S^1$ to $S^t$ according to step 22 until M eREGs are selected.

According to the selection method in step 22, because the N eREGs in each physical resource block pair are sorted identically, for one of the physical resource block pairs, the set $S^1$ is selected in the sequential set group sequentially according to the sequence from the set $S^1$ to the set $S^a$, and then the set $S^t$ is selected alternately in the reverse set group sequentially according to the sequence from the set $S^t$ to the set $S^{a+1}$. Subsequently, a set $S^2$ is further selected alternately in the sequential set group sequentially according to the sequence from the set $S^1$ to the set $S^a$, and a set $S^{t-1}$ is selected in the reverse set group sequentially according to the sequence from the set $S^t$ to the set $S^{a+1}$. In this way, according to the sequence and in an alternate manner, a set is selected in the sequential set group sequentially and a set is selected in the reverse set group sequentially until M sets are selected. In the selected M sets, an eREG with the smallest sequence number is selected in the sets of the sequential set group, and an eREG with the greatest sequence number is selected in the sets of the reverse set group, so that a group of M eREGs are selected. One eCCE in the at least one eCCE is mapped onto the selected M eREGs. In the scenario described here, M is less than or equal to t. When M is greater than t, t eREGs may be selected from the sets $S^1$ to $S^t$ in the way described in step 22, the selected t eREGs are removed from the sequence $\{S^1\}<\{S^2\}< \ldots <\{S^t\}$, eREGs are still selected in the way described in step 22 until M eREGs are selected, and one eCCE in the at least one eCCE is mapped onto the selected M eREGs.

Step 23: Remove the selected eREGs from corresponding sets, perform sorting again and reselecting M eREGs according to step 21 and step 22, and map another eCCE in the at least one eCCE onto the reselected M eREGs until all the N eREGs of the physical resource block pair are mapped onto.

After the selected M eREGs are removed from the sorted sequence $S^1, S^2, \ldots, S^t$, the remaining eREGs are still sorted according to the number of included valid REs and the eREG sequence number in the way described in step 21, M eREGs are reselected in the way described in step 22, and another eCCE in the at least one eCCE is mapped onto the reselected M eREGs until all the N eREGs of the physical resource block pair are mapped onto.

For each physical resource block pair of the L physical resource block pairs, each eCCE is mapped onto M eREGs in the way described in steps 21 to 23, and then the corresponding eCCE can be sent by using the resource elements included in the M eREGs mapped from the eCCE.

Specifically, a specific example of the method described in steps 21 to 23 is given below:

It is assumed that a physical resource block pair includes 8 eREGs that are numbered 0, 1, . . . , 7. The control channel is formed by 4 eCCEs according to the aggregation level of the control channel. Each eCCE is mapped onto 2 eREGs. The eREG whose sequence number is X is denoted by eREG#X. The number of valid REs except overhead in the 8 eREGs is as follows: The number of valid REs except overhead in eREG#0, eREG#1, REG#3, and eREG#6 is 11, and the number of valid REs except overhead in eREG#2, eREG#4, REG#5, and eREG#7 is 14. A set of the 4 eREGs (eREG#0, eREG#1, REG#3, and eREG#6) corresponding to the number 11 is denoted by $S^1$, and a set of the 4 eREGs (eREG#2, eREG#4, REG#5, and eREG#7) corresponding to the number 14 is denoted by $S^2$.

First, step 21 is performed. According to the number of valid REs included in each eREG and the sequence numbers of the eREGs, the eREGs are sorted into {$S^1$: eREG#0, eREG#1, eREG#3, eREG#6} and {$S^2$: eREG#2, eREG#4, eREG#5, eREG#7}.

Subsequently, step 22 is performed. In this case, t=2 and M=2. The eREG#0 with the smallest sequence number is selected in $S^1$, and the eREG#7 with the greatest sequence number is selected in $S^2$. Now M=2 eREGs are selected. One eCCE in the 4 eCCEs is mapped onto the selected 2 eREGs: eREG#0 and eREG#7.

Subsequently, step 23 is performed. The selected eREGs (eREG#0 and eREG#7) are removed, and step 21 and step 22 are performed again. The eREGs are sorted again into {$S^1$: eREG#1, eREG#3, eREG#6} and {$S^2$: eREG#2, eREG#4, eREG#5}. The eREG#1 with the smallest sequence number is selected in $S^1$, and the eREG#5 with the greatest sequence number is selected in $S^2$. Now M=2 eREGs are selected: eREG#1 and eREG#5. The second eCCE in the 4 eCCEs is mapped onto the selected M=2 eREGs: eREG#1 and eREG#5. In this way, the selected eREGs are removed and steps 21 and 22 are repeated until all the 8 eREGs in the physical resource block pair are mapped onto.

Finally, the 4 eCCEs are mapped onto the 8 eREGs respectively. The mapping result is:

eCCE 0: eREG#0 and eREG #7;

eCCE 1: eREG#1 and eREG #5;

eCCE 2: eREG#3 and eREG #4; and eCCE 3: eREG#6 and eREG #2.

Optionally, when the M eREGs mapped from each eCCE are distributed on L (L>1) physical resource block pairs, if the L physical resource block pairs have the same overhead, the mapping each eCCE onto the M eREGs according to the number of valid resource elements included in each eREG of the N eREGs in step 103 includes the following steps:

Step 31: Number the N eREGs in each of the physical resource block pairs as 0, 1, 2, . . . , N−1, and use $S^i$ to denote a set of eREGs in the N eREGs, where the number of valid resource elements included in each eREG in the set is $D^i$(i=1, 2, . . . , t), $D^1<D^2< \ldots <D^t$, and t is an integer greater than 0; and sort the $S^i$ in ascending order of the number $D^i$ of valid resource elements included in each eREG in the $S^i$ into $S^1$, $S^2$, $S^t$, where the eREGs in the set $S^i$ are sorted in ascending order of sequence numbers of the eREGs.

Here, the sorting method is the same as the sorting method described in step 21, the number of valid REs included in each eREG in the set $S^1$ is the smallest, and the number of valid REs included in each eREG in the set $S^t$ is the greatest. The eREGs in the set $S^i$ are sorted in ascending order of the sequence numbers of the eREGs. For example, the sequence numbers of the eREGs in $S^i$ are 0, 4, and 3, and therefore, the eREGs in $S^i$ are sorted into {eREG#0, eREG#3, eREG#4}.

Here, it should be noted that in the L physical resource block pairs, each physical resource block pair has the same overhead, N eREGs in each physical resource block pair have the same sequence number, and the eREGs that have the same sequence number include the same number of valid REs. Therefore, in each physical resource block pair, N eREGs are sorted identically.

Step 32: According to the set sorting in step 31, express $S^1 \ldots S^a$ sorted out of the sets $S^1$ to $S^a$ as a sequential set group, and express $S^t \ldots S^{a+1}$ sorted out of the set $S^{a+1}$ to the set $S^t$ as a reverse set group; and select a set $S^i$ in the sequential set group and the reverse set group alternately and sequentially according to a value of i, and select one eREG from one set $S^t$ respectively according to a sequence number of the eREG in the set $S^i$ until a group of M eREGs are selected, where a=t/2 when t is an even number, and a=(t+1)/2 when t is an odd number.

When M is greater than t, after t eREGs are selected from the sets $S^1$ to $S^t$ according to step 32, the selected eREGs are removed, and eREGs are still selected from the sets $S^1$ to $S^t$ according to step 32 until M eREG sequence numbers are selected.

Because the N eREGs in each physical resource block pair are sorted identically, for one of the physical resource block pairs, the set $S^1$ is selected in the sequential set group sequentially according to the sequence from the set $S^1$ to the set $S^a$, and then the set $S^t$ is selected alternately in the reverse set group sequentially according to the sequence from the set $S^t$ to the set $S^{a+1}$. Subsequently, a set $S^2$ is further selected alternately in the sequential set group sequentially according to the sequence from the set $S^1$ to the set $S^a$, and a set $S^{t-1}$ is selected in the reverse set group sequentially according to the sequence from the set $S^t$ to the set $S^{a+1}$. In this way, according to the sequence and in an alternate manner, a set is selected in the sequential set group sequentially and a set is selected in the reverse set group sequentially until M sets are selected. In the selected M sets, an eREG with the smallest sequence number is selected in the sets of the sequential set group, and an eREG with the greatest sequence number is selected in the sets of the reverse set group, so that a group of M eREGs are selected. Certainly, the foregoing describes a scenario in which M is less than or equal to t. When M is greater than t, t eREGs may be selected from the sets $S^1$ to $S^t$ in the way described in step 32, the selected t eREGs are removed from the sequence $S^1$, $S^2, \ldots, S^t$, and eREGs are still selected in the way described in step 32 until a group of M eREGs are selected.

Step 33: Remove the selected eREGs from corresponding sets, and perform sorting again and select another group of M eREGs according to step 31 and step 32 until all the N eREGs of the physical resource block pair are selected.

After the selected M eREGs are removed from the sorted sequence $\{S^1\}<\{S^2\}< \ldots <\{S^t\}$, the remaining eREGs are still sorted according to the number of included valid REs and the eREG sequence number in the way described in step 31, and a group of M eREGs are selected in the way described in step 32 until the sequence numbers of all the N eREGs in the physical resource block pair are selected.

Step 34: Group the L physical resource block pairs into floor(L/M) physical resource block groups by putting every M physical resource block pairs into one group, map the selected M eREGs in each group onto M physical resource block pairs in each of the floor(L/M) physical resource block groups respectively, and map each eCCE in the L physical resource block pairs onto the M eREGs respectively, where floor refers to rounding down.

If L is divisible by M, the L physical resource block pairs are grouped into L/M physical resource block groups by putting every M physical resource block pairs into one group. For example, if M=4 and L=4, the L physical resource blocks form a physical resource block group (physical resource block pair 0, physical resource block pair 1, physical resource block pair 2, and physical resource block pair 3); and, when the L value is not divisible by the M value, the remaining Q physical resource blocks and the (M-Q) physical resource blocks selected from the L physical resource blocks form a group of M physical resource blocks. If L=3 and M=4, the L physical resource block pairs are physical resource block pair 0, physical resource block pair 1, and physical resource block pair 2, respectively, and (4-3)=1 physical resource block in L=3 physical resource blocks is selected to form a group of 3 physical resource blocks with the 3 physical resource blocks, which may be (physical resource block pair 0, physical resource block pair 1, physical resource block pair 2, physical resource block pair 0). Similarly, the other two combinations should be (physical resource block pair 1, physical resource block pair 2, physical resource block pair 0, physical resource block pair 1) and (physical resource block pair 2, physical resource block pair 0, physical resource block pair 1, physical resource block pair 2).

In step 33, several groups of M eREGs are selected. Each group of M eREGs correspond respectively to M physical resource block pairs mapped onto each group in the physical resource block group to form M eREGs on several M physical resource block pairs. One eCCE is mapped onto M eREGs until all the M eREGs on the several M physical resource block pairs are mapped onto. That is, it is assumed that M=2 and L=2, a group of M=2 eREGs is (eREG#0, eREG1), and a physical resource block pair combination is (physical resource block pair 0, physical resource block pair 1). Therefore, the M eREGs are respectively mapped onto the M physical resource block pairs in each group in the physical resource block group to form 2 groups of M eREGs on the M physical resource block pairs: (physical resource block pair 0: eREG#0, physical resource block pair 1: eREG#1) and (physical resource block pair 0: eREG#1, physical resource block pair 1: eREG#0). One eCCE is mapped onto (physical resource block pair 0: eREG#0, physical resource block pair 1: eREG#1), and the other eCCE is mapped onto (physical resource block pair 0: eREG#1, physical resource block pair 1: eREG#0).

Specifically, a specific example of the method described in steps 31 to 35 is given below:

It is assumed that L=4, each physical resource block pair includes 8 eREGs, each eCCE is mapped onto 4 eREGs, and the 4 physical resource block pairs have the same overhead. One of the physical resource block pairs is used as an example. It is assumed that the overhead distribution in the physical resource block pair is: 24 DMRS REs, CRS REs of 2 antenna ports, PDCCHs of 2 OFDM symbols, and CSI-RSs of 4 antenna ports. After the overhead is deducted, the following sets are formed according to the actual size of each eREG:

$S^1$: Each eREG in {eREG#0, eREG#3} includes $D^1=11$ REs;

$S^2$: Each eREG in {eREG#2, eREG#6} includes $D^2=12$ REs;

$S^3$: Each eREG in {eREG#1, eREG#4} includes $D^3=13$ REs; and $S^4$: Each eREG in {eREG#5, eREG#7} includes $D^4=14$ REs.

First, step 31 is performed. According to the number of valid REs included in each eREG and the sequence number of each eREG, the eREGs may be sorted into {$S^1$: eREG#0, eREG#3}, {$S^2$: eREG#2, eREG#6}, {$S^3$: eREG#1, eREG#4}, and {$S^4$: eREG#5, eREG#7}.

Subsequently, step 32 is performed. In this case, t=4, the sequential set group is {$S^1$, $S^2$}, and the reverse set group is {$S^4$, $S^3$}. The eREG with the smallest sequence number, that is, eREG#0, is selected in $S^1$, the eREG with the greatest sequence number, that is, eREG#7, is selected in $S^4$, and then according to the sequence of the sequential set group and the reverse set group, the eREG with the smallest sequence number, that is, eREG#2, is selected in $S^2$, and the eREG with the greatest sequence number, that is, eREG#4, is selected in $S^3$. Now M=4 eREGs (eREG#0, eREG#7, eREG#2, eREG#4) are selected.

When step 33 is performed, the selected eREGs (eREG#0, eREG#7, eREG#2, eREG#4) are removed from the sorted sequence, sorting is performed again according to step 31 and step 32, and a group of M=4 eREGs (eREG#3, eREG#5, eREG#6, eREG#1) are selected. Now all the 8 eREGs of the physical resource block pair are selected.

Step 34 is performed, and the selected 4 eREGs in each group are mapped onto the physical resource block group (physical resource block pair 0, physical resource block pair 1, physical resource block pair 2, physical resource block pair 3) respectively to form M eREGs on several M physical resource block pairs are formed.

A group of 4 eREGs (eREG#0, eREG#7, eREG#2, eREG#4) are mapped onto the physical resource block group (physical resource block pair 0, physical resource block pair 1, physical resource block pair 2, physical resource block pair 3) to form 4 eREGs on 4 physical resource block pairs, and one eCCE is mapped onto 4 eREGs, where the mapping is as follows:

eCCE1: (physical resource block pair 0: eREG#0), (physical resource block pair 1: eREG#7), (physical resource block pair 2: eREG#2), and (physical resource block pair 3: eREG#4);

eCCE2: (physical resource block pair 1: eREG#0), (physical resource block pair 2: eREG#7), (physical resource block pair 3: eREG#2), and (physical resource block pair 0: eREG#4);

eCCE3: (physical resource block pair 2: eREG#0), (physical resource block pair 3: eREG#7), (physical resource block pair 0: eREG#2), and (physical resource block pair 1: eREG#4); and eCCE4: (physical resource block pair 3: eREG#0), (physical resource block pair 0: eREG#7), (physical resource block pair 1: eREG#2), and (physical resource block pair 2: eREG#4).

Another group of 4 eREGs (eREG#3, eREG#5, eREG#6, eREG#1) are mapped onto the physical resource block group (physical resource block pair 0, physical resource block pair 1, physical resource block pair 2, physical resource block pair 3) to form 4 eREGs on 4 physical resource block pairs, and one eCCE is mapped onto 4 eREGs, where the mapping is as follows:

eCCE5: (physical resource block pair 1: eREG#3), (physical resource block pair 2: eREG#5), (physical resource block pair 3: eREG#6), and (physical resource block pair 0: eREG#1);

eCCE6: (physical resource block pair 0: eREG#3), (physical resource block pair 1: eREG#5), (physical resource block pair 2: eREG#6), and (physical resource block pair 3: eREG#1);

eCCE7: (physical resource block pair 2: eREG#3), (physical resource block pair 3: eREG#5), (physical resource block pair 0: eREG#6), and (physical resource block pair 1: eREG#1); and eCCE8: (physical resource block pair 3: eREG#3), (physical resource block pair 0: eREG#5), (physical resource block pair 1: eREG#6), and (physical resource block pair 2: eREG#1).

Optionally, when the M eREGs mapped from the eCCE are distributed on L (L>1) physical resource block pairs, the L physical resource block pairs have different overheads. The overheads of some physical resource block pairs of the L physical resource block pairs include a PBCH and a PSS/SSS, and the overheads of other physical resource block pairs do not include the PBCH or the PSS/SSS, and therefore, the selecting M eREGs to form an eCCE according to the number of valid REs included in each eREG of the N eREGs of each physical resource block pair in step 103 specifically includes:

in the physical resource block pair, mapping, according to steps 31 to 35 and according to the number of valid REs included in the eREG, one eCCE in the at least one eCCE onto P eREGs in the physical resource block pairs that include the PBCH and the PSS/SSS and onto (M-P) eREGs in the physical resource block pairs that do not include the PBCH or the PSS/SSS until all the eREGs in the L physical resource block pairs are mapped onto.

Specifically, in this case, the physical resource block pairs are classified into two types according to whether they transmit the PBCH/PSS/SSS, and in the physical resource block pair, one eCCE in the at least one eCCE is mapped, according to steps 31 to 35 and according to the number of valid REs included in the eREG, onto P eREGs in the physical resource block pairs that include the PBCH and the PSS/SSS and onto (M-P) eREGs in the physical resource block pairs that do not include the PBCH or the PSS/SSS. It is assumed that 4 physical resource block pairs are used to transmit the control channel, where 2 physical resource block pairs transmit the PBCH/PSS/SSS, and the other 2 physical resource block pairs do not transmit the PBCH/PSS/SSS. The control channel is formed by 8 eCCEs, where M=4.

It is assumed that, according to steps 31 to 35, a result of mapping the 8 eCCEs onto P=2 eREGs in 2 physical resource block pairs that transmit the PBCH/PSS/SSS is as follows:

(physical resource block pair 0: eREG#0)+(physical resource block pair 1: eREG#7); C1_(1)

(physical resource block pair 0: eREG#1)+(physical resource block pair 1: eREG#6); C1_(2)

(physical resource block pair 0: eREG#2)+(physical resource block pair 1: eREG#5); C1_(3)

(physical resource block pair 0: eREG#3)+(physical resource block pair 1: eREG#4); C1_(4)

(physical resource block pair 1: eREG#0)+(physical resource block pair 0: eREG#7); C1_(5)

(physical resource block pair 1: eREG#1)+(physical resource block pair 0: eREG#6); C1_(6)

(physical resource block pair 1: eREG#2)+(physical resource block pair 0: eREG#5); C1_(7)

(physical resource block pair 1: eREG#3)+(physical resource block pair 0: eREG#4); C1_(8)

It is assumed that, according to steps 31 to 35, a result of mapping the 8 eCCEs onto 2 eREGs in 2 physical resource block pairs that do not transmit the PBCH/PSS/SSS is as follows:

(physical resource block pair 3, eREG#0)+(physical resource block pair 4, eREG#7); C2_(1)

(physical resource block pair 3, eREG#1)+(physical resource block pair 4, eREG#6); C2_(2)

(physical resource block pair 3, eREG#2)+(physical resource block pair 4, eREG#5); C2_(3)

(physical resource block pair 3, eREG#3)+(physical resource block pair 4, eREG#4); C2_(4)

(physical resource block pair 4, eREG#0)+(physical resource block pair 3, eREG#7); C2_(5)

(physical resource block pair 4, eREG#1)+(physical resource block pair 3, eREG#6); C2_(6)

(physical resource block pair 4, eREG#2)+(physical resource block pair 3, eREG#5); C2_(7)

(physical resource block pair 4, eREG#3)+(physical resource block pair 3, eREG#4); C2_(8)

Therefore, a result of mapping each eCCE onto 4 eREGs is as follows:

eCCE1: C1_(1)+C2_(1)=(physical resource block pair 0: eREG#0)+(physical resource block pair 1: eREG#7)+(physical resource block pair 3: eREG#0)+(physical resource block pair 4: eREG#7);

eCCE2: C1_(2)+C2_(2)=(physical resource block pair 0: eREG#1)+(physical resource block pair 1: eREG#6)+(physical resource block pair 3: eREG#1)+(physical resource block pair 4: eREG#6);

eCCE3: C1_(3)+C2_(3)=(physical resource block pair 0: eREG#2)+(physical resource block pair 1: eREG#5)+(physical resource block pair 3: eREG#2)+(physical resource block pair 4: eREG#5);

eCCE4: C1_(4)+C2_(4)=(physical resource block pair 0: eREG#3)+(physical resource block pair 1: eREG#4)+(physical resource block pair 3: eREG#3)+(physical resource block pair 4: eREG#4);

eCCE5: C1_(5)+C2_(5)=(physical resource block pair 1: eREG#0)+(physical resource block pair 0: eREG#7)+(physical resource block pair 4: eREG#0)+(physical resource block pair 3: eREG#7);

eCCE6: C1_(6)+C2_(6)=(physical resource block pair 1: eREG#1)+(physical resource block pair 0: eREG#6)+(physical resource block pair 4: eREG#1)+(physical resource block pair 3: eREG#6);

eCCE7: C1_(7)+C2_(7)=(physical resource block pair 1: eREG#2)+(physical resource block pair 0: eREG#5)+(physical resource block pair 4: eREG#2)+(physical resource block pair 3: eREG#5); and eCCE8: C1_(8)+C2_(8)=(physical resource block pair 1: eREG#3)+(physical resource block pair 0: eREG#4)+(physical resource block pair 4: eREG#3)+(physical resource block pair 3: eREG#4).

Figure 2:
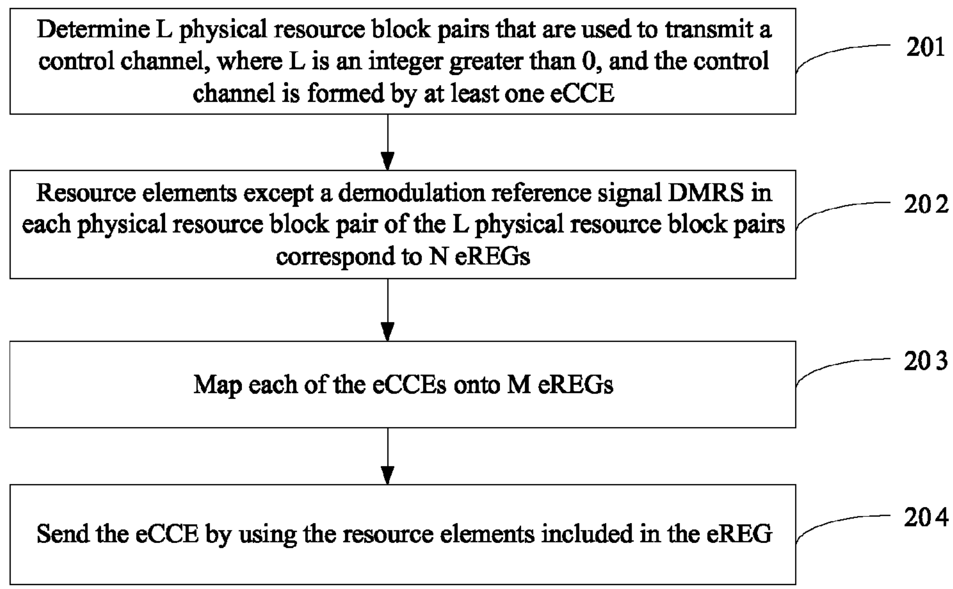
FIG. 2 is a schematic flowchart of another control channel transmission method according to Embodiment 1.

An embodiment of the present invention further provides a control channel transmission method. As shown in FIG. 2, the method includes the following steps:

201. Determine L physical resource block pairs that are used to transmit a control channel, where L is an integer greater than 0, and the control channel is formed by at least one eCCE.

When data is transmitted on a control channel, the physical resource block pairs occupied by the control channel are determined first. In the embodiment of the present invention, it is assumed that the control channel occupies L physical resource block pairs. Meanwhile, the number of eCCEs that form the control channel can be obtained according to an aggregation level of the control channel. The control channel is formed by at least one eCCE.

202. Resource elements except a demodulation reference signal DMRS in each physical resource block pair of the L physical resource block pairs correspond to N eREGs.

Each physical resource block pair of the L physical resource block pairs includes several REs. The REs except the DMRS in each physical resource block pair correspond to N groups, that is, form N eREGs, where N is an integer greater than 0.

203. Map each of the eCCEs onto M eREGs.

Here, a base station may determine sequence numbers of the M eREGs corresponding to each eCCE in the corresponding physical resource block pairs; and map each of the eCCEs onto the eREGs corresponding to the M eREG sequence numbers.

In K=floor(N/M) given below, floor refers to rounding down, and i=0, 1, . . . , or L*K−1; j=0, 1, . . . , or M−1.

The sequence numbers, in the corresponding PRBs, of the M eREGs corresponding to each eCCE are calculated in the following two scenarios:

The first scenario is: When L=1, a sequence number of the $j^{th}$ eREG corresponding to the $i^{th}$ eCCE may be calculated by using Loc_eCCE_i_j=(i+j*K) mod N, and then the sequence numbers, in the L=1 physical resource block pair, of the M eREGs corresponding to each eCCE are calculated.

For example, when N=16 and M=4, K=floor(N/M)=floor (16/4)=4, and the sequence number of the $(j=0)^{th}$ eREG corresponding to the $(i=0)^{th}$ eCCE is Loc_eCCE_0_0=(i+j*K) mod N=((0+0*4) mod 16)=0. In this way, the sequence numbers, in the L=1 physical resource block pair, of the M eREGs corresponding to each eCCE can be calculated consecutively.

The second scenario is: When L>1, it is needed to calculate the sequence number of the eREG corresponding to the eCCE first and then calculate the PRB that includes the eREG corresponding to this sequence number. Three optional calculation manners are available:

The first calculation manner is: First, the sequence number of the $j^{th}$ eREG corresponding to the $i^{th}$ eCCE is calculated:

$$Dis\_eCCE\_i\_j=(Loc\_eCCE\_t\_j+p*K) \bmod N, \text{ where } Loc\_eCCE\_t\_j=(t+j*K) \bmod N,\ t=\text{floor}(i/L), \text{ and } p=i \bmod L.$$

Then the sequence number of the corresponding physical resource block pair that includes the $j^{th}$ eREG corresponding to the $i^{th}$ eCCE is calculated:

$$R=(\text{floor}(i/(M*K))*M+j) \bmod L.$$

For example, when L=4, N=16, and M=4, K=floor (N/M)=floor(16/4)=4. When calculating the $(j=1)^{st}$ eREG corresponding to the $(i=1)^{st}$ eCCE, Loc_eCCE_t_j=(t+j*K) mod N=(floor(i/L)+j*K) mod N=(floor(1/4)+1*4) mod 16=4 is calculated first, so as to obtain the sequence number of the $(j=1)^{st}$ eREG corresponding to the $(i=1)^{st}$ eCCE by using Dis_eCCE_1_1=(Loc_eCCE_t_j+p*K) mod N=(4+(i mod L)*K) mod N=(4+(1 mod 4)*4) mod 16=8. Then according to R=(floor(i/(M*K))*M+j) mod L=(floor(1/(4*4))*4+1) mod 4=1, the sequence number of the $(j=1)^{st}$ eREG corresponding to the $(i=1)^{st}$ eCCE is the eREG numbered 8 in the physical resource block pair numbered 1 in the L physical resource block pairs. In this way, calculation can be performed consecutively to know which eREG sequence number in which physical resource block pair corresponds to each eREG corresponding to each eCCE.

The second calculation manner is: First, the sequence number of the $j^{th}$ eREG corresponding to the $i^{th}$ eCCE is calculated by using Dis_eCCE_i_j=((t+j*K) mod N+p*K) mod N, and then the sequence number of a corresponding physical resource block pair that includes the $j^{th}$ eREG corresponding to the $i^{th}$ eCCE is calculated by using R=(floor(i/(M*K))*M+j) mod L, so as to calculate the sequence numbers, in the corresponding physical resource block pair, of the M eREGs corresponding to each eCCE, where t=floor(i/L), and p=i mod L.

According to the foregoing formula, a person skilled in the art can easily calculate and know which eREG sequence number in which physical resource block pair corresponds to each eREG corresponding to each eCCE, which is not described here any further with an example.

The third calculation manner is: First, the sequence number of the $j^{th}$ eREG corresponding to the $i^{th}$ eCCE is calculated by using Dis_eCCE_i_j=(i+j*K) mod N, and then the sequence number of a corresponding physical resource block pair that includes the $j^{th}$ eREG corresponding to the $i^{th}$ eCCE is calculated by using R=(floor(i/(M*K))*M+j) mod L, so as to calculate the sequence numbers, in the corresponding physical resource block pair, of the M eREGs corresponding to each eCCE.

When the number L of configured physical resource block pairs is greater than the number M of eREGs mapped from each eCCE, it is only needed to group the L configured physical resource block pairs into floor(L/M) or (floor(L/M)+1) groups first by putting every M physical resource block pairs into one group, where the number of physical resource block pairs included in each group is M or L−floor (L/M). In each group (at this time, the number of physical resource block pairs in each group is L1=M or L−floor(L/M)), the foregoing formula is applied respectively to obtain the eCCE-to-eREG mapping on all the L physical resource block pairs. A sequence number $w_i$ of a PRB pair in the $i^{th}$ group, which is obtained according to the foregoing formula, is operated according to a formula $w=w_i+i*M$ to obtain a sequence number w of the PRB pair in all the L physical resource block pairs, where i=0, 1, . . . , floor(L/M)−1 or floor(L/M).

For example, when L=16 and M=8, the L physical resource block pairs are grouped into two groups first by putting every 8 physical resource block pairs into one group. For example, the first 8 physical resource block pairs form a first group, and the last 8 physical resource block pairs form a second group. In the first group, L=8 and M=8 are substituted into the foregoing formula to obtain the eREGs mapped from all eCCEs in the first 8 physical resource block pairs and obtain sequence numbers $w_i$ of corresponding PRB pairs in this group; and $w_1$ is substituted into a formula $w_1+0*8$ to obtain the sequence numbers w of the PRB pairs in the L physical resource block pairs. Similarly, in the second group, L=8 and M=8 are substituted into the foregoing formula to obtain the eREGs mapped from all eCCEs in the last 8 physical resource block pairs and obtain sequence numbers $w_2$ of corresponding PRB pairs in this group; and $w_2$ is substituted into a formula $w_2+1*8$ to obtain the sequence numbers w of the PRB pairs in the L physical resource block pairs.

According to the foregoing formula, a person skilled in the art can easily calculate and know which eREG sequence number in which physical resource block pair corresponds to each eREG corresponding to each eCCE, which is not described here any further with an example.

204. Send the eCCE by using the resource elements included in the eREG.

After each eCCE is mapped onto the M eREGs according to step 203, the corresponding eCCE may be sent by using the REs included in the M eREGs.

Figure 3:
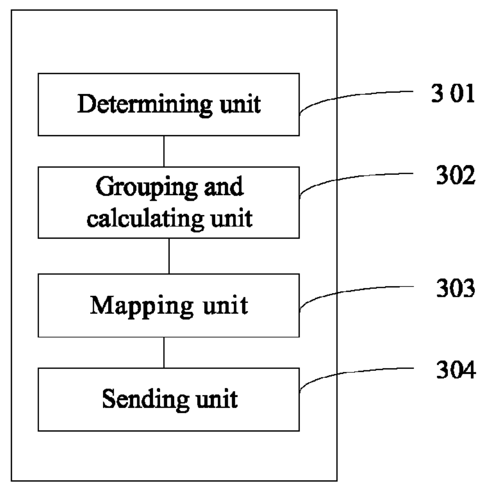
FIG. 3 is a structural block diagram of a control channel transmission apparatus according to Embodiment 1.

The embodiment of the present invention further provides a control channel transmission apparatus. As shown in FIG. 3, the apparatus includes a determining unit 301, a grouping and calculating unit 302, a mapping unit 303, and a sending unit 304.

The determining unit 301 is configured to determine L physical resource block pairs that are used to transmit a control channel, where L is an integer greater than 0, and the control channel is formed by at least one eCCE.

When data is transmitted on a control channel, the determining unit 301 determines the physical resource block pairs occupied by the control channel. In the embodiment of the present invention, it is assumed that the control channel occupies L physical resource block pairs. Meanwhile, the number of eCCEs that form the control channel can be obtained according to an aggregation level of the control channel. The control channel is formed by at least one eCCE.

The grouping and calculating unit 302 is configured to group resource elements except a demodulation reference signal DMRS in each physical resource block pair of the L physical resource block pairs determined by the determining unit 301 into N eREGs, and calculate the number of valid resource elements except other overheads in each eREG of the N eREGs in each of the physical resource block pairs, where N is an integer greater than 0, and the other overheads include at least one of the following: a CRS, a PDCCH, a PBCH, and a PSS/SSS, and may include no channel state information reference signal CSI-RS.

Each physical resource block pair of the L physical resource block pairs includes several REs. The grouping and calculating unit 302 groups the REs except the DMRS in each physical resource block pair into N groups, so that N eREGs are formed, where N is an integer greater than 0.

The mapping unit 303 is configured to map each of the eCCEs onto M eREGs according to the number of valid resource elements included in each eREG of the N eREGs of each physical resource block pair, where the number of valid resource elements is calculated by the grouping and calculating unit 302, and M is an integer greater than 0.

After the grouping and calculating unit 302 calculates the number of valid REs except the overhead in each eREG of the N eREGs of each physical resource block pair, the mapping unit 303 may select every M eREGs to form an eCCE according to the number of valid REs included in each eREG of the N eREGs of each of the physical resource block pairs, so that the difference between the numbers of valid resource elements occupied by the eCCEs is not greater than 5.

Optionally, the mapping unit 303 is specifically configured to group N eREGs in each of the physical resource block pairs into a first eREG group and a second eREG group according to the number of valid resource elements included in the eREG, and map each eCCE onto M eREGs of the first eREG group and the second eREG group, where: in the M eREGs mapped from each eCCE, the first M/2 eREGs of the M eREGs are in the first eREG group, the number of valid resource elements included in each eREG of the first M/2 eREGs is a different value, the last M/2 eREGs of the M eREGs are in the second eREG group, and the number of valid resource elements included in each eREG of the last M/2 eREGs is a different value.

Optionally, the mapping unit 303 is specifically configured to number the N eREGs in each of the physical resource block pairs as 0, 1, 2, . . . , N−1, and use $S^i$ to denote a set of eREGs in the N eREGs, where the number of valid resource elements included in each eREG in the set is $D^i$(i=1, 2, . . . , t), $D^1<D^2< \ldots <D^t$, and t is an integer greater than 0; select one eREG respectively from each of the sets $S^1$, $S^t$, $S^2$, $S^{t-1}$ . . . sequentially until M eREGs are selected in total, and map one eCCE in the at least one eCCE onto M eREGs; and remove the selected eREGs from corresponding sets, reselect M eREGs, and map another eCCE in the at least one eCCE onto the reselected M eREGs until all the N eREGs of the physical resource block pair are mapped.

Optionally, the mapping unit is specifically configured to number the N eREGs in each of the physical resource block pairs as 0, 1, 2, . . . , N−1, and use $S^i$ to denote a set of eREGs in the N eREGs, where the number of valid resource elements included in each eREG in the set is $D^i$(i=1, 2, . . . , t), $D^1<D^2< \ldots <D^t$, and t is an integer greater than 0; sort the S in ascending order of $D^i$ in the $S^i$ into $S^1$, $S^2$, . . . , $S^t$, where the eREGs in the set $S^i$ are sorted in ascending order of sequence numbers of the eREGs; group the sorted N eREGs into p groups by putting every M/2 eREGs into one group, where the $k^{th}$ group includes a $((k-1)*M/2+1)^{th}$ eREG, a $((k-1)*M/2+2)^{th}$ eREG, . . . , and a $(k*M/2)^{th}$ eREG in a sorted sequence, where k=0, 1, . . . , p; and map the eCCEs onto the eREGs included in the $x^{th}$ group and the $(p-x)^{th}$ group, where x is any value in 0, 1, . . . , p.

The sending unit 304 is configured to send the eCCE by using the resource elements included in the eREG mapped by the mapping unit 303.

The mapping unit 303 maps the eCCE to M eREGs until at least one eCCE that forms the control channel is mapped onto the different M eREGs respectively, so that the corresponding eCCE can be sent by using the REs included in the M eREGs.

Figure 4:
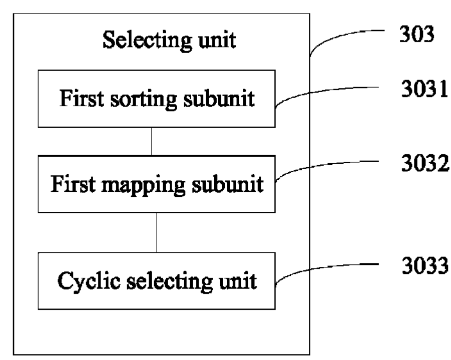
FIG. 4 is a structural block diagram of a selecting unit in the control channel transmission apparatus according to Embodiment 1.

Optionally, when the M eREGs that form the eCCE are on the same physical resource block pair, as shown in FIG. 4, the mapping unit 303 specifically includes a first sorting subunit 3031, a first mapping subunit 3032, and a cyclic selecting unit 3033.

The first sorting subunit 3031 is configured to perform step 21, where step 21 is: numbering the N eREGs in each of the physical resource block pairs as 0, 1, 2, . . . , N−1, and using $S^i$ to denote a set of eREGs in the N eREGs, where the number of valid resource elements included in each eREG in the set is $D^i$(i=1, 2, . . . , t), $D^1<D^2< \ldots <D^t$, and t is an integer greater than 0; and sorting the $S^i$ in ascending order of $D^i$ in the $S^i$ into $S^1$, $S^2$, . . . , $S^t$, where the eREGs in the set $S^i$ are sorted in ascending order of sequence numbers of the eREGs.

The first mapping subunit 3032 is configured to perform step 22, where step 22 is: according to the sorting of the set $S^i$ in the first sorting subunit 3031, expressing $S^1 \ldots S^a$ sorted out of the sets $S^1$ to $S^a$ as a sequential set group, and expressing $S^t \ldots S^{a+1}$ sorted out of the set $S^{a+1}$ to the set $S^t$ as a reverse set group; and selecting a set $S^i$ in the sequential set group and the reverse set group alternately and sequentially according to a value of i, selecting one eREG from one set $S^i$ respectively according to a sequence number of the eREG in the set $S^i$ until M eREGs are selected, and mapping one eCCE in the at least one eCCE onto the selected M eREGs, where a=t/2 when t is an even number, and a=(t+1)/2 when t is an odd number.

When M is greater than t, after selecting t eREGs from the sets $S^1$ to $S^t$ according to step 22, the first mapping subunit 3032 removes the selected eREGs, and still selects eREGs from the sets $S^1$ to $S^t$ according to step 22 until M eREGs are selected, and maps one eCCE in the at least one eCCE onto the selected M eREGs.

The cyclic selecting unit 3033 is further configured to perform step 23, where step 23 is: removing, from a sorted sequence, the eREGs selected by the first mapping subunit 3032, performing, by the first sorting subunit 3031, sorting again according to step 21, and reselecting, by the first mapping subunit 3032, M eREGs according to step 22, and mapping another eCCE in the at least one eCCE onto the reselected M eREGs until all the N eREGs of the physical resource block pair are mapped onto.

Figure 5:
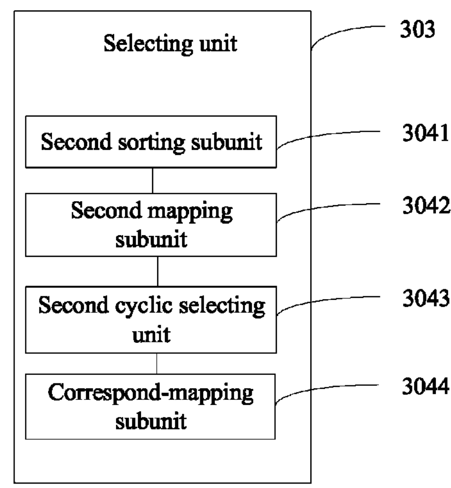
FIG. 5 is a structural block diagram of another selecting unit in the control channel transmission apparatus according to Embodiment 1.

Optionally, when the M eREGs mapped from the eCCE are on different physical resource blocks and all the physical resource block pairs have the same overhead distribution, as shown in FIG. 5, the mapping unit 303 may further include a second sorting subunit 3041, a second mapping subunit 3042, a second cyclic selecting unit 3043, and a correspond-mapping subunit 3044.

The second sorting subunit 3041 is configured to number the N eREGs in each of the physical resource block pairs as 0, 1, 2, . . . , N−1, use $S^i$ to denote a set of eREGs in the N eREGs, where the number of valid resource elements included in each eREG in the set is $D^i$ (i=1, 2, . . . , t), $D^1<D^2< \dots <D^t$, and t is an integer greater than 0, and sort the $S^i$ in ascending order of the number $D^i$ of valid resource elements in each eREG in the $S^i$ into:

$S^1, S^2, \dots, S^t$, where the eREGs in the set $S^i$ are sorted in ascending order of sequence numbers of the eREGs.

The second mapping subunit 3042 is configured to perform step 32, where step 32 is: according to the sorting of the set $S^i$ in the second sorting subunit 3041, expressing $S^1 \dots S^a$ sorted out of the sets $S^1$ to $S^a$ as a sequential set group, and expressing $S^t \dots S^{a+1}$ sorted out of the set $S^{a+1}$ to the set $S^t$ as a reverse set group; and selecting a set $S^i$ in the sequential set group and the reverse set group alternately and sequentially according to a value of i, and selecting one eREG from one set $S^i$ respectively according to a sequence number of the eREG in the set $S^i$ until M eREGs are selected, where a=t/2 when t is an even number, and a=(t+1)/2 when t is an odd number.

When M is greater than t, after selecting t eREGs from the sets $S^1$ to $S^t$ according to step 32, the second mapping subunit 3042 removes the selected eREGs, and still selects eREGs from the sets $S^1$ to $S^t$ according to step 32 until M eREGs are selected.

The second cyclic selecting unit 3043 is configured to perform step 33, where step 33 is: removing, from a sorted sequence, the eREGs selected by the second mapping subunit 3042, performing, by the second sorting subunit 3041, sorting again according to step 31, and reselecting, by the second selecting subunit 3042, another group of M eREGs according to step 32 until all the N eREGs of the physical resource block pair are selected.

The correspond-mapping subunit 3044 is configured to perform step 34, where step 34 is: grouping the L physical resource block pairs into floor(L/M) physical resource block groups by putting every M physical resource block pairs into one group, mapping the selected M eREGs in each group onto M physical resource block pairs in each of the floor (L/M) physical resource block groups respectively, and mapping each eCCE in the L physical resource block pairs onto the M eREGs respectively, where floor refers to rounding down. When the L value is not divisible by the M value, remaining Q physical resource blocks and (M-Q) physical resource blocks selected from the L physical resource blocks form a group of M physical resource blocks.

Optionally, when the M eREGs mapped from the eCCE are distributed on L (L>1) physical resource blocks pairs, the L physical resource block pairs have different overheads. The overheads of some physical resource block pairs of the L physical resource block pairs include a PBCH and a PSS/SSS, and the overheads of other physical resource block pairs do not include the PBCH or the PSS/SSS. The mapping unit is specifically configured to map, according to steps 31 to 35, one eCCE in the at least one eCCE onto P eREGs in the physical resource block pairs that include the PBCH and the PSS/SSS and onto (M-P) eREGs in the physical resource block pairs that do not include the PBCH or the PSS/SSS until all the eREGs in the L physical resource block pairs are mapped onto.

Optionally, the mapping unit 303 may further include a calculating subunit and a mapping subunit.

The calculating subunit is configured to calculate the sequence numbers, in the corresponding physical resource block pairs, of the M eREGs mapped from each eCCE; and the mapping subunit is configured to map each of the eCCEs onto M eREGs corresponding to M eREG sequence numbers corresponding to the sequence numbers according to the sequence numbers.

The calculating subunit is configured to:

when L=1, calculate a sequence number of the $j^{th}$ eREG corresponding to the $i^{th}$ eCCE by using Loc_eCCE_i_j=(i+j*K) mod N, and then calculate the sequence numbers, in the L=1 physical resource block pair, of the M eREGs corresponding to each eCCE;

when L>1, first, calculate the sequence number of the $j^{th}$ eREG corresponding to the $i^{th}$ eCCE by using Dis_eCCE_i_j=(Loc_eCCE_t_j+p*K) mod N, and then calculate the sequence number of a corresponding physical resource block pair of the L physical resource block pairs that include the $j^{th}$ eREG corresponding to the $i^{th}$ eCCE by using R=(floor(i/(M*K))*M+j) mod L, so as to calculate, in the corresponding physical resource block pair, the sequence numbers of the M eREGs corresponding to each eCCE, where Loc_eCCE_t_j=(t+j*K) mod N, t=floor(i/L), p=i mod L, and R=0, 1, . . . , L−1;

or, when L>1, first, calculate the sequence number of the $j^{th}$ eREG corresponding to the $i^{th}$ eCCE by using Dis_eCCE_i_j=((t+j*K) mod N+p*K)mod N, and then calculate the sequence number of a corresponding physical resource block pair of the L physical resource block pairs that include the $j^{th}$ eREG corresponding to the $i^{th}$ eCCE by using R=(floor(i/(M*K))*M+j) mod L, so as to calculate the sequence numbers, in the corresponding physical resource block pair, of the M eREGs corresponding to each eCCE, where t=floor(i/L), p=i mod L, and R=0, 1, . . . , L−1;

or, when L>1, first, calculate the sequence number of the $j^{th}$ eREG corresponding to the $i^{th}$ eCCE by using Dis_eCCE_i_j=(i+j*K) mod N, and then calculate the sequence number of a corresponding physical resource block pair of the L physical resource block pairs that include the $j^{th}$ eREG corresponding to the $i^{th}$ eCCE by using R=(floor(i/(M*K))*M+j) mod L, so as to calculate the sequence numbers, in the corresponding physical resource block pair, of the M eREGs corresponding to each eCCE, where N is the number of eREGs of each physical resource block pair, K is the number of eCCEs of each physical resource block pair, M is the number of eREGs corresponding to each eCCE, i=0, 1, . . . , L*K−1, and j=0, 1, . . . , M−1.

The calculating subunit is configured to calculate the sequence number of the eCCE corresponding to the $j^{th}$ eREG of each physical resource block pair by using Loc_eCCE_i=j mod K, where K is the number of eCCEs borne in each physical resource block pair, and j=0, 1, . . . , or K−1.

When the number L of configured physical resource block pairs is greater than the number M of eREGs mapped from each eCCE, it is only needed to group the L configured physical resource block pairs into floor(L/M) or (floor(L/M)+1) groups first by putting every M physical resource block pairs into one group, where the number of physical resource block pairs included in each group is M or L−floor(L/M). In each group (at this time, the number of physical resource block pairs in each group is L1=M or L−floor(L/M)), the foregoing formula is applied respectively to obtain the eCCE-to-eREG mapping on all the L physical resource block pairs. A sequence number $w_i$ of a PRB pair in the $i^{th}$ group, which is obtained according to the foregoing formula, is operated according to a formula $w=w_i+i*M$ to obtain a sequence number w of the PRB pair in all the L physical resource block pairs, where i=0, 1, . . . , floor(L/M)−1 or floor(L/M).

For example, when L=16 and M=8, the L physical resource block pairs are grouped into two groups first by putting every 8 physical resource block pairs into one group. For example, the first 8 physical resource block pairs form a first group, and the last 8 physical resource block pairs form a second group. In the first group, L=8 and M=8 are substituted into the foregoing formula to obtain the eREGs mapped from all eCCEs in the first 8 physical resource block pairs and obtain sequence numbers $w_i$ of corresponding PRB pairs in this group; and $w_1$ is substituted into a formula $w_1+0*8$ to obtain the sequence numbers w of the PRB pairs in the L physical resource block pairs. Similarly, in the second group, L=8 and M=8 are substituted into the foregoing formula to obtain the eREGs mapped from all eCCEs in the last 8 physical resource block pairs and obtain sequence numbers $w_2$ of corresponding PRB pairs in this group; and $w_2$ is substituted into a formula $w_2+1*8$ to obtain the sequence numbers w of the PRB pairs in the L physical resource block pairs.

Figure 6:
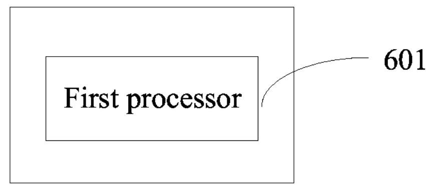
FIG. 6 is a structural block diagram of another control channel transmission apparatus according to Embodiment 1.

The embodiment of the present invention further provides a control channel transmission apparatus. As shown in FIG. 6, the apparatus includes a first processor 601.

The first processor 601 is configured to determine L physical resource block pairs that are used to transmit a control channel, where L is an integer greater than 0, and the control channel is formed by at least one eCCE.

When data is transmitted on a control channel, first, the first processor 601 determines the physical resource block pairs occupied by the control channel. In the embodiment of the present invention, it is assumed that the control channel occupies L physical resource block pairs. Meanwhile, the number of eCCEs that form the control channel can be obtained according to an aggregation level of the control channel. The control channel is formed by at least one eCCE.

The first processor 601 is configured to group resource elements except a demodulation reference signal DMRS in each physical resource block pair of the L physical resource block pairs into N eREGs, and calculate the number of valid resource elements except other overheads in each eREG of the N eREGs in each of the physical resource block pairs, where N is an integer greater than 0, and the other overheads include at least one of the following: a CRS, a PDCCH, a PBCH, and a PSS/SSS, and may include no CSI-RS.

Each physical resource block pair of the L physical resource block pairs includes several REs. The REs except the DMRS in each physical resource block pair are grouped into N groups, that is, form N eREGs, where N is an integer greater than 0.

The first processor 601 is further configured to map each of the eCCEs onto M eREGs according to the number of valid resource elements included in each eREG of the N eREGs of each physical resource block pair, where M is an integer greater than 0.

After the number of valid REs except the overhead in each eREG of the N eREGs of each physical resource block pair is calculated, each of the eCCEs may be mapped onto M eREGs according to the number of valid REs included in each eREG of the N eREGs of each of the physical resource block pairs, so that the difference between the numbers of valid resource elements occupied by the eCCEs is not greater than 5.

Optionally, the first processor is specifically configured to group N eREGs in each of the physical resource block pairs into a first eREG group and a second eREG group according to the number of valid resource elements included in the eREG, and map each eCCE onto M eREGs of the first eREG group and the second eREG group, where: in the M eREGs mapped from each eCCE, the first M/2 eREGs of the M eREGs are in the first eREG group, the number of valid resource elements included in each eREG of the first M/2 eREGs is a different value, the last M/2 eREGs of the M eREGs are in the second eREG group, and the number of valid resource elements included in each eREG of the last M/2 eREGs is a different value.

The first processor is specifically configured to perform the following steps: numbering the N eREGs in each of the physical resource block pairs as 0, 1, 2, . . . , N−1, and using $S^i$ to denote a set of eREGs in the N eREGs, where the number of valid resource elements included in each eREG in the set is $D^i$(i=1, 2, . . . , t), $D^1<D^2<\ldots<D^t$, and t is an integer greater than 0; step 12: selecting one eREG respectively from each of the sets $S^1$, $S^t$, $S^2$, $S^{t-1}$ . . . sequentially until M eREGs are selected in total, and mapping one eCCE in the at least one eCCE onto M eREGs; and step 13: removing the selected eREGs from corresponding sets, reselecting M eREGs according to step 12, and mapping another eCCE in the at least one eCCE onto the reselected M eREGs until all the N eREGs of the physical resource block pair are mapped onto.

The first processor is specifically configured to number the N eREGs in each of the physical resource block pairs as 0, 1, 2, . . . , N−1, and use $S^i$ to denote a set of eREGs in the N eREGs, where the number of valid resource elements included in each eREG in the set is $D^i$(i=1, 2, . . . , t), $D^1<D^2<\ldots<D^t$, and t is an integer greater than 0; sort the $S^i$ in ascending order of $D^i$ in the $S^i$ into $S^1, S^2, \ldots, S^t$, where the eREGs in the set $S^i$ are sorted in ascending order of sequence numbers of the eREGs; group the sorted N eREGs into p groups by putting every M/2 eREGs into one group, where the $k^{th}$ group includes a $((k-1)*M/2+1)^{th}$ eREG, a $((k-1)*M/2+2)^{th}$ eREG, . . . , and a $(k*M/2)^{th}$ eREG in a sorted sequence, where k=0, 1, . . . , p; and map the eCCEs onto the eREGs included in the $x^{th}$ group and the $(p-x)^{th}$ group, where x is any value in 0, 1, . . . , p.

The first processor 601 is further configured to send the eCCE by using the resource elements included in the eREG.

Optionally, when the M eREGs mapped from the eCCE are on the same physical resource block pair, the first processor 601 is further configured to perform step 21, where step 21 is: numbering the N eREGs in each of the physical resource block pairs as 0, 1, 2, . . . , N−1, using $S^i$ to denote a set of eREGs in the N eREGs, where the number of valid resource elements included in each eREG in the set is $D^i$(i=1, 2, . . . , t), $D^1<D^2< . . . <D^t$, and t is an integer greater than 0, and sorting the $S^i$ in ascending order of $D^i$ in the $S^i$ into:

$S^1, S^2, . . . , S^t$, where the eREGs in the set $S^i$ are sorted in ascending order of sequence numbers of the eREGs.

Here, it should be noted that in the L physical resource block pairs, each physical resource block pair has the same overhead, N eREGs in each physical resource block pair have the same sequence number, and the eREGs that have the same sequence number include the same number of valid REs. Therefore, in each physical resource block pair, N eREGs are sorted identically.

The first processor 601 is further configured to perform step 22, where step 22 is: according to the set sorting in step 21, expressing $S^1 . . . S^a$ sorted out of the sets $S^1$ to $S^a$ as a sequential set group, and expressing $S^t . . . , S^{a+1}$ sorted out of the set $S^{a+1}$ to the set $S^t$ as a reverse set group; and selecting a set $S^i$ in the sequential set group and the reverse set group alternately and sequentially according to a value of i, selecting one eREG from one set $S^i$ respectively according to a sequence number of the eREG in the set $S^i$ until M eREGs are selected, and mapping one eCCE in the at least one eCCE onto the selected M eREGs, where a=t/2 when t is an even number, and a=(t+1)/2 when t is an odd number.

When M is greater than t, after selecting t eREGs from the sets $S^1$ to $S^t$ according to step 22, the first processor removes the selected eREGs, and still selects eREGs from the sets $S^1$ to $S^t$ according to step 22 until M eREGs are selected, and maps one eCCE in the at least one eCCE onto the selected M eREGs.

The first processor 601 is further configured to perform step 23: removing the selected eREGs from corresponding sets, performing sorting again and reselecting M eREGs according to step 21 and step 22, and mapping another eCCE in the at least one eCCE onto the reselected M eREGs until all the N eREGs of the physical resource block pair are mapped onto.

Optionally, when the M eREGs mapped from the eCCE are distributed on L (L>1) physical resource block pairs, if the L physical resource block pairs have the same overhead, the first processor 601 is further configured to perform step 31: numbering the N eREGs in each of the physical resource block pairs as 0, 1, 2, . . . , N−1, using $S^i$ to denote a set of eREGs in the N eREGs, where the number of valid resource elements included in each eREG in the set is $D^i$(i=1, 2, . . . , t), $D^1<D^2< . . . <D^t$, and t is an integer greater than 0, and sorting the $S^i$ in ascending order of the number $D^i$ of valid resource elements included in each eREG in the $S^i$ into:

$S^1, S^2, . . . S^t$, where the eREGs in the set $S^i$ are sorted in ascending order of sequence numbers of the eREGs.

Here, it should be noted that in the L physical resource block pairs, each physical resource block pair has the same overhead, N eREGs in each physical resource block pair have the same sequence number, and the eREGs that have the same sequence number include the same number of valid REs. Therefore, in each physical resource block pair, N eREGs are sorted identically.

The first processor 601 is further configured to perform step 32, where step 32 is: according to the set sorting in step 31, expressing $S^1 . . . S^a$ sorted out of the sets $S^1$ to $S^a$ as a sequential set group, and expressing $S^t . . . S^{a+1}$ sorted out of the set $S^{a+1}$ to the set $S^t$ as a reverse set group; and selecting a set $S^i$ in the sequential set group and the reverse set group alternately and sequentially according to a value of i, and selecting one eREG from one set $S^i$ respectively according to a sequence number of the eREG in the set $S^i$ until a group of M eREGs are selected, where a=t/2 when t is an even number, and a=(t+1)/2 when t is an odd number.

After selecting t eREGs from the sets $S^1$ to $S^t$ according to step 32 when M is greater than t, the first processor removes the selected eREGs, and still selects eREGs from the sets $S^1$ to $S^t$ according to step 32 until a group of M eREGs are selected.

The first processor 601 is further configured to perform step 33: removing the selected eREGs from corresponding sets, and performing sorting again and selecting another group of M eREGs according to step 31 and step 32 until all the N eREGs of the physical resource block pair are selected.

After removing the selected M eREG sequence numbers from the sorted sequence $S^1, S^2, . . . S^t$, the first processor 601 still sorts the remaining eREGs according to the number of included valid REs and the eREG sequence number in the way described in step 31, and selects M eREGs according to step 32 until all the N eREGs in the physical resource block pair are selected.

The first processor 601 is further configured to perform step 34: grouping the L physical resource block pairs into floor(L/M) physical resource block groups by putting every M physical resource block pairs into one group, mapping the selected M eREGs in each group onto M physical resource block pairs in each of the floor(L/M) physical resource block groups respectively, and mapping each eCCE in the L physical resource block pairs onto the M eREGs respectively, where floor refers to rounding down. When the L value is not divisible by the M value, the first processor 601 may combine remaining Q physical resource blocks and (M-Q) physical resource blocks selected from the L physical resource blocks to form a group of M physical resource blocks.

Optionally, when the M eREGs mapped from the eCCE are distributed on L (L>1) physical resource block pairs, if the L physical resource block pairs have different overheads, where the overheads of some physical resource block pairs of the L physical resource block pairs include a PBCH and a PSS/SSS, and the overheads of other physical resource block pairs do not include the PBCH or the PSS/SSS, the first processor 601 maps one eCCE in the at least one eCCE onto P eREGs in the physical resource block pairs that include the PBCH and the PSS/SSS and onto (M-P) eREGs in the physical resource block pairs that do not include the PBCH or the PSS/SSS according to steps 31 to 35 until all the eREGs in the L physical resource block pairs are mapped onto.

Optionally, the eREGs corresponding to the resource elements of the physical resource block pair have sequence numbers; and the first processor 601 is specifically configured to calculate the sequence numbers, in the corresponding physical resource block pairs, of the M eREGs mapped from each eCCE; and map each of the eCCEs onto M eREGs corresponding to M eREG sequence numbers corresponding to the sequence numbers according to the sequence numbers.

The first processor 601 is specifically configured to:

when L=1, calculate a sequence number of the $j^{th}$ eREG corresponding to the $i^{th}$ eCCE by using Loc_eCCE_i_j=(i+ j*K) mod N, and then calculate the sequence numbers, in the L=1 physical resource block pair, of the M eREGs corresponding to each eCCE; or when L>1, first, calculate the sequence number of the $j^{th}$ eREG corresponding to the $i^{th}$ eCCE by using Dis_eCCE_i_j=(Loc_eCCE_t_j+p*K) mod N, and then calculate the sequence number of a corresponding physical resource block pair of the L physical resource block pairs that include the $j^{th}$ eREG corresponding to the $i^{th}$ eCCE by using R=(floor(i/(M*K))*M+j) mod L, so as to calculate the sequence numbers, in the corresponding physical resource block pair, of the M eREGs corresponding to each eCCE, where Loc_eCCE_t_j=(t+j*K) mod N, t=floor(i/L), p=i mod L, and R=0, 1, . . . , or L−1; or when L>1, first, calculate the sequence number of the $j^{th}$ eREG corresponding to the $i^{th}$ eCCE by using Dis_eCCE_i_j=((t+j*K) mod N+p*K)mod N, and then calculate the sequence number of a corresponding physical resource block pair of the L physical resource block pairs that include the $j^{th}$ eREG corresponding to the $i^{th}$ eCCE by using R=(floor(i/(M*K))*M+j) mod L, so as to calculate, in the corresponding physical resource block pair, the sequence numbers of the M eREGs corresponding to each eCCE, where t=floor(i/L), p=i mod L, and R=0, 1, . . . , or L−1; or when L>1, first, calculate the sequence number of the $j^{th}$ eREG corresponding to the $i^{th}$ eCCE by using Dis_eCCE_i_j=(i+j*K) mod N, and then calculate the sequence number of a corresponding physical resource block pair of the L physical resource block pairs that include the $j^{th}$ eREG corresponding to the $i^{th}$ eCCE by using R=(floor(i/(M*K))*M+j) mod L, so as to calculate the sequence numbers, in the corresponding physical resource block pair, of the M eREGs corresponding to each eCCE, where N is the number of eREGs of each physical resource block pair, K is the number of eCCEs of each physical resource block pair, M is the number of eREGs corresponding to each eCCE, i is the sequence number of the eCCEs that form the control channel, i=0, 1, . . . , or L*K−1, and j is the sequence number of the eREGs included in the physical resource block pair, j=0, 1, . . . , or M−1.

When the number L of configured physical resource block pairs is greater than the number M of eREGs mapped from each eCCE, it is only needed to group the L configured physical resource block pairs into floor(L/M) or (floor(L/M)+1) groups first by putting every M physical resource block pairs into one group, where the number of physical resource block pairs included in each group is M or L−floor(L/M). In each group (at this time, the number of physical resource block pairs in each group is L1=M or L−floor(L/M)), the foregoing formula is applied respectively to obtain the eCCE-to-eREG mapping on all the L physical resource block pairs. A sequence number $w_i$ of a PRB pair in the $i^{th}$ group, which is obtained according to the foregoing formula, is operated according to a formula $w=w_i+i*M$ to obtain a sequence number w of the PRB pair in all the L physical resource block pairs, where i=0, 1, . . . , floor(L/M)−1 or floor(L/M).

For example, when L=16 and M=8, the L physical resource block pairs are grouped into two groups first by putting every 8 physical resource block pairs into one group. For example, the first 8 physical resource block pairs form a first group, and the last 8 physical resource block pairs form a second group. In the first group, L=8 and M=8 are substituted into the foregoing formula to obtain the eREGs mapped from all eCCEs in the first 8 physical resource block pairs and obtain sequence numbers $w_i$ of corresponding PRB pairs in this group; and $w_1$ is substituted into a formula $w_1+0*8$ to obtain the sequence numbers w of the PRB pairs in the L physical resource block pairs. Similarly, in the second group, L=8 and M=8 are substituted into the foregoing formula to obtain the eREGs mapped from all eCCEs in the last 8 physical resource block pairs and obtain sequence numbers $w_2$ of corresponding PRB pairs in this group; and $w_2$ is substituted into a formula $w_2+1*8$ to obtain the sequence numbers w of the PRB pairs in the L physical resource block pairs.

In the control channel transmission method and apparatus according to the embodiment of the present invention, a certain number of eREGs are selected to form an eCCE according to the number of valid REs except an overhead in each eREG, which can keep a balance between actual sizes of the formed eCCEs, further ensure a performance balance when demodulating each eCCE, and reduce implementation complexity of a scheduler.

Embodiment 2

Figure 7:
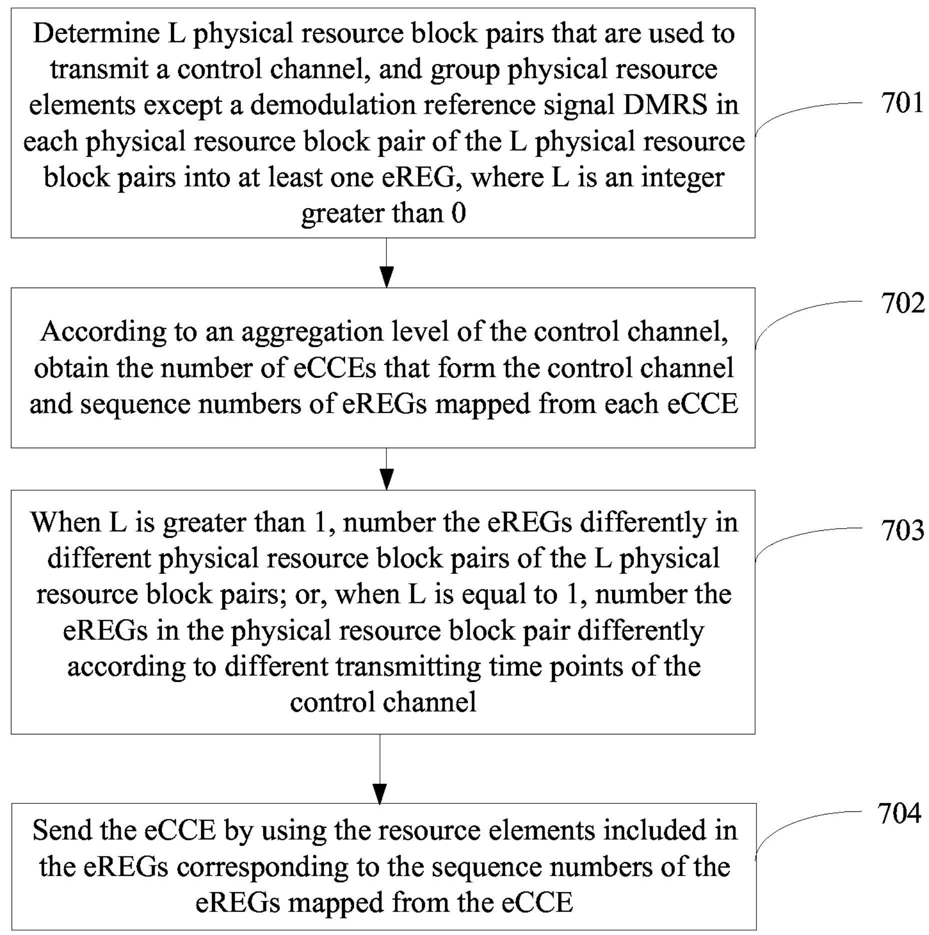
FIG. 7 is a schematic flowchart of a control channel transmission method according to Embodiment 2.

The embodiment of the present invention further provides a control channel transmission method. As shown in FIG. 7, the method includes the following steps:

701. Determine L physical resource block pairs that are used to transmit a control channel, and group resource elements except a demodulation reference signal DMRS in each physical resource block pair of the L physical resource block pairs into at least one eREG, where L is an integer greater than 0.

When data is transmitted on a control channel, the physical resource block pairs occupied by the control channel need to be determined first, that is, it is determined that the control channel can be transmitted on the L physical resource block pairs. Then the resource elements except a demodulation reference signal DMRS in each physical resource block pair of the L physical resource block pairs are grouped into N eREGs, where L is an integer greater than 0.

702. Obtain, according to an aggregation level of the control channel, the number of eCCEs that form the control channel and sequence numbers of eREGs mapped from each eCCE.

According to the aggregation level of the control channel, the number of eCCEs that form the control channel can be obtained, and the specific eREG sequence numbers included in each eCCE can be determined according to a fixed rule.

703. When L is greater than 1, number the eREGs differently in different physical resource block pairs of the L physical resource block pairs; or, when L is equal to 1, number the eREGs in the physical resource block pair differently according to different transmitting time points of the control channel.

If the eREGs mapped from the eCCE are distributed on L>1 physical resource blocks, the control channel occupies L physical resource block pairs, and the eREGs are numbered differently in different physical resource block pairs of the L physical resource block pairs. Assuming that each physical resource block pair includes N=8 eREGs, the eREGs in physical resource block pair 1 may be numbered 1, 2, 3, 4, 5, 6, 7, and 8; and, after undergoing a different shift, the eREGs in physical resource block pair 2 are numbered 2, 3, 4, 5, 6, 7, 8, and 1, and so on. The eREGs are numbered differently in different physical resource block pairs. Optionally, the eREGs in different physical resource block pairs of the L physical resource block pairs may be numbered in an interleaved manner. For example, a resource element corresponding to the eREG numbered i in the first physical resource block pair of the L physical resource block pairs corresponds to an eREG numbered j in the $p^{th}$ physical resource block pair, where j=(i+p*N−1) % N or j=(i+p) % N, and N is the number of eREGs in each physical resource block pair. In a case where the sequence numbers of the eREGs mapped from each eCCE are definite, the eREGs corresponding to the sequence numbers of the eREGs mapped from each eCCE are located in different locations in different physical resource block pairs, which makes the actual sizes of the eCCEs formed by the eREGs balanced.

Similarly, in a case where the eREGs mapped from the eCCE are distributed on one physical resource block pair, the eREGs in the physical resource block pair are numbered differently according to different transmitting time points of the control channel. For example, at the first transmitting time point of the control channel, the eREGs in the physical resource block pair are numbered 1, 2, 3, 4, 5, 6, 7, and 8; and, at the second transmitting time point of the control channel, the eREGs in the physical resource block pair are shifted cyclically and numbered 2, 3, 4, 5, 6, 7, 8, and 1. In this way, after interleaving or cyclic shift is performed, in a case where the eREG sequence numbers included in each eCCE are definite, a balance between the actual sizes of the eCCEs formed by the eREGs can be ensured.

Optionally, the sequence numbers of the eREGs corresponding to the REs arranged sequentially on a frequency domain or a time domain in the physical resource block pairs of different subframes or different slots may be obtained by performing a cyclic shift between them. For example, the sequence numbers of the eREGs corresponding to the REs arranged sequentially on the frequency domain or the time domain in the physical resource block pair of a first subframe or a first slot may be obtained by performing a cyclic shift for the sequence numbers of the eREGs corresponding to the REs arranged sequentially on the frequency domain or the time domain in the physical resource block pair of a second subframe or a second slot.

In one aspect, in the $f^{th}$ subframe or slot, a sequence number of the $n^{th}$ eREG in a physical resource block pair corresponding to the $f^{th}$ subframe or slot slot is:

$K^f(n)=((K+p) \mod N)$, where $K^f(n)$ is a sequence number of an eREG corresponding to the first RE in the physical resource block pair corresponding to the $f^{th}$ subframe or slot, K(n) is a sequence number of an eREG corresponding to an RE corresponding to a first subframe or slot and located in the same location as the first RE on the time domain and the frequency domain, and p is a step length of the cyclic shift. Optionally, a current subframe number or slot number f may be used as the step length of the cyclic shift. The cyclic shift manner is also applicable to the eCCE-to-eREG mapping. For example, a mapping rule for mapping each eCCE onto the eREG includes:

in the $f^{th}$ subframe or slot, a sequence number of the $n^{th}$ eREG in a physical resource block pair corresponding to the $f^{th}$ subframe or slot slot being:

$K^f(n)=K((n+p) \mod N)$, where $K^f(n)$ is the sequence number of the $n^{th}$ eREG corresponding to a first eCCE in the physical resource block pair in the $f^{th}$ subframe or slot, K(n) is the sequence number of the $n^{th}$ eREG corresponding to the first eCCE in the physical resource block pair in a first subframe or a first slot slot, n=0, 1, . . . , or N−1, and p is a step length of the cyclic shift.

Assuming that the step length of cyclic shift between two slots is 2, the following table shows a mapping template under an Extended CP when p=2:

When the step length of the cyclic shift is p=2, a blank cell in the following table represents a resource element occupied by a DMRS. The first 6 columns show an eREG-to-RE mapping relationship in the physical resource block pair in the first slot, and the last 6 columns in the table show a mapping relationship in the second slot after a cyclic shift is performed for the eREG-to-RE mapping in the physical resource block pair at a step length of 2. Each cell in the table may be regarded as a resource occupied by each RE.

| 0 | 12 | 8 | 4 | 0 | 8 | 2 | 14 | 10 | 6 | — | — |
|---|---|---|---|---|---|---|---|---|---|---|---|
| 1 | 13 | 9 | 5 | — | — | 3 | 15 | 11 | 7 | 2 | 10 |
| 2 | 14 | 10 | 6 | 1 | 9 | 4 | 0 | 12 | 8 | 3 | 11 |
| 3 | 15 | 11 | 7 | 2 | 10 | 5 | 1 | 13 | 9 | — | — |
| 4 | 0 | 12 | 8 | — | — | 6 | 2 | 14 | 10 | 4 | 12 |
| 5 | 1 | 13 | 9 | 3 | 11 | 7 | 3 | 15 | 11 | 5 | 13 |
| 6 | 2 | 14 | 10 | 4 | 12 | 8 | 4 | 0 | 12 | — | — |
| 7 | 3 | 15 | 11 | — | — | 9 | 5 | 1 | 13 | 6 | 14 |
| 8 | 4 | 0 | 12 | 5 | 13 | 10 | 6 | 2 | 14 | 7 | 15 |
| 9 | 5 | 1 | 13 | 6 | 14 | 11 | 7 | 3 | 15 | — | — |
| 10 | 6 | 2 | 14 | — | — | 12 | 8 | 4 | 0 | 8 | 0 |
| 11 | 7 | 3 | 15 | 7 | 15 | 13 | 9 | 5 | 1 | 9 | 1 |

When the step length of the cyclic shift is p=1, a mapping template under an Extended CP is shown in the following Table 2. The first 6 columns in the table show an eREG-to-RE mapping relationship in the physical resource block pair in the first slot, and the last 6 columns in the table show a mapping relationship in the second slot after a cyclic shift is performed for the eREG-to-RE mapping in the physical resource block pair at a step length of 1, as shown below:

| 0 | 12 | 8 | 4 | 0 | 8 | 1 | 13 | 9 | 5 | — | — |
|---|---|---|---|---|---|---|---|---|---|---|---|
| 1 | 13 | 9 | 5 | — | — | 2 | 14 | 10 | 6 | 1 | 9 |
| 2 | 14 | 10 | 6 | 1 | 9 | 3 | 15 | 11 | 7 | 2 | 10 |
| 3 | 15 | 11 | 7 | 2 | 10 | 4 | 0 | 12 | 8 | — | — |
| 4 | 0 | 12 | 8 | — | — | 5 | 1 | 13 | 9 | 3 | 11 |
| 5 | 1 | 13 | 9 | 3 | 11 | 6 | 2 | 14 | 10 | 4 | 12 |
| 6 | 2 | 14 | 10 | 4 | 12 | 7 | 3 | 15 | 11 | — | — |
| 7 | 3 | 15 | 11 | — | — | 8 | 4 | 0 | 12 | 5 | 13 |
| 8 | 4 | 0 | 12 | 5 | 13 | 9 | 5 | 1 | 13 | 6 | 14 |
| 9 | 5 | 1 | 13 | 6 | 14 | 10 | 6 | 2 | 14 | — | — |
| 10 | 6 | 2 | 14 | — | — | 11 | 7 | 3 | 15 | 7 | 15 |
| 11 | 7 | 3 | 15 | 7 | 15 | 12 | 8 | 4 | 0 | 8 | 0 |

Further, OFDM symbols occupied by the physical resource block pair in each slot may be classified into a part that includes a DMRS and a part that does not include the DMRS. In this case, a cyclic shift p1 and a cyclic shift p2 may be performed for the two parts independently, where p1 and p2 correspond to shift step lengths of the two parts respectively.

Assuming that p1=2, the following table shows a cyclic shift template under an Extended CP when p1=1:

| 0 | 12 | 8 | 4 | 0 | 8 | 2 | 14 | 10 | 6 | — | — |
|---|---|---|---|---|---|---|---|---|---|---|---|
| 1 | 13 | 9 | 5 | — | — | 3 | 15 | 11 | 7 | 1 | 9 |
| 2 | 14 | 10 | 6 | 1 | 9 | 4 | 0 | 12 | 8 | 2 | 10 |
| 3 | 15 | 11 | 7 | 2 | 10 | 5 | 1 | 13 | 9 | — | — |
| 4 | 0 | 12 | 8 | — | — | 6 | 2 | 14 | 10 | 3 | 11 |
| 5 | 1 | 13 | 9 | 3 | 11 | 7 | 3 | 15 | 11 | 4 | 12 |
| 6 | 2 | 14 | 10 | 4 | 12 | 8 | 4 | 0 | 12 | — | — |
| 7 | 3 | 15 | 11 | — | — | 9 | 5 | 1 | 13 | 5 | 13 |
| 8 | 4 | 0 | 12 | 5 | 13 | 10 | 6 | 2 | 14 | 6 | 14 |
| 9 | 5 | 1 | 13 | 6 | 14 | 11 | 7 | 3 | 15 | — | — |
| 10 | 6 | 2 | 14 | — | — | 12 | 8 | 4 | 0 | 7 | 15 |
| 11 | 7 | 3 | 15 | 7 | 15 | 13 | 9 | 5 | 1 | 8 | 0 |

For a Normal CP, assuming that every 48 REs form a group for the frequency domain first and the time domain later, the entire PRB pair may correspond to 3 eREG-to-RE mappings consecutively. Cyclic shifts are performed between the 3 mappings at a step length of p, or cyclic shifts are performed for the second mapping and the third mapping at a step length of p1 and a step length of p2 separately, where p, p1, p2=1, 2, . . . , 15. The following uses p1=1 and p2=2 as examples. After the cyclic shift, the template is shown below:

| | | | | | | | | | | | | | |
|---|---|---|---|---|---|---|---|---|---|---|---|---|---|
| 0 | 12 | 8 | 4 | 1 | — | — | 9 | 5 | 2 | 14 | 10 | — | — |
| 1 | 13 | 9 | 5 | 2 | — | — | 10 | 6 | 3 | 15 | 11 | — | — |
| 2 | 14 | 10 | 6 | 3 | 13 | 3 | 11 | 7 | 4 | 0 | 12 | 6 | 12 |
| 3 | 15 | 11 | 7 | 4 | 14 | 4 | 12 | 8 | 5 | 1 | 13 | 7 | 13 |
| 4 | 0 | 12 | 8 | 5 | 15 | 5 | 13 | 9 | 6 | 2 | 14 | 8 | 14 |
| 5 | 1 | 13 | 9 | 6 | — | — | 14 | 10 | 7 | 3 | 15 | — | — |
| 6 | 2 | 14 | 10 | 7 | — | — | 15 | 11 | 8 | 4 | 0 | — | — |
| 7 | 3 | 15 | 11 | 8 | 0 | 6 | 0 | 12 | 9 | 5 | 1 | 9 | 15 |
| 8 | 4 | 0 | 12 | 9 | 1 | 7 | 1 | 13 | 10 | 6 | 2 | 10 | 0 |
| 9 | 5 | 1 | 13 | 10 | 2 | 8 | 2 | 14 | 11 | 7 | 3 | 11 | 1 |
| 10 | 6 | 2 | 14 | 11 | — | — | 3 | 15 | 12 | 8 | 4 | — | — |
| 11 | 7 | 3 | 15 | 12 | — | — | 4 | 0 | 13 | 9 | 5 | — | — |

As can be seen from the foregoing tables, after the cyclic shifts, each eREG is evenly scattered into the entire physical resource block pair, and therefore, the performance is more balanced between the eREGs, and the eCCE mapped from the eREGs is more balanced.

704. Send the eCCE by using the resource elements included in the eREGs corresponding to the sequence numbers of the eREGs mapped from the eCCE.

In this case, because the sequence numbers of the eREGs included in the eCCE are definite, but the eREGs have different sequence numbers in different PRB pairs or at different time points, the eCCEs that form the control channel at different times are mapped to different eREGs, and an effect of randomizing eCCE interference is achieved to some extent.

In an executable manner, L physical resource block pairs that are used to transmit the control channel are determined, and resource elements except a demodulation reference signal DMRS in each physical resource block pair of the L physical resource block pairs are grouped into at least one eREG, where L is an integer greater than 0;

the eCCEs that form the control channel and the sequence numbers of the eREGs mapped from each eCCE are obtained according to an aggregation level of the control channel;

the eREGs are mapped onto the resource elements in the physical resource block pairs corresponding to different subframes or different slots; and the eCCE is sent by using the resource elements included in the eREGs corresponding to the sequence numbers of the eREGs mapped from the eCCE.

In one aspect, the mapping the eREGs onto the resource elements in the physical resource block pairs corresponding to different subframes or different slots includes:

numbering the eREGs corresponding to the resource elements in a physical resource block corresponding to a first subframe or a first slot;

performing a cyclic shift for the sequence numbers of the eREGs corresponding to the resource elements in the physical resource block corresponding to the first subframe or the first slot to obtain sequence numbers of the eREGs corresponding to the resource elements in a physical resource block corresponding to a second subframe or a second slot; and mapping the eREGs onto the resource elements in the corresponding physical resource block according to the sequence numbers of the eREGs corresponding to the resource elements in the physical resource block corresponding to the second subframe or the second slot.

In one aspect, a rule for mapping the eREGs onto the resource elements in the physical resource block pairs corresponding to different subframes or different slots includes:

in the $f^{th}$ subframe or slot, a sequence number of an eREG corresponding to a first RE in a physical resource block pair corresponding to the $f^{th}$ subframe or slot slot being:

$K^f=((K+p) \bmod N)$, where $K^f$ is a sequence number of an eREG corresponding to the first RE in the physical resource block pair corresponding to the $f^{th}$ subframe or slot, K is a sequence number of an eREG corresponding to an RE corresponding to a first subframe or slot and located in the same location as the first RE on a time domain and a frequency domain, and p is a step length of a cyclic shift.

In one aspect, the performing a cyclic shift for the sequence numbers of the eREGs corresponding to the resource elements in the physical resource block corresponding to the first subframe or the first slot to obtain sequence numbers of the eREGs corresponding to the resource elements in a physical resource block corresponding to a second subframe or a second slot includes:

classifying resource elements in the physical resource block corresponding to the first slot or the first subframe into resource elements used to transmit a DMRS and resource elements not used to transmit the DMRS, performing a cyclic shift for a sequence number of an eREG corresponding to a resource element used to transmit the DMRS in the physical resource block corresponding to the first slot or the first subframe to obtain a sequence number of an eREG corresponding to a resource element used to transmit the DMRS in the physical resource block corresponding to the second slot or the second subframe, and performing a cyclic shift for a sequence number of an eREG corresponding to a resource element not used to transmit the DMRS in the physical resource block corresponding to the first slot or the first subframe to obtain a sequence number of an eREG corresponding to a resource element not used to transmit the DMRS in the physical resource block corresponding to the second slot or the second subframe.

In one aspect, a mapping rule for mapping each eCCE onto the eREGs includes:

in the $f^{th}$ subframe or slot, a sequence number of the $n^{th}$ eREG in a physical resource block pair corresponding to the $f^{th}$ subframe or slot slot being:

$K^f(n)=K((n+p) \bmod N)$, where $K^f(n)$ is the sequence number of the $n^{th}$ eREG corresponding to a first eCCE in the physical resource block pair in the $f^{th}$ subframe or slot, K(n) is the sequence number of the $n^{th}$ eREG corresponding to the first eCCE in the physical resource block pair in a first subframe or a first slot slot, n=0, 1, . . . , or N−1, and p is a step length of the cyclic shift.

Figure 8:
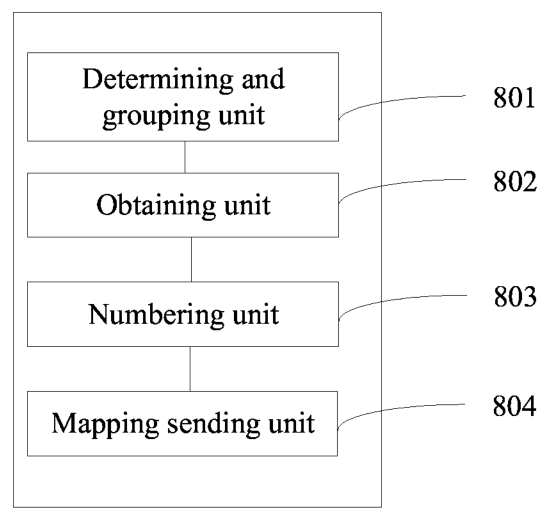
FIG. 8 is a structural block diagram of a control channel transmission apparatus according to Embodiment 2.

The embodiment of the present invention further provides a control channel transmission apparatus. As shown in FIG. 8, the apparatus includes a determining and grouping unit 801, an obtaining unit 802, a numbering unit 803, and a mapping sending unit 804.

The determining and grouping unit 801 is configured to determine L physical resource block pairs that are used to transmit a control channel, and group resource elements except a demodulation reference signal DMRS in each physical resource block pair of the L physical resource block pairs into at least one eREG, where L is an integer greater than 0.

When data is transmitted on a control channel, first, the determining unit 801 needs to determine the physical resource block pairs occupied by the control channel, that is, determine that the control channel can be transmitted on the L physical resource block pairs. Then the resource elements except a demodulation reference signal DMRS in each physical resource block pair of the L physical resource block pairs are grouped into at least one eREG, where L is an integer greater than 0.

The obtaining unit 802 is configured to obtain, according to an aggregation level of the control channel, the number of eCCEs that form the control channel and sequence numbers of eREGs mapped from each eCCE.

According to the aggregation level of the control channel, the obtaining unit 802 can obtain the number of eCCEs that form the control channel, and determine the specific eREG sequence numbers included in each eCCE according to a fixed rule.

The numbering unit 803 is configured to: when L is greater than 1, number the eREGs differently in different physical resource block pairs of the L physical resource block pairs; or, when L is equal to 1, number the eREGs in the physical resource block pair differently according to different transmitting time points of the control channel.

If the eREGs mapped from the eCCE are distributed on L>1 physical resource blocks, the numbering unit 803 may number the N eREGs differently in different physical resource block pairs of the L physical resource block pairs. Assuming that each physical resource block pair includes N=8 eREGs, the eREGs in physical resource block pair 1 may be numbered 1, 2, 3, 4, 5, 6, 7, and 8; and, after undergoing a different shift, the eREGs in physical resource block pair 2 are numbered 2, 3, 4, 5, 6, 7, 8, and 1, and so on. The eREGs are numbered differently in different physical resource block pairs. Optionally, the eREGs in different physical resource block pairs of the L physical resource block pairs may be numbered in an interleaved manner. For example, a resource element corresponding to the eREG numbered i in the first physical resource block pair of the L physical resource block pairs corresponds to an eREG numbered j in the $p^{th}$ physical resource block pair, where j=(i+p*N−1) % N, and N is the number of eREGs in each physical resource block pair. In a case where the sequence numbers of the eREGs mapped from each eCCE are definite, the eREGs corresponding to the sequence numbers of the eREGs mapped from each eCCE are located in different locations in different physical resource block pairs, which makes the actual sizes of the eCCEs formed by the eREGs balanced.

L=1 is intended for a scenario in which the eREGs mapped from the eCCE are distributed on one physical resource block pair. The numbering unit 803 may number the eREGs in the physical resource block pair differently according to different transmitting time points of the control channel. For example, at the first transmitting time point of the control channel, the eREGs in the physical resource block pair are numbered 1, 2, 3, 4, 5, 6, 7, and 8; and, at the second transmitting time point of the control channel, the eREGs in the physical resource block pair are shifted cyclically and numbered 2, 3, 4, 5, 6, 7, 8, and 1. In this way, after interleaving or cyclic shift is performed, in a case where the sequence numbers of the eREGs included in each eCCE are definite, a balance between the actual sizes of the eCCEs formed by the eREGs can be ensured.

Optionally, the numbering unit 803 is further configured to in the $f^{th}$ subframe or slot, number the $n^{th}$ eREG in the physical resource block pair as $K^f(n)=K((n+p)\text{mod } N)$, where $K^f(n)$ is the sequence number of the $n^{th}$ eREG in the physical resource block pair in the $f^{th}$ sub$^{fr}$ame or slot, K(n) is the sequence number of the $n^{th}$ eREG in the physical resource block pair in a first sub$^{fr}$ame or slot, n=0, 1, . . . , N−1, and p is a step length of the cyclic shift. Optionally, the subframe or slot slot number is used as the step length of the cyclic shift.

Further, the numbering unit 803 is further configured to classify the physical resource block pairs in each slot into a part that includes a DMRS and a part that does not include the DMRS, and perform a cyclic shift for the eREG-to-resource element mapping in the two parts separately.

The mapping sending unit 804 is configured to send the eCCE by using the resource elements included in the eREGs corresponding to the sequence numbers of the eREGs mapped from the eCCE.

In this case, because the sequence numbers of the eREGs included in the eCCE are definite, but the eREGs have different sequence numbers in different PRBs or at different time points, the eCCEs that form the control channel at different times are mapped to different eREGs, and an effect of randomizing eCCE interference is achieved to some extent.

In one aspect, an apparatus is further provided:

A control channel transmission apparatus includes:

a second determining and grouping unit, configured to determine L physical resource block pairs that are used to transmit a control channel, and group resource elements except a demodulation reference signal DMRS in each physical resource block pair of the L physical resource block pairs into at least one eREG, where L is an integer greater than 0;

a second obtaining unit, configured to obtain, according to an aggregation level of the control channel, eCCEs that form the control channel and sequence numbers of eREGs mapped from each eCCE;

a second mapping unit, configured to map the eREGs onto the resource elements in the physical resource block pairs corresponding to different subframes or different slots; and a second sending unit, configured to send the eCCE by using the resource elements included in the eREGs corresponding to the sequence numbers of the eREGs mapped from the eCCE.

The second mapping unit is configured to:

number the eREGs corresponding to the resource elements in a physical resource block corresponding to a first subframe or a first slot;

perform a cyclic shift for the sequence numbers of the eREGs corresponding to the resource elements in the physical resource block corresponding to the first subframe or the first slot to obtain sequence numbers of the eREGs corresponding to the resource elements in a physical resource block corresponding to a second subframe or a second slot; and map the eREGs onto the resource elements in the corresponding physical resource block according to the sequence numbers of the eREGs corresponding to the resource elements in the physical resource block corresponding to the second subframe or the second slot.

A rule for mapping the eREGs onto the resource elements in the physical resource block pairs corresponding to different subframes or different slots includes:

in the $f^{th}$ subframe or slot, a sequence number of an eREG corresponding to a first RE in a physical resource block pair corresponding to the $f^{th}$ subframe or slot slot being:

$K^f=((K+p)\text{mod } N)$, where $K^f$ is a sequence number of an eREG corresponding to the first RE in the physical resource block pair corresponding to the $f^{th}$ subframe or slot, K is a sequence number of an eREG corresponding to an RE corresponding to a first subframe or slot and located in the same location as the first RE on a time domain and a frequency domain, and p is a step length of a cyclic shift.

The second mapping unit is configured to:

classify resource elements in the physical resource block corresponding to the first slot or the first subframe into resource elements used to transmit a DMRS and resource elements not used to transmit the DMRS, perform a cyclic shift for a sequence number of an eREG corresponding to a resource element used to transmit the DMRS in the physical resource block corresponding to the first slot or the first subframe to obtain a sequence number of an eREG corresponding to a resource element used to transmit the DMRS in the physical resource block corresponding to the second slot or the second subframe, and perform a cyclic shift for a sequence number of an eREG corresponding to a resource element not used to transmit the DMRS in the physical resource block corresponding to the first slot or the first subframe to obtain a sequence number of an eREG corresponding to a resource element not used to transmit the DMRS in the physical resource block corresponding to the second slot or the second subframe; and map the eREGs onto the resource elements in the corresponding physical resource block according to the sequence numbers of the eREGs corresponding to the resource elements used to transmit a DMRS in the physical resource block corresponding to the second slot or the second subframe, or map the eREGs onto the resource elements in the corresponding physical resource block according to the sequence numbers of the eREGs corresponding to the resource elements not used to transmit the DMRS in the physical resource block corresponding to the second slot or the second subframe.

In one aspect, a mapping rule for mapping each eCCE onto the eREGs includes:

in the $f^{th}$ subframe or slot, a sequence number of the $n^{th}$ eREG in a physical resource block pair corresponding to the $f^{th}$ subframe or slot slot being:

$K^f(n)=K((n+p) \bmod N)$, where $K^f(n)$ is the sequence number of the $n^{th}$ eREG corresponding to a first eCCE in the physical resource block pair in the $f^{th}$ subframe or slot, $K(n)$ is the sequence number of the $n^{th}$ eREG corresponding to the first eCCE in the physical resource block pair in a first subframe or a first slot slot, n=0, 1, . . . , or N−1, and p is a step length of the cyclic shift.

Figure 9:
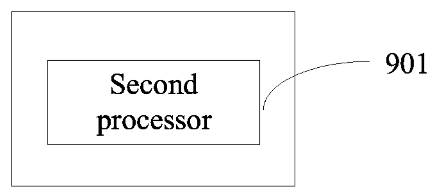
FIG. 9 is a structural block diagram of another control channel transmission apparatus according to Embodiment 2.

The embodiment of the present invention further provides a control channel transmission apparatus. As shown in FIG. 9, the apparatus includes a second processor 901.

The second processor 901 is configured to determine L physical resource block pairs that are used to transmit a control channel, and group resource elements except a demodulation reference signal DMRS in each physical resource block pair of the L physical resource block pairs into at least one eREG, where L is an integer greater than 0.

When data is transmitted on a control channel, first, the second processor 901 needs to determine the physical resource block pairs occupied by the control channel, that is, determine that the control channel can be transmitted on the L physical resource block pairs. Then the resource elements except a demodulation reference signal DMRS in each physical resource block pair of the L physical resource block pairs are grouped into at least one eREG, where L is an integer greater than 0.

The second processor 901 is further configured to obtain, according to an aggregation level of the control channel, the number of eCCEs that form the control channel and eREG sequence numbers mapped from each eCCE.

According to the aggregation level of the control channel, the second processor 901 can obtain the number of eCCEs that form the control channel, and determine the specific eREG sequence numbers included in each eCCE according to a fixed rule.

The second processor 901 is further configured to: when L is greater than 1, number the eREGs differently in different physical resource block pairs of the L physical resource block pairs; or, when L is equal to 1, number the eREGs of the physical resource block pair differently according to different transmitting time points of the control channel.

The second processor 901 is further configured to in the $f^{th}$ subframe or slot, number the $n^{th}$ eREG in the physical resource block pair as:

$K^f(n)=K((n+p) \bmod N)$, where $K^f(n)$ is the sequence number of the $n^{th}$ eREG in the physical resource block pair in the $f^{th}$ subframe or slot, $K(n)$ is the sequence number of the $n^{th}$ eREG in the physical resource block pair in a first subframe or slot, n=0, 1, . . . , N−1, and p is a step length of the cyclic shift. Optionally, the subframe or slot slot number is used as the step length of the cyclic shift.

Further, the second processor 901 is further configured to classify the physical resource block pairs in each slot into a part that includes a DMRS and a part that does not include the DMRS, and perform a cyclic shift for the eREG-to-resource element mapping in the two parts separately.

The second processor 901 is further configured to send the eCCE by using the resource elements included in the eREGs corresponding to the sequence numbers of the eREGs mapped from the eCCE.

In this case, because the sequence numbers of the eREGs included in the eCCE are definite, but the eREGs have different sequence numbers in different PRBs or at different time points, the eCCEs that form the control channel at different times are mapped to different eREGs, and an effect of randomizing eCCE interference is achieved to some extent.

A control channel transmission apparatus includes:

a sixth processor, configured to determine L physical resource block pairs that are used to transmit a control channel, and group resource elements except a demodulation reference signal DMRS in each physical resource block pair of the L physical resource block pairs into at least one eREG, where L is an integer greater than 0, where the sixth processor is further configured to obtain, according to an aggregation level of the control channel, eCCEs that form the control channel and sequence numbers of eREGs mapped from each eCCE; and the sixth processor is further configured to map the eREGs onto the resource elements in the physical resource block pairs corresponding to different subframes or different slots; and a third transmitter, configured to send the eCCE by using the resource elements included in the eREGs corresponding to the sequence numbers of the eREGs mapped from the eCCE.

The sixth processor is configured to:

number the eREGs corresponding to the resource elements in a physical resource block corresponding to a first subframe or a first slot;

perform a cyclic shift for the sequence numbers of the eREGs corresponding to the resource elements in the physical resource block corresponding to the first subframe or the first slot to obtain sequence numbers of the eREGs corresponding to the resource elements in a physical resource block corresponding to a second subframe or a second slot; and map the eREGs onto the resource elements in the corresponding physical resource block according to the sequence numbers of the eREGs corresponding to the resource elements in the physical resource block corresponding to the second subframe or the second slot.

A rule for mapping the eREGs onto the resource elements in the physical resource block pairs corresponding to different subframes or different slots includes:

in the $f^{th}$ subframe or slot, a sequence number of an eREG corresponding to a first RE in a physical resource block pair corresponding to the $f^{th}$ subframe or slot slot being:

$K^f=((K+p)\mathrm{mod}\ N)$, where $K^f$ is a sequence number of an eREG corresponding to the first RE in the physical resource block pair corresponding to the $f^{th}$ subframe or slot, K is a sequence number of an eREG corresponding to an RE corresponding to a first subframe or slot and located in the same location as the first RE on a time domain and a frequency domain, and p is a step length of a cyclic shift.

The sixth processor is configured to:

classify resource elements in the physical resource block corresponding to the first slot or the first subframe into resource elements used to transmit a DMRS and resource elements not used to transmit the DMRS, perform a cyclic shift for a sequence number of an eREG corresponding to a resource element used to transmit the DMRS in the physical resource block corresponding to the first slot or the first subframe to obtain a sequence number of an eREG corresponding to a resource element used to transmit the DMRS in the physical resource block corresponding to the second slot or the second subframe, and perform a cyclic shift for a sequence number of an eREG corresponding to a resource element not used to transmit the DMRS in the physical resource block corresponding to the first slot or the first subframe to obtain a sequence number of an eREG corresponding to a resource element not used to transmit the DMRS in the physical resource block corresponding to the second slot or the second subframe; and map the eREGs onto the resource elements in the corresponding physical resource block according to the sequence numbers of the eREGs corresponding to the resource elements used to transmit a DMRS in the physical resource block corresponding to the second slot or the second subframe, or map the eREGs onto the resource elements in the corresponding physical resource block according to the sequence numbers of the eREGs corresponding to the resource elements not used to transmit the DMRS in the physical resource block corresponding to the second slot or the second subframe.

A mapping rule for mapping each eCCE onto the eREGs includes:

in the $f^{th}$ subframe or slot, a sequence number of the $n^{th}$ eREG in a physical resource block pair corresponding to the $f^{th}$ subframe or slot slot being:

$K^f(n)=K((n+p)\mathrm{mod}\ N)$, where $K^f(n)$ is the sequence number of the $n^{th}$ eREG corresponding to a first eCCE in the physical resource block pair in the $f^{th}$ subframe or slot, K(n) is the sequence number of the $n^{th}$ eREG corresponding to the first eCCE in the physical resource block pair in a first subframe or a first slot slot, n=0, 1, . . . , or N−1, and p is a step length of the cyclic shift.

In the control channel transmission method and apparatus according to the embodiment of the present invention, after the sequence numbers of the eREGs that form each eCCE are determined, the eREGs between the physical resource block pairs are numbered differently; or, the eREGs of each of the physical resource block pairs are numbered differently at different transmitting time points of the control channel, which can keep a balance between actual sizes of the formed eCCEs and further ensure a performance balance between the eCCEs. In addition, because the eREGs in different physical resource block pairs are numbered differently, an effect of randomizing eCCE interference is achieved to some extent.

Embodiment 3

Figure 10:
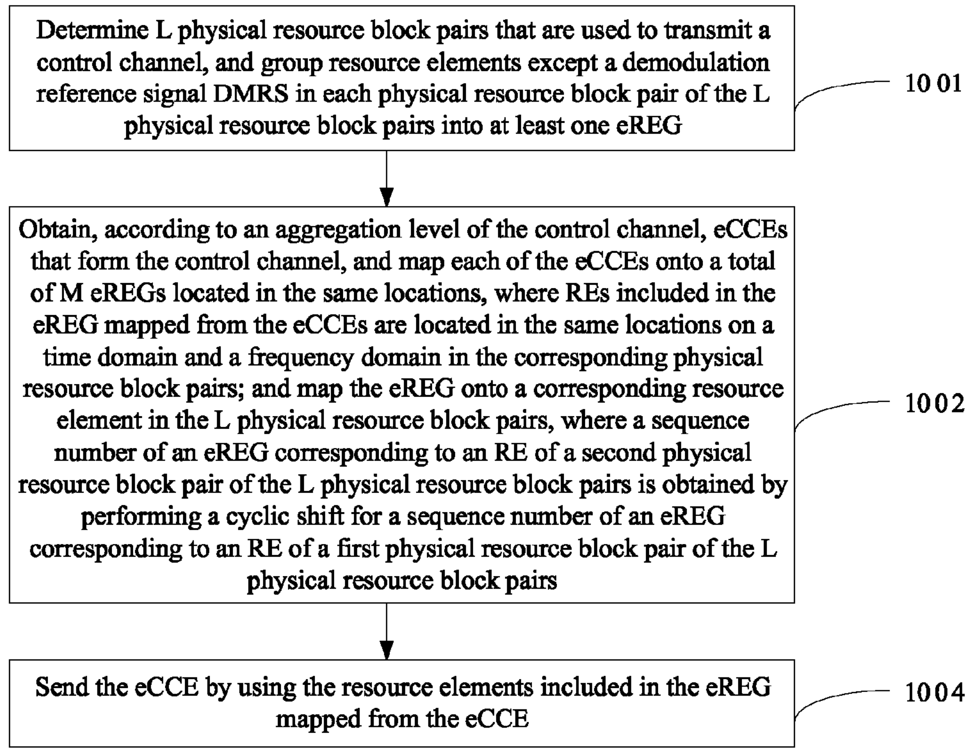
FIG. 10 is a schematic flowchart of a control channel transmission method according to Embodiment 3.

The embodiment of the present invention provides a control channel transmission method. As shown in FIG. 10, the method includes the following steps:

1001. Determine L physical resource block pairs that are used to transmit a control channel, and group resource elements except a demodulation reference signal DMRS in each physical resource block pair of the L physical resource block pairs into at least one eREG, where L is an integer greater than 1.

When data is transmitted on a control channel, the physical resource block pairs occupied by the control channel need to be determined first, that is, it is determined that the control channel can be transmitted on the L physical resource block pairs. Then the resource elements except a demodulation reference signal DMRS in each physical resource block pair of the L physical resource block pairs are grouped into N eREGs, where L is an integer greater than 0.

An eREG may serve as a minimum unit of an enhanced physical downlink control channel under a centralized transmission manner and a discrete transmission manner. Each physical resource block pair is fixedly grouped into 16 eREGs, where the 16 eREGs are numbered 0 to 15 consecutively.

1002. Obtain, according to an aggregation level of the control channel, eCCEs that form the control channel, and map the eCCEs onto the eREG, where REs included in the eREG mapped from the eCCEs are located in the same locations on a time domain and a frequency domain in the corresponding physical resource block pairs; and map the eREG onto a corresponding resource element in the L physical resource block pairs, where a sequence number of an eREG corresponding to an RE of a second physical resource block pair of the L physical resource block pairs is obtained by performing a cyclic shift for a sequence number of an eREG corresponding to an RE of a first physical resource block pair of the L physical resource block pairs.

The eCCEs that form the control channel can be obtained according to an aggregation level of the control channel, and each eCCE is mapped onto a total of M eREGs located in the same locations in the L PRBs.

After the cyclic shift is performed for the 4 physical resource block pairs, each eCCE corresponds to the eREGs in the same locations in different physical resource block pairs respectively. For example, when the step length p=4, the first eCCE corresponds to eREGs 0, 4, 8, and 12 in the 4 physical resource block pairs in turn (the eREGs in the first location in each physical resource block pair). Specific mapping relationships of the eREGs mapped from each eCCE are shown below:

| | eCCE sequence number | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| eREG sequence number in PRB pair#1 | 0 | 1 | 2 | 3 | 4 | 5 | 6 | 7 | 8 | 9 | 10 | 11 | 12 | 13 |

-continued

| | eCCE sequence number | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| eREG sequence number in PRB pair#2 | 4 | 5 | 6 | 7 | 8 | 9 | 10 | 11 | 12 | 13 | 14 | 15 | 0 | 1 |
| eREG sequence number in PRB pair#3 | 8 | 9 | 10 | 11 | 12 | 13 | 14 | 15 | 0 | 1 | 2 | 3 | 4 | 5 |
| eREG sequence number in PRB pair#4 | 12 | 13 | 14 | 15 | 0 | 1 | 2 | 3 | 4 | 5 | 6 | 7 | 8 | 9 |

Alternatively, the eCCEs are numbered in the following way. That is, the N eREGs that form each Localized eCCE are put into one group, and then alternate selection is made from the configured physical resource block pairs. Therefore, the specific mapping relationships of the eREGs mapped from each eCCE are shown in the following table:

| | eCCE sequence number | | | | | | | | | | | | | | | |
|---|---|---|---|---|---|---|---|---|---|---|---|---|---|---|---|---|
| | 0 | 4 | 8 | 12 | 1 | 5 | 9 | 13 | 2 | 6 | 10 | 14 | 3 | 7 | 11 | 15 |
| eREG sequence number in PRB pair#1 | 0 | 1 | 2 | 3 | 4 | 5 | 6 | 7 | 8 | 9 | 10 | 11 | 12 | 13 | 14 | 15 |
| eREG sequence number in PRB pair#2 | 4 | 5 | 6 | 7 | 8 | 9 | 10 | 11 | 12 | 13 | 14 | 15 | 0 | 1 | 2 | 3 |
| eREG sequence number in PRB pair#3 | 8 | 9 | 10 | 11 | 12 | 13 | 14 | 15 | 0 | 1 | 2 | 3 | 4 | 5 | 6 | 7 |
| eREG sequence number in PRB pair#4 | 12 | 13 | 14 | 15 | 0 | 1 | 2 | 3 | 4 | 5 | 6 | 7 | 8 | 9 | 10 | 11 |

Similarly, when L=2, 8, 16, the mapping relationships are shown below respectively:

When L=2, the eCCE corresponding to 2 physical resource block pairs is formed by the following eREGs:

| | eCCE sequence number | | | | | | | | | | | | | | | |
|---|---|---|---|---|---|---|---|---|---|---|---|---|---|---|---|---|
| | 0 | 1 | 2 | 3 | 4 | 5 | 6 | 7 | 0 | 1 | 2 | 3 | 4 | 5 | 6 | 7 |
| eREG sequence number in PRB pair#1 | 0 | 1 | 2 | 3 | 4 | 5 | 6 | 7 | 8 | 9 | 10 | 11 | 12 | 13 | 14 | 15 |
| eREG sequence number in PRB pair#2 | 4 | 5 | 6 | 7 | 8 | 9 | 10 | 11 | 12 | 13 | 14 | 15 | 0 | 1 | 2 | 3 |

or:

| | eCCE sequence number | | | | | | | | | | | | | | | |
|---|---|---|---|---|---|---|---|---|---|---|---|---|---|---|---|---|
| | 0 | 1 | 2 | 3 | 0 | 1 | 2 | 3 | 4 | 5 | 6 | 7 | 4 | 5 | 6 | 7 |
| eREG sequence number in PRB pair#1 | 0 | 1 | 2 | 3 | 4 | 5 | 6 | 7 | 8 | 9 | 10 | 11 | 12 | 13 | 14 | 15 |

-continued

| | | | | | | | | | | | | | | | | |
|---|---|---|---|---|---|---|---|---|---|---|---|---|---|---|---|---|
| eREG sequence number in PRB pair#2 | 8 | 9 | 10 | 11 | 12 | 13 | 14 | 15 | 0 | 1 | 2 | 3 | 4 | 5 | 6 | 7 |

Likewise, alternatively, the eCCEs may also be numbered in the following way. That is, the N eREGs that form the Localized eCCE are put into one group, and then alternate selection is made from the configured physical resource block pairs. Therefore, the specific mapping relationships of the eREGs mapped from each eCCE are shown in the following table:

| | eCCE index | | | | | | | | | | | | | | | |
|---|---|---|---|---|---|---|---|---|---|---|---|---|---|---|---|---|
| | 0 | 2 | 4 | 6 | 0 | 2 | 4 | 6 | 1 | 3 | 5 | 7 | 1 | 3 | 5 | 7 |
| PRB pair#1 | 0 | 1 | 2 | 3 | 4 | 5 | 6 | 7 | 8 | 9 | 10 | 11 | 12 | 13 | 14 | 15 |
| PRB pair#2 | 8 | 9 | 10 | 11 | 12 | 13 | 14 | 15 | 0 | 1 | 2 | 3 | 4 | 5 | 6 | 7 |

or

| | eCCE sequence number | | | | | | | | | | | | | | | |
|---|---|---|---|---|---|---|---|---|---|---|---|---|---|---|---|---|
| | 0 | 2 | 4 | 6 | 1 | 3 | 5 | 7 | 0 | 2 | 4 | 6 | 1 | 3 | 5 | 7 |
| eREG sequence number in PRB pair#1 | 0 | 1 | 2 | 3 | 4 | 5 | 6 | 7 | 8 | 9 | 10 | 11 | 12 | 13 | 14 | 15 |
| eREG sequence number in PRB pair#2 | 4 | 5 | 6 | 7 | 8 | 9 | 10 | 11 | 12 | 13 | 14 | 15 | 0 | 1 | 2 | 3 |

When L=8, the eREGs mapped from the eCCE corresponding to 8 physical resource block pairs are shown in the following table:

| | eCCE sequence number | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| eREG sequence number in PRB pair#1 | 0 | 1 | 2 | 3 | 4 | 5 | 6 | 7 | 8 | 9 | 10 | 11 | 12 | 13 | 14 | 15 |
| eREG sequence number in PRB pair#2 | 4 | 5 | 6 | 7 | 8 | 9 | 10 | 11 | 12 | 13 | 14 | 15 | 0 | 1 | 2 | 3 |
| eREG sequence number in PRB pair#3 | 8 | 9 | 10 | 11 | 12 | 13 | 14 | 15 | 0 | 1 | 2 | 3 | 4 | 5 | 6 | 7 |
| eREG sequence number in PRB pair#4 | 12 | 13 | 14 | 15 | 0 | 1 | 2 | 3 | 4 | 5 | 6 | 7 | 8 | 9 | 10 | 11 |
| | eREG sequence number in eCCE index | | | | | | | | | | | | | | | |
| | 16 | 17 | 18 | 19 | 30 | 21 | 22 | 23 | 24 | 25 | 26 | 27 | 28 | 29 | 30 | 31 |
| eREG sequence number in PRB pair#5 | 0 | 1 | 2 | 3 | 4 | 5 | 6 | 7 | 8 | 9 | 10 | 11 | 12 | 13 | 14 | 15 |
| eREG sequence number in PRB pair#6 | 4 | 5 | 6 | 7 | 8 | 9 | 10 | 11 | 12 | 13 | 14 | 15 | 0 | 1 | 2 | 3 |

-continued

| | | | | | | | | | | | | | | | | |
|---|---|---|---|---|---|---|---|---|---|---|---|---|---|---|---|---|
| eREG sequence number in PRB pair#7 | 8 | 9 | 10 | 11 | 12 | 13 | 14 | 15 | 0 | 1 | 2 | 3 | 4 | 5 | 6 | 7 |
| eREG sequence number in PRB pair#8 | 12 | 13 | 14 | 15 | 0 | 1 | 2 | 3 | 4 | 5 | 6 | 7 | 8 | 9 | 10 | 11 |

Likewise, the eCCEs may also be numbered in the following way, and therefore, the specific mapping relationships of the eREGs mapped from each eCCE are shown in the following table:

| | eCCE sequence number | | | | | | | | | | | | | | | |
|---|---|---|---|---|---|---|---|---|---|---|---|---|---|---|---|---|
| | 0 | 4 | 8 | 12 | 1 | 5 | 9 | 13 | 2 | 6 | 10 | 14 | 3 | 7 | 11 | 15 |
| eREG sequence number in PRB pair#1 | 0 | 1 | 2 | 3 | 4 | 5 | 6 | 7 | 8 | 9 | 10 | 11 | 12 | 13 | 14 | 15 |
| eREG sequence number in PRB pair#2 | 4 | 5 | 6 | 7 | 8 | 9 | 10 | 11 | 12 | 13 | 14 | 15 | 0 | 1 | 2 | 3 |
| eREG sequence number in PRB pair#3 | 8 | 9 | 10 | 11 | 12 | 13 | 14 | 15 | 0 | 1 | 2 | 3 | 4 | 5 | 6 | 7 |
| eREG sequence number in PRB pair#4 | 12 | 13 | 14 | 15 | 0 | 1 | 2 | 3 | 4 | 5 | 6 | 7 | 8 | 9 | 10 | 11 |
| | eREG sequence number in eCCE index | | | | | | | | | | | | | | | |
| | 16 | 30 | 24 | 28 | 17 | 21 | 25 | 29 | 18 | 22 | 26 | 30 | 19 | 23 | 27 | 31 |
| eREG sequence number in PRB pair#5 | 0 | 1 | 2 | 3 | 4 | 5 | 6 | 7 | 8 | 9 | 10 | 11 | 12 | 13 | 14 | 15 |
| eREG sequence number in PRB pair#6 | 4 | 5 | 6 | 7 | 8 | 9 | 10 | 11 | 12 | 13 | 14 | 15 | 0 | 1 | 2 | 3 |
| eREG sequence number in PRB pair#7 | 8 | 9 | 10 | 11 | 12 | 13 | 14 | 15 | 0 | 1 | 2 | 3 | 4 | 5 | 6 | 7 |
| eREG sequence number in PRB pair#8 | 12 | 13 | 14 | 15 | 0 | 1 | 2 | 3 | 4 | 5 | 6 | 7 | 8 | 9 | 10 | 11 |

When L=16, the eCCE corresponding to 16 physical resource block pairs is formed by the following eREGs:

| | eCCE sequence number | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| eREG sequence number in PRB pair#1 | 0 | 1 | 2 | 3 | 4 | 5 | 6 | 7 | 8 | 9 | 10 | 11 | 12 | 13 | 14 | 15 |
| eREG sequence number in PRB pair#2 | 4 | 5 | 6 | 7 | 8 | 9 | 10 | 11 | 12 | 13 | 14 | 15 | 0 | 1 | 2 | 3 |

-continued

| | | | | | | | | | | | | | | | | |
|---|---|---|---|---|---|---|---|---|---|---|---|---|---|---|---|---|
| eREG sequence number in PRB pair#3 | 8 | 9 | 10 | 11 | 12 | 13 | 14 | 15 | 0 | 1 | 2 | 3 | 4 | 5 | 6 | 7 |
| eREG sequence number in PRB pair#4 | 12 | 13 | 14 | 15 | 0 | 1 | 2 | 3 | 4 | 5 | 6 | 7 | 8 | 9 | 10 | 11 |

| | eCCE sequence number | | | | | | | | | | | | | | | |
|---|---|---|---|---|---|---|---|---|---|---|---|---|---|---|---|---|
| | 16 | 17 | 18 | 19 | 30 | 21 | 22 | 23 | 24 | 25 | 26 | 27 | 28 | 29 | 30 | 31 |
| eREG sequence number in PRB pair#5 | 0 | 1 | 2 | 3 | 4 | 5 | 6 | 7 | 8 | 9 | 10 | 11 | 12 | 13 | 14 | 15 |
| eREG sequence number in PRB pair#6 | 4 | 5 | 6 | 7 | 8 | 9 | 10 | 11 | 12 | 13 | 14 | 15 | 0 | 1 | 2 | 3 |
| eREG sequence number in PRB pair#7 | 8 | 9 | 10 | 11 | 12 | 13 | 14 | 15 | 0 | 1 | 2 | 3 | 4 | 5 | 6 | 7 |
| eREG sequence number in PRB pair#8 | 12 | 13 | 14 | 15 | 0 | 1 | 2 | 3 | 4 | 5 | 6 | 7 | 8 | 9 | 10 | 11 |

| | eCCE index | | | | | | | | | | | | | | | |
|---|---|---|---|---|---|---|---|---|---|---|---|---|---|---|---|---|
| | 32 | 33 | 34 | 35 | 36 | 37 | 38 | 39 | 40 | 41 | 42 | 43 | 44 | 45 | 46 | 47 |
| eREG sequence number in PRB pair#9 | 0 | 1 | 2 | 3 | 4 | 5 | 6 | 7 | 8 | 9 | 10 | 11 | 12 | 13 | 14 | 15 |
| eREG sequence number in PRB pair#10 | 4 | 5 | 6 | 7 | 8 | 9 | 10 | 11 | 12 | 13 | 14 | 15 | 0 | 1 | 2 | 3 |
| eREG sequence number in PRB pair#11 | 8 | 9 | 10 | 11 | 12 | 13 | 14 | 15 | 0 | 1 | 2 | 3 | 4 | 5 | 6 | 7 |
| eREG sequence number in PRB pair#12 | 12 | 13 | 14 | 15 | 0 | 1 | 2 | 3 | 4 | 5 | 6 | 7 | 8 | 9 | 10 | 11 |

| | eCCE index | | | | | | | | | | | | | | | |
|---|---|---|---|---|---|---|---|---|---|---|---|---|---|---|---|---|
| | 48 | 49 | 50 | 51 | 52 | 53 | 54 | 55 | 56 | 57 | 58 | 59 | 60 | 61 | 62 | 63 |
| eREG sequence number in PRB pair#13 | 0 | 1 | 2 | 3 | 4 | 5 | 6 | 7 | 8 | 9 | 10 | 11 | 12 | 13 | 14 | 15 |
| eREG sequence number in PRB pair#14 | 4 | 5 | 6 | 7 | 8 | 9 | 10 | 11 | 12 | 13 | 14 | 15 | 0 | 1 | 2 | 3 |
| eREG sequence number in PRB pair#15 | 8 | 9 | 10 | 11 | 12 | 13 | 14 | 15 | 0 | 1 | 2 | 3 | 4 | 5 | 6 | 7 |
| eREG sequence number in PRB pair#16 | 12 | 13 | 14 | 15 | 0 | 1 | 2 | 3 | 4 | 5 | 6 | 7 | 8 | 9 | 10 | 11 |

Likewise, the eCCEs may also be numbered in the following way, and therefore, the specific mapping relationships of the eREGs mapped from each eCCE are shown in the following table:

| | eCCE sequence number | | | | | | | | | | | | | | | |
|---|---|---|---|---|---|---|---|---|---|---|---|---|---|---|---|---|
| | 0 | 4 | 8 | 12 | 1 | 5 | 9 | 13 | 2 | 6 | 10 | 14 | 3 | 7 | 11 | 15 |
| eREG sequence number in PRB pair#1 | 0 | 1 | 2 | 3 | 4 | 5 | 6 | 7 | 8 | 9 | 10 | 11 | 12 | 13 | 14 | 15 |
| eREG sequence number in PRB pair#2 | 4 | 5 | 6 | 7 | 8 | 9 | 10 | 11 | 12 | 13 | 14 | 15 | 0 | 1 | 2 | 3 |
| eREG sequence number in PRB pair#3 | 8 | 9 | 10 | 11 | 12 | 13 | 14 | 15 | 0 | 1 | 2 | 3 | 4 | 5 | 6 | 7 |
| eREG sequence number in PRB pair#4 | 12 | 13 | 14 | 15 | 0 | 1 | 2 | 3 | 4 | 5 | 6 | 7 | 8 | 9 | 10 | 11 |

| | eCCE sequence number | | | | | | | | | | | | | | | |
|---|---|---|---|---|---|---|---|---|---|---|---|---|---|---|---|---|
| | 16 | 30 | 24 | 28 | 17 | 21 | 25 | 29 | 18 | 22 | 26 | 30 | 19 | 23 | 27 | 31 |
| eREG sequence number in PRB pair#5 | 0 | 1 | 2 | 3 | 4 | 5 | 6 | 7 | 8 | 9 | 10 | 11 | 12 | 13 | 14 | 15 |
| eREG sequence number in PRB pair#6 | 4 | 5 | 6 | 7 | 8 | 9 | 10 | 11 | 12 | 13 | 14 | 15 | 0 | 1 | 2 | 3 |
| eREG sequence number in PRB pair#7 | 8 | 9 | 10 | 11 | 12 | 13 | 14 | 15 | 0 | 1 | 2 | 3 | 4 | 5 | 6 | 7 |
| eREG sequence number in PRB pair#8 | 12 | 13 | 14 | 15 | 0 | 1 | 2 | 3 | 4 | 5 | 6 | 7 | 8 | 9 | 10 | 11 |

| | eREG sequence number in eCCE index | | | | | | | | | | | | | | | |
|---|---|---|---|---|---|---|---|---|---|---|---|---|---|---|---|---|
| | 32 | 36 | 40 | 44 | 33 | 37 | 41 | 45 | 34 | 38 | 42 | 46 | 35 | 39 | 43 | 47 |
| eREG sequence number in PRB pair#9 | 0 | 1 | 2 | 3 | 4 | 5 | 6 | 7 | 8 | 9 | 10 | 11 | 12 | 13 | 14 | 15 |
| eREG sequence number in PRB pair#10 | 4 | 5 | 6 | 7 | 8 | 9 | 10 | 11 | 12 | 13 | 14 | 15 | 0 | 1 | 2 | 3 |
| eREG sequence number in PRB pair#11 | 8 | 9 | 10 | 11 | 12 | 13 | 14 | 15 | 0 | 1 | 2 | 3 | 4 | 5 | 6 | 7 |
| eREG sequence number in PRB pair#12 | 12 | 13 | 14 | 15 | 0 | 1 | 2 | 3 | 4 | 5 | 6 | 7 | 8 | 9 | 10 | 11 |

| | eCCE index | | | | | | | | | | | | | | | |
|---|---|---|---|---|---|---|---|---|---|---|---|---|---|---|---|---|
| | 48 | 52 | 56 | 60 | 49 | 53 | 57 | 61 | 50 | 54 | 58 | 62 | 51 | 55 | 59 | 63 |
| eREG sequence number in PRB pair#13 | 0 | 1 | 2 | 3 | 4 | 5 | 6 | 7 | 8 | 9 | 10 | 11 | 12 | 13 | 14 | 15 |
| eREG sequence number in PRB pair#14 | 4 | 5 | 6 | 7 | 8 | 9 | 10 | 11 | 12 | 13 | 14 | 15 | 0 | 1 | 2 | 3 |
| eREG sequence number in PRB pair#15 | 8 | 9 | 10 | 11 | 12 | 13 | 14 | 15 | 0 | 1 | 2 | 3 | 4 | 5 | 6 | 7 |

-continued

| | | | | | | | | | | | | | | | | |
|---|---|---|---|---|---|---|---|---|---|---|---|---|---|---|---|---|
| eREG sequence number in PRB pair#16 | 12 | 13 | 14 | 15 | 0 | 1 | 2 | 3 | 4 | 5 | 6 | 7 | 8 | 9 | 10 | 11 |

Further, when the eCCE is mapped onto p (p>1) eREGs in each physical resource block pair, the cyclic shift is performed for the physical resource block pair respectively at a step length of p. The difference between the sequence numbers of the p eREGs mapped from each eCCE and located in each physical resource block pair is p*L. For example, when p=2, the cyclic shift is performed at a step length of 2 between the 4 physical resource block pairs respectively, that is, each physical resource block pair is shifted cyclically against the previous physical resource block pair at a step length of 2. Ultimately, the first eCCE corresponds to the eREGs 0, 2, 4, 6, 8, 10, 12, and 14 in the 4 physical resource block pairs (the eREGs located in the first location and the ninth location of each physical resource block pair). The eREGs mapped from each eCCE are shown below:

| | eCCE sequence number | | | | | | | | | | | | | | | |
|---|---|---|---|---|---|---|---|---|---|---|---|---|---|---|---|---|
| | 0 | 4 | 1 | 5 | 2 | 6 | 3 | 7 | 0 | 4 | 1 | 5 | 2 | 6 | 3 | 7 |
| eREG sequence number in PRB pair#1 | 0 | 1 | 2 | 3 | 4 | 5 | 6 | 7 | 8 | 9 | 10 | 11 | 12 | 13 | 14 | 15 |
| eREG sequence number in PRB pair#2 | 2 | 3 | 4 | 5 | 6 | 7 | 8 | 9 | 10 | 11 | 12 | 13 | 14 | 15 | 0 | 1 |
| eREG sequence number in PRB pair#3 | 4 | 5 | 6 | 7 | 8 | 9 | 10 | 11 | 12 | 13 | 14 | 15 | 0 | 1 | 2 | 3 |
| eREG sequence number in PRB pair#4 | 6 | 7 | 8 | 9 | 10 | 11 | 12 | 13 | 14 | 15 | 0 | 1 | 2 | 3 | 4 | 5 |

Sequence numbers of the eREGs corresponding to the REs arranged in certain order on a frequency domain and a time domain in a second physical resource block pair of the L physical resource block pairs are obtained by performing a cyclic shift for the sequence numbers of the eREGs corresponding to the REs arranged in certain order on the frequency domain and the time domain in a first physical resource block pair of the L physical resource block pairs.

A cyclic shift is performed at a step length of p for the sequence numbers of the eREGs corresponding to the REs arranged in certain order on the frequency domain or the time domain between the L physical resource block pairs, that is, the eREG-to-RE mapping on each physical resource block pair is shifted cyclically by p steps against the first physical resource block pair. The L physical resource blocks pairs are numbered. Assuming that each eREG in the first physical resource block pair is numbered K(i), the eREG corresponding to each RE of the $m^{th}$ physical resource block pair is numbered $K^m(n)=K((n+m*p) \bmod N)$, where $K^m(n)$ represents the sequence number of the eREG corresponding to the $n^{th}$ RE on the $m^{th}$ physical resource block pair, K(n) represents the sequence number of the eREG corresponding to the $n^{th}$ RE on the first physical resource block pair, and n=0, 1, . . . , N−1. N is a total number of eREGs in each physical resource block pair.

Optionally, p=1, 2, 3, . . . , 15. For example, when p=4 and L=4, the cyclic shift is as follows:

The sequence numbers of the eREGs corresponding to the REs on the first physical resource block pair are as follows:

| | | | | | | | | | | | | | |
|---|---|---|---|---|---|---|---|---|---|---|---|---|---|
| 11 | 7 | 3 | 15 | 11 | | | 3 | 15 | 11 | 7 | 3 | | |
| 10 | 6 | 2 | 14 | 10 | | | 2 | 14 | 10 | 6 | 2 | | |
| 9 | 5 | 1 | 13 | 9 | 1 | 7 | 1 | 13 | 9 | 5 | 1 | 9 | 15 |
| 8 | 4 | 0 | 12 | 8 | 0 | 6 | 0 | 12 | 8 | 4 | 0 | 8 | 14 |
| 7 | 3 | 15 | 11 | 7 | 15 | 5 | 15 | 11 | 7 | 3 | 15 | 7 | 13 |
| 6 | 2 | 14 | 10 | 6 | | | 14 | 10 | 6 | 2 | 14 | | |
| 5 | 1 | 13 | 9 | 5 | | | 13 | 9 | 5 | 1 | 13 | | |
| 4 | 0 | 12 | 8 | 4 | 14 | 4 | 12 | 8 | 4 | 0 | 12 | 6 | 12 |
| 3 | 15 | 11 | 7 | 3 | 13 | 3 | 11 | 7 | 3 | 15 | 11 | 5 | 11 |
| 2 | 14 | 10 | 6 | 2 | 12 | 2 | 10 | 6 | 2 | 14 | 10 | 4 | 10 |
| 1 | 13 | 9 | 5 | 1 | | | 9 | 5 | 1 | 13 | 9 | | |
| 0 | 12 | 8 | 4 | 0 | | | 8 | 4 | 0 | 12 | 8 | | |

DMRS

After a cyclic shift is performed at a step length of p=4, the sequence numbers of the eREGs corresponding to the REs on the $m^{th}$ physical resource block pair are as follows:

| 15 | 11 | 7 | 3 | 15 | | | 7 | 3 | 15 | 11 | 7 | | |
|---|---|---|---|---|---|---|---|---|---|---|---|---|---|
| 14 | 10 | 6 | 2 | 14 | | | 6 | 2 | 14 | 10 | 6 | | |
| 13 | 9 | 5 | 1 | 13 | 5 | 11 | 5 | 1 | 13 | 9 | 5 | 13 | 3 |
| 12 | 8 | 4 | 0 | 12 | 4 | 10 | 4 | 0 | 12 | 8 | 4 | 12 | 2 |
| 11 | 7 | 3 | 15 | 11 | 3 | 9 | 3 | 15 | 11 | 7 | 3 | 11 | 1 |
| 10 | 6 | 2 | 14 | 10 | | | 2 | 14 | 10 | 6 | 2 | | |
| 9 | 5 | 1 | 13 | 9 | | | 1 | 13 | 9 | 5 | 1 | | |
| 8 | 4 | 0 | 12 | 8 | 2 | 8 | 0 | 12 | 8 | 4 | 0 | 10 | 0 |
| 7 | 3 | 15 | 11 | 7 | 1 | 7 | 15 | 11 | 7 | 3 | 15 | 9 | 15 |
| 6 | 2 | 14 | 10 | 6 | 0 | 6 | 14 | 10 | 6 | 2 | 14 | 8 | 14 |
| 5 | 1 | 13 | 9 | 5 | | | 13 | 9 | 5 | 1 | 13 | | |
| 4 | 0 | 12 | 8 | 4 | | | 12 | 8 | 4 | 0 | 12 | | |

DMRS

By analogy, the cyclic shift at a step length of p=4 of the other two physical resource block pairs can be obtained.

1004. Send the eCCE by using the resource elements included in the eREG mapped from the eCCE.

In this embodiment, in one aspect, L physical resource block pairs that are used to transmit a control channel are determined, and resource elements except a demodulation reference signal DMRS in each physical resource block pair of the L physical resource block pairs are grouped into at least one eREG, where L is an integer greater than 1;

the eCCEs that form the control channel are obtained according to an aggregation level of the control channel, and the eCCEs are mapped onto the eREG, where REs included in the eREG mapped from the eCCEs are located in the same locations on a time domain and a frequency domain in the corresponding physical resource block pairs; and the eREG is mapped onto a corresponding resource element in the L physical resource block pairs, where a sequence number of an eREG corresponding to an RE of a second physical resource block pair of the L physical resource block pairs is obtained by performing a cyclic shift for a sequence number of an eREG corresponding to an RE of a first physical resource block pair of the L physical resource block pairs; and the eCCE is sent by using the resource elements included in the eREG mapped from the eCCE.

The obtaining a sequence number of an eREG corresponding to an RE of a second physical resource block pair of the L physical resource block pairs by performing a cyclic shift for a sequence number of an eREG corresponding to an RE of a first physical resource block pair of the L physical resource block pairs includes:

numbering the L physical resource block pairs, and performing a cyclic shift at a step length of p for the sequence number of the eREG corresponding to the RE of the $m^{th}$ physical resource block pair against the sequence number of the eREG corresponding to the RE of the first physical resource block pair, where the sequence number of the eREG corresponding to the RE in the $m^{th}$ physical resource block pair is:

$K^m=(K_0+m*p) \bmod N)$, where $K^m$ (n) represents the sequence number of the eREG corresponding to the first RE in the $m^{th}$ physical resource block pair, and $K^0$ (n) represents the sequence number of the eREG corresponding to an RE located in the same location as the first RE on the time domain and the frequency domain in the first physical resource block pair.

A mapping rule for mapping the eCCE onto the eREGs includes:

$K^m(n)=K_0((n+m*p) \bmod N)$, where $K^m$ (n) is the sequence number of the $n^{th}$ eREG corresponding to a first eCCE in the $m^{th}$ physical resource block pair, $K_0(n)$ is the sequence number of the $n^{th}$ eREG corresponding to the first eCCE in the first physical resource block pair, n=0, 1, . . . , or N−1, and p is the step length of the cyclic shift.

Figure 11:
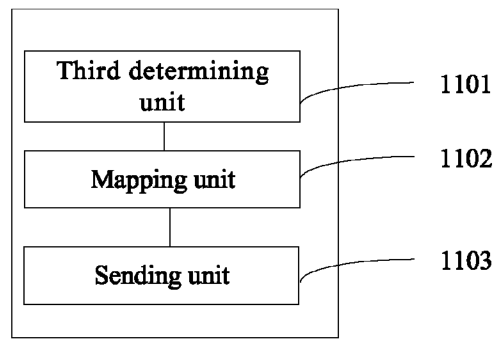
FIG. 11 is a structural block diagram of a control channel transmission apparatus according to Embodiment 3.

The embodiment of the present invention further provides a control channel transmission apparatus. As shown in FIG. 11, the apparatus includes a third determining unit 1101, a mapping unit 1102, and a sending unit 1103.

The third determining unit 1101 is configured to determine L physical resource block pairs that are used to transmit a control channel, and group resource elements except a demodulation reference signal DMRS in each physical resource block pair of the L physical resource block pairs into at least one eREG, where L is an integer greater than 1.

The mapping unit 1102 is configured to obtain, according to an aggregation level of the control channel, eCCEs that form the control channel, and map the eCCEs onto the eREG, where REs included in the eREG mapped from the eCCEs are located in the same locations on a time domain and a frequency domain in the corresponding physical resource block pairs; and map the eREG onto a corresponding resource element in the L physical resource block pairs, where a sequence number of an eREG corresponding to an RE of a second physical resource block pair of the L physical resource block pairs is obtained by performing a cyclic shift for a sequence number of an eREG corresponding to an RE of a first physical resource block pair of the L physical resource block pairs.

The sending unit 1103 is configured to send the eCCE by using the resource elements included in the eREG mapped from the eCCE.

The obtaining a sequence number of an eREG corresponding to an RE of a second physical resource block pair of the L physical resource block pairs by performing a cyclic shift for a sequence number of an eREG corresponding to an RE of a first physical resource block pair of the L physical resource block pairs includes:

numbering the L physical resource block pairs, and performing a cyclic shift at a step length of p for the sequence number of the eREG corresponding to the RE of the $m^{th}$ physical resource block pair against the sequence number of the eREG corresponding to the RE of the first physical resource block pair, where the sequence number of the eREG corresponding to the RE in the $m^{th}$ physical resource block pair is:

$K^m=(K_0+m*p) \bmod N)$, where $K^m$ (n) represents the sequence number of the eREG corresponding to the first RE in the $m^{th}$ physical resource block pair, and $K^0$ (n) represents the sequence number of the eREG corresponding to an RE located in the same location as the first RE on the time domain and the frequency domain in the first physical resource block pair.

Figure 12:
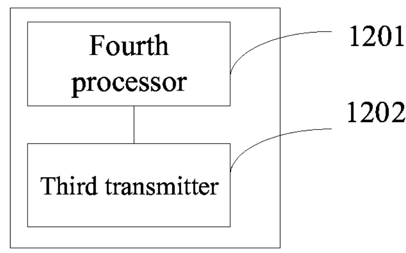
FIG. 12 is a structural block diagram of another control channel transmission apparatus according to Embodiment 3.

The embodiment of the present invention further provides a control channel transmission apparatus. As shown in FIG. 12, the apparatus includes:

a fourth processor 1201, configured to determine L physical resource block pairs that are used to transmit a control channel, and group resource elements except a demodulation reference signal DMRS in each physical resource block pair of the L physical resource block pairs into at least one eREG, where L is an integer greater than 1, where the fourth processor 1201 is further configured to obtain, according to an aggregation level of the control channel, eCCEs that form the control channel, and map the eCCEs onto the eREG, where REs included in the eREG mapped from the eCCEs are located in the same locations on a time domain and a frequency domain in the corresponding physical resource block pairs; and map the eREG onto a corresponding resource element in the L physical resource block pairs, where a sequence number of an eREG corresponding to an RE of a second physical resource block pair of the L physical resource block pairs is obtained by performing a cyclic shift for a sequence number of an eREG corresponding to an RE of a first physical resource block pair of the L physical resource block pairs; and a third transmitter 1202, configured to send the eCCE by using the resource elements included in the eREGs mapped from the eCCE.

The fourth processor is specifically configured to number the L physical resource block pairs, and perform a cyclic shift at a step length of p for the sequence number of the eREG corresponding to the RE of the $m^{th}$ physical resource block pair against the sequence number of the eREG corresponding to the RE of the first physical resource block pair, where the sequence number of the eREG corresponding to the RE in the $m^{th}$ physical resource block pair is:

$K^m=(K_0+m*p) \bmod N)$, where $K^m$ represents the sequence number of the eREG corresponding to the first RE in the $m^{th}$ physical resource block pair, and $K^0$ represents the sequence number of the eREG corresponding to an RE located in the same location as the first RE on the time domain and the frequency domain in the first physical resource block pair.

Embodiment 4

Figure 13:
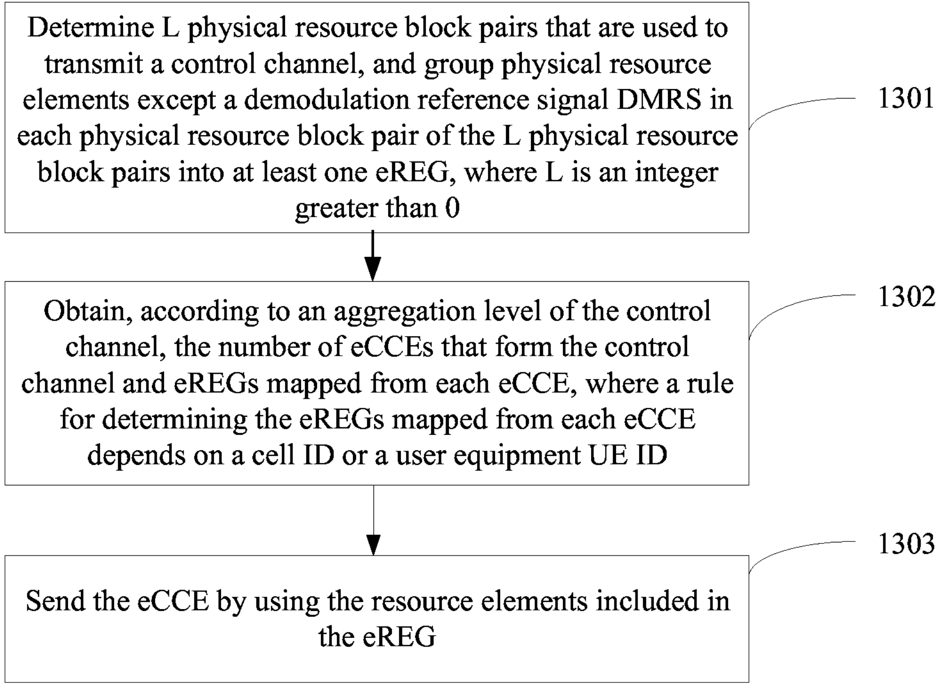
FIG. 13 is a schematic flowchart of a control channel transmission method according to Embodiment 4.

The embodiment of the present invention further provides a control channel transmission method. As shown in FIG. 13, the method includes the following steps:

1301. Determine L physical resource block pairs that are used to transmit a control channel, and group resource elements except a demodulation reference signal DMRS in each physical resource block pair of the L physical resource block pairs into N eREGs, where L is an integer greater than 0.

When data is transmitted on a control channel, the physical resource block pairs occupied by the control channel need to be determined first, that is, it is determined that the control channel can be transmitted on the L physical resource block pairs. Then the resource elements except a demodulation reference signal DMRS in each physical resource block pair of the L physical resource block pairs are grouped into N eREGs, where L is an integer greater than 0.

1302. Obtain, according to an aggregation level of the control channel, the number of eCCEs that form the control channel and eREGs mapped from each eCCE, where a rule for determining the eREGs mapped from each eCCE is related to a cell ID or a user equipment UE ID.

That a rule for determining the eREGs mapped from each eCCE is related to a cell ID or a user equipment UE ID includes:

that the rule for determining the eREGs mapped from each eCCE is cell-specific or user equipment-specific.

The cell may be a virtual cell or a physical cell or a carrier.

The determining rule is a function related to a cell ID or a user equipment ID, and the function satisfies the following formula:

$$R(i)=\left(\frac{n_s}{2}*2^9+N_{ID}\right) \bmod N+R_0(i),$$

where $n_s$ is a slot number, N is the number of eREGs in each physical resource block pair, $R^0$ (i) is a sequence number of the $i^{th}$ eREG included in a reference eCEE in a set reference physical resource block pair, R(i) is a sequence number of the $i^{th}$ eREG mapped from a corresponding eCCE in a physical resource block pair corresponding to the cell or the UE, and $N_{ID}$ is a parameter corresponding to the cell or the UE. Here, the rule for determining the eREGs included in the eCCE corresponding to each cell or user differs. In this way, an effect of randomizing interference between cells or users can be achieved. In other words, the determining rule is a cell-specific or user equipment-specific function.

Optionally, the determining rule is a cell- or user-specific function, and the function satisfies the following formula:

$$eREG_t(i)=eREG((i+X) \bmod N)$$

where, $eREG_t(i)$ is the sequence number of the $i^{th}$ eREG mapped from the eCCE corresponding to the cell or UE, eREG(i) is the sequence number of the $i^{th}$ eREG mapped from each eCCE before the cyclic shift or each eCCE of the first cell or user, and N is the number of eREGs included in each physical resource block pair. X is a parameter related to a virtual cell or a physical cell or a carrier. For example, X is a virtual cell ID and the value of X is the same as a value of X in a DMRS scrambling sequence generator of an ePDCCH or a PDSCH or is configured by using RRC signaling or dynamic signaling. N is the number of eREGs included in each physical resource block pair. Here, the rule for determining the eREGs included in the eCCE corresponding to each cell or user differs. In this way, an effect of randomizing interference between cells or users can be achieved.

In another aspect, the determining rule is:

$$eREG_t(i)=eREG((i+X) \bmod N)$$

where, $eREG_t(i)$ is the sequence number of the $i^{th}$ eREG mapped from a first eCCE corresponding to the first cell or the first UE, eREG(i) is the sequence number of the $i^{th}$ eREG mapped from a second eCCE of the first one of the cell or user equipment corresponding to a second cell or a second UE, X is a parameter related to a virtual cell or a physical cell or a carrier, i=0, 1, . . . , or N−1, and N is the number of eREGs included in each physical resource block pair.

1303. Send the eCCE by using the resource elements included in the eREG.

Figure 14:
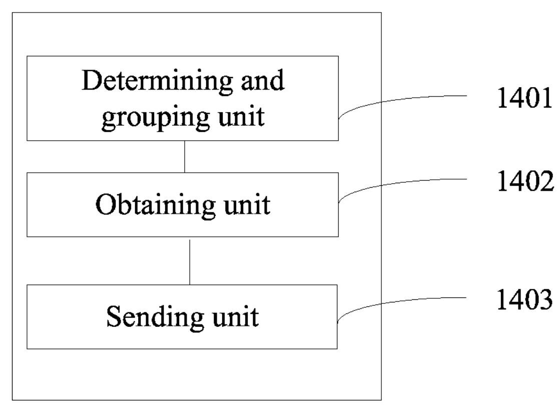
FIG. 14 is a structural block diagram of a control channel transmission apparatus according to Embodiment 4.

The embodiment of the present invention further provides a control channel transmission apparatus. As shown in FIG. 14, the apparatus includes a determining and grouping unit 1401, an obtaining unit 1402, and a sending unit 1403.

The determining and grouping unit 1401 is configured to determine L physical resource block pairs that are used to transmit a control channel, and group resource elements except a demodulation reference signal DMRS in each physical resource block pair of the L physical resource block pairs into at least one eREG, where L is an integer greater than 0.

When data is transmitted on a control channel, first, the determining and grouping unit 1401 needs to determine the physical resource block pairs occupied by the control channel, that is, determine that the control channel can be transmitted on the L physical resource block pairs. Then the resource elements except a demodulation reference signal DMRS in each physical resource block pair of the L physical resource block pairs are grouped into N eREGs, where L is an integer greater than 0.

The obtaining unit 1402 is configured to obtain, according to an aggregation level of the control channel, the number of eCCEs that form the control channel and eREGs mapped from each eCCE, where a rule for determining the eREGs mapped from each eCCE is related to a cell ID or a user equipment UE ID.

The determining rule is a function related to a cell ID or a user ID, and the function satisfies the following formula:

$$R(i)=\left(\frac{n_s}{2}*2^9+N_{ID}\right)\bmod N+R_0(i),$$

where $n_s$ is a slot number, N is the number of eREGs in each physical resource block pair, $R^0$ (i) is a sequence number of the $i^{th}$ eREG included in a reference eCEE in a set reference physical resource block pair, R(i) is a sequence number of the $i^{th}$ eREG mapped from a corresponding eCCE in a physical resource block pair corresponding to the cell or the UE, and $N_{ID}$ is a parameter corresponding to the cell or the UE. Here, the rule for determining the eREGs included in the eCCE corresponding to each cell or user differs. In this way, an effect of randomizing interference between cells or users can be achieved.

Optionally, the determining rule is a cell- or user-specific function, and the function may also satisfy the following formula:

$$eREG_t(i)=eREG((i+X)\bmod N)$$

where, $eREG_t$(i) is the sequence number of the $i^{th}$ eREG mapped from the eCCE corresponding to the cell or UE, eREG(i) is the sequence number of the $i^{th}$ eREG mapped from each eCCE before the cyclic shift or each eCCE of the first cell or user, and N is the number of eREGs included in each physical resource block pair. X is a parameter related to a virtual cell or a physical cell or a carrier. For example, X is a virtual cell ID and the value of X is the same as a value of X in a DMRS scrambling sequence generator of an ePDCCH or a PDSCH or is configured by using RRC signaling or dynamic signaling. N is the number of eREGs included in each physical resource block pair. Here, the rule for determining the eREGs included in the eCCE corresponding to each cell or user differs. In this way, an effect of randomizing interference between cells or users can be achieved.

In one aspect, the determining rule is:

$$eREG_t(i)=eREG((i+X)\bmod N)$$

where, $eREG_t$(i) is the sequence number of the $i^{th}$ eREG mapped from a first eCCE corresponding to the first cell or the first UE, eREG(i) is the sequence number of the $i^{th}$ eREG mapped from a second eCCE of the first one of the cell or user equipment corresponding to a second cell or a second UE, X is a parameter related to a virtual cell or a physical cell or a carrier, for example, X is a virtual cell ID and the value of X is the same as a value of X in a DMRS scrambling sequence generator of an ePDCCH or a PDSCH, i=0, 1, . . . , or N−1, and N is the number of eREGs included in each physical resource block pair.

The sending unit 1403 is further configured to send the eCCE by using the resource elements included in the eREG.

Figure 15:
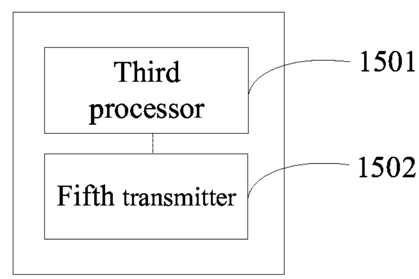
FIG. 15 is a structural block diagram of another control channel transmission apparatus according to Embodiment 4.

The embodiment of the present invention further provides a control channel transmission apparatus. As shown in FIG. 15, the apparatus includes:

a third processor 1501, configured to determine L physical resource block pairs that are used to transmit a control channel, and group resource elements except a demodulation reference signal DMRS in each physical resource block pair of the L physical resource block pairs into at least one eREG, where L is an integer greater than 0, where the third processor 1501 is further configured to obtain, according to an aggregation level of the control channel, the number of eCCEs that form the control channel and eREGs mapped from each eCCE, where a rule for determining the eREGs mapped from each eCCE is related to a cell ID or a user equipment UE ID; and a fifth transmitter 1502, configured to send the eCCE by using the resource elements included in the eREG.

The cell may be an actual physical cell, or a virtual cell or carrier configured in a system.

The determining rule is a cell-specific or user equipment-specific function, and the function satisfies the following formula:

$$R(i)=\left(\frac{n_s}{2}*2^9+N_{ID}\right)\bmod N+R_0(i),$$

where $n_s$ is a slot number, N is the number of eREGs in each physical resource block pair, $R^0$(i) is a sequence number of the $i^{th}$ eREG included in a reference eCEE in a set reference physical resource block pair, R(i) is a sequence number of the $i^{th}$ eREG mapped from a corresponding eCCE in a physical resource block pair corresponding to the cell or the UE, and $N_{ID}$ is a parameter corresponding to the cell or the UE.

The determining rule is:

$$eREG_t(i)=eREG((i+X)\bmod N)$$

where, $eREG_t$(i) is the sequence number of the $i^{th}$ eREG mapped from a first eCCE corresponding to the first cell or the first UE, eREG(i) is the sequence number of the $i^{th}$ eREG mapped from a second eCCE of the first one of the cell or user equipment corresponding to a second cell or a second UE, X is a parameter related to a virtual cell or a physical cell or a carrier, i=0, 1, . . . , or N−1, for example, X is a virtual cell ID and the value of X is the same as a value of X in a DMRS scrambling sequence generator of an ePDCCH or a PDSCH. N is the number of eREGs included in each physical resource block pair.

In the control channel transmission method and apparatus according to the embodiment of the present invention, a different rule according to a cell or user is used to form an eCCE, thereby accomplishing an effect of randomizing interference between cells or users.

Embodiment 5

Figure 16:
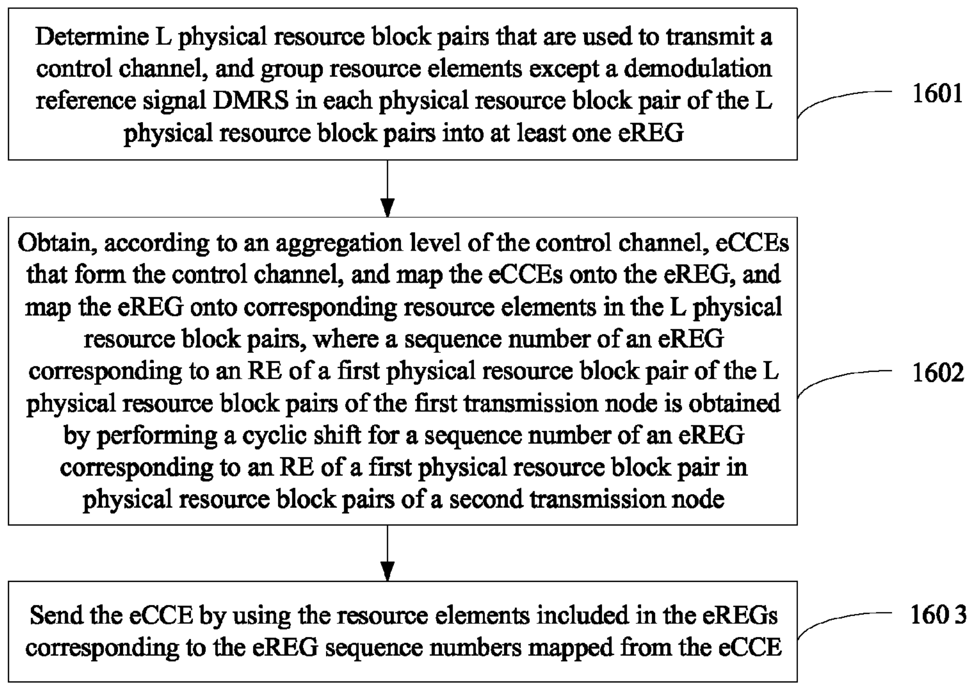
FIG. 16 is a schematic flowchart of a control channel transmission method according to Embodiment 5.

The embodiment of the present invention provides a control channel transmission method. As shown in FIG. 16, the method includes the following steps:

1601. Determine L physical resource block pairs that are used to transmit a control channel, and group resource elements except a demodulation reference signal DMRS in each physical resource block pair of the L physical resource block pairs into at least one eREG, where L is an integer greater than 0.

When data is transmitted on a control channel, the physical resource block pairs occupied by the control channel need to be determined first, that is, it is determined that the control channel can be transmitted on the L physical resource block pairs. Then the resource elements except a demodulation reference signal DMRS in each physical resource block pair of the L physical resource block pairs are grouped into N eREGs, where L is an integer greater than 0.

1602. Obtain, according to an aggregation level of the control channel, eCCEs that form the control channel, map the eCCEs onto the eREG, and map the eREG onto corresponding resource elements in the L physical resource block pairs, where a sequence number of an eREG corresponding to an RE of a first physical resource block pair of the L physical resource block pairs of the first transmission node is obtained by performing a cyclic shift for a sequence number of an eREG corresponding to an RE of a first physical resource block pair in physical resource block pairs of a second transmission node.

The number of eCCEs that form the control channel and eREG sequence numbers mapped from each eCCE can be obtained according to an aggregation level of the control channel.

The obtaining a sequence number of an eREG corresponding to an RE of a first physical resource block pair of the L physical resource block pairs of the first transmission node by performing a cyclic shift for a sequence number of an eREG corresponding to an RE of a first physical resource block pair in physical resource block pairs of a second transmission node includes:

determining the sequence number of the eREG corresponding to the RE of the first physical resource block pair of the physical resource block pairs of the first transmission node by using the following formula:

$$K^t=(K+X)\bmod N$$

where, $K^t$ is the sequence number of the eREG corresponding to the RE in the first physical resource block pair of the first transmission node, K is the sequence number of the eREG corresponding to the RE in the first physical resource block pair of the second transmission node, X is a parameter related to a virtual cell or a physical cell or a carrier, and N is the number of eREGs included in each physical resource block pair. For example, X is a virtual cell ID and the value of X is the same as a value of X in a DMRS scrambling sequence generator of an ePDCCH or a PDSCH or is configured by using RRC signaling or dynamic signaling. In this way, the sequence number of the $i^{th}$ eREG of the $t^{th}$ node is the sequence number of the $((i+X)\bmod N)^{th}$ eREG of the first transmission node, and the eREGs corresponding to the eCCE are numbered identically on different transmission nodes but are located differently on the PRB pair, which makes the actual sizes of the eCCEs formed by the eREGs balanced.

1603. Send the eCCE by using the resource elements included in the eREGs corresponding to the sequence numbers of the eREGs mapped from the eCCE.

According to one aspect of the embodiment of the present invention, a control channel transmission method is provided and includes:

determining L physical resource block pairs that are used to transmit a control channel, and grouping resource elements except a demodulation reference signal DMRS in each physical resource block pair of the L physical resource block pairs into at least one eREG, where L is an integer greater than 1;

obtaining, according to an aggregation level of the control channel, eCCEs that form the control channel, and mapping the eCCEs onto the eREG, where REs included in the eREG mapped from the eCCEs are located in the same locations on a time domain and a frequency domain in the corresponding physical resource block pairs; and mapping the eREG onto a corresponding resource element in the L physical resource block pairs, where a sequence number of an eREG corresponding to an RE of a second physical resource block pair of the L physical resource block pairs is obtained by performing a cyclic shift for a sequence number of an eREG corresponding to an RE of a first physical resource block pair of the L physical resource block pairs; and sending the eCCE by using the resource elements included in the eREG mapped from the eCCE.

The obtaining a sequence number of an eREG corresponding to an RE of a second physical resource block pair of the L physical resource block pairs by performing a cyclic shift for a sequence number of an eREG corresponding to an RE of a first physical resource block pair of the L physical resource block pairs includes:

numbering the L physical resource block pairs, and performing a cyclic shift at a step length of p for the sequence number of the eREG corresponding to the RE of the $m^{th}$ physical resource block pair against the sequence number of the eREG corresponding to the RE of the first physical resource block pair, where the sequence number of the eREG corresponding to the RE in the $m^{th}$ physical resource block pair is:

$K^m=(K_0+m*p)\bmod N)$, where $K^m$ represents the sequence number of the eREG corresponding to the first RE in the $m^{th}$ physical resource block pair, and $K^0$ represents the sequence number of the eREG corresponding to an RE located in the same location as the first RE on the time domain and the frequency domain in the first physical resource block pair.

A mapping rule for mapping the eCCE onto the eREGs includes:

$K^m(n)=K_0((n+m*p)\bmod N)$, where $K^m(n)$ is the sequence number of the $n^{th}$ eREG corresponding to a first eCCE in the $m^{th}$ physical resource block pair, $K_0(n)$ is the sequence number of the $n^{th}$ eREG corresponding to the first eCCE in the first physical resource block pair, n=0, 1, . . . , or N−1, and p is the step length of the cyclic shift.

In this case, because the sequence numbers of the eREGs included in the eCCE are definite, but the eREGs have different sequence numbers on different transmission nodes, the eCCEs that form the control channel at different times are mapped to different eREGs, and an effect of randomizing eCCE interference is achieved to some extent.

Figure 17:
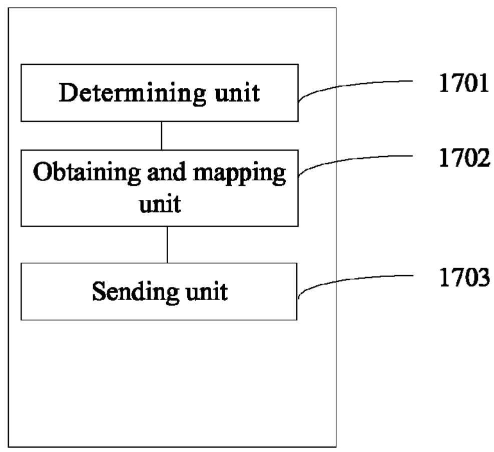
FIG. 17 is a structural block diagram of a control channel transmission apparatus according to Embodiment 5.

The embodiment of the present invention provides a control channel transmission apparatus. As shown in FIG. 17, the apparatus includes a determining unit 1701, an obtaining unit 1702, a cyclic shift unit 1703, and a sending unit 1704.

According to one aspect of the present invention, a control channel transmission apparatus is provided and includes:

a determining unit 1701, configured to determine L physical resource block pairs that are used to transmit a control channel, and group resource elements except a demodulation reference signal DMRS in each physical resource block pair of the L physical resource block pairs into at least one eREG, where L is an integer greater than 0;

an obtaining and mapping unit 1702, configured to obtain, according to an aggregation level of the control channel, eCCEs that form the control channel, map the eCCEs onto the eREG, and map the eREG onto corresponding resource elements in the L physical resource block pairs, where a sequence number of an eREG corresponding to an RE of a first physical resource block pair of the L physical resource block pairs of the first transmission node is obtained by performing a cyclic shift for a sequence number of an eREG corresponding to an RE of a first physical resource block pair in physical resource block pairs of a second transmission node; and a sending unit 1703, configured to send the eCCE by using the resource elements included in the eREG mapped from the eCCE.

The obtaining a sequence number of an eREG corresponding to an RE of a first physical resource block pair of the L physical resource block pairs of the first transmission node by performing a cyclic shift for a sequence number of an eREG corresponding to an RE of a first physical resource block pair in physical resource block pairs of a second transmission node includes:

determining the sequence number of the eREG corresponding to the RE of the first physical resource block pair of the physical resource block pairs of the first transmission node by using the following formula:

$$K^t=(K+X)\bmod N$$

where, $K^t$ is the sequence number of the eREG corresponding to the RE in the first physical resource block pair of the first transmission node, K is the sequence number of the eREG corresponding to the RE in the first physical resource block pair of the second transmission node, X is a parameter related to a virtual cell or a physical cell or a carrier, for example, X is a virtual cell ID and a value of X is the same as a value of X in a DMRS scrambling sequence generator of an ePDCCH or a PDSCH, and N is the number of eREGs included in each physical resource block pair.

A rule for mapping the eCCE onto the eREGs is determined by the following rule:

determining, by using the following formula, a sequence number of the $i^{th}$ eREG mapped from the eCCE of the control channel transmitted by the first transmission node:

$$K^t(i)=K(i+X)\bmod N$$

where, $K^t$ is a sequence number of the $i^{th}$ eREG mapped from the eCCE of the control channel transmitted by the first transmission node, K is a sequence number of the $i^{th}$ eREG mapped from the eCCE of the control channel transmitted by the second transmission node, X is a parameter related to a virtual cell or a physical cell or a carrier, for example, X is a virtual cell ID and a value of X is the same as a value of X in a DMRS scrambling sequence generator of an ePDCCH or a PDSCH, N is the number of eREGs in each physical resource block pair, and i=0, 1, . . . , or N−1.

Figure 18:
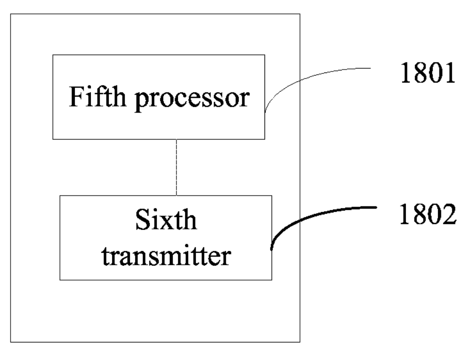
FIG. 18 is a structural block diagram of another control channel transmission apparatus according to Embodiment 5.

The embodiment of the present invention provides a control channel transmission apparatus. As shown in FIG. 18, the apparatus includes a fifth processor 1801 and a sixth transmitte 1802.

The fifth processor 1801 is configured to determine L physical resource block pairs that are used to transmit a control channel, and group resource elements except a demodulation reference signal DMRS in each physical resource block pair of the L physical resource block pairs into at least one eREG, where L is an integer greater than 0.

The fifth processor 1801 is further configured to obtain, according to an aggregation level of the control channel, eCCEs that form the control channel, map the eCCEs onto the eREG, and map the eREG onto corresponding resource elements in the L physical resource block pairs, where a sequence number of an eREG corresponding to an RE of a first physical resource block pair of the L physical resource block pairs of the first transmission node is obtained by performing a cyclic shift for a sequence number of an eREG corresponding to an RE of a first physical resource block pair in physical resource block pairs of a second transmission node.

The sixth transmitter 1802 is configured to send the eCCE by using the resource elements included in the eREGs corresponding to the sequence numbers of the eREGs mapped from the eCCE.

The obtaining a sequence number of an eREG corresponding to an RE of a first physical resource block pair of the L physical resource block pairs of the first transmission node by performing a cyclic shift for a sequence number of an eREG corresponding to an RE of a first physical resource block pair in physical resource block pairs of a second transmission node includes:

determining the sequence number of the eREG corresponding to the RE of the first physical resource block pair of the physical resource block pairs of the first transmission node by using the following formula:

$$K^t=(K+X)\bmod N$$

where, $K^t$ is the sequence number of the eREG corresponding to the RE in the first physical resource block pair of the first transmission node, K is the sequence number of the eREG corresponding to the RE in the first physical resource block pair of the second transmission node, X is a parameter related to a virtual cell or a physical cell or a carrier, for example, X is a virtual cell ID and a value of X is the same as a value of X in a DMRS scrambling sequence generator of an ePDCCH or a PDSCH, and N is the number of eREGs included in each physical resource block pair.

A rule for mapping the eCCE onto the eREGs is determined by the following rule:

determining, by using the following formula, a sequence number of the $i^{th}$ eREG mapped from the eCCE of the control channel transmitted by the first transmission node:

$$K^t(i)=K(i+X)\bmod N$$

where, $K^t$ is a sequence number of the $i^{th}$ eREG mapped from the eCCE of the control channel transmitted by the first transmission node, K is a sequence number of the $i^{th}$ eREG mapped from the eCCE of the control channel transmitted by the second transmission node, X is a parameter related to a virtual cell or a physical cell or a carrier, for example, X is a virtual cell ID and a value of X is the same as a value of X in a DMRS scrambling sequence generator of an ePDCCH or a PDSCH, N is the number of eREGs in each physical resource block pair, and i=0, 1, . . . , or N−1.

In the embodiment of the present invention, the mapping from the eREGs numbered identically to the REs undergoes a cyclic shift between different transmission nodes. Therefore, the eREGs corresponding to the eCCE are numbered identically on different transmission nodes but are located differently on the PRB, which makes the actual sizes of the eCCEs formed by the eREGs balanced.

A person of ordinary skill in the art may understand that all or a part of the steps of the foregoing method embodiments may be implemented by a program instructing relevant hardware. The foregoing program may be stored in a computer readable storage medium. When the program runs, the steps of the foregoing method embodiments are performed. The foregoing storage medium includes various mediums capable of storing program code, such as a ROM, a RAM, a magnetic disk, or an optical disc.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the appended claims.

What is claimed is:

1. A control channel transmission method, comprising:

determining L physical resource block pairs that are used to transmit a control channel, wherein L is an integer greater than 0 and the control channel is formed by at least one enhanced Control Channel Element (eCCE);

grouping resource elements except a demodulation reference signal (DMRS) in each physical resource block pair of the L physical resource block pairs into N enhanced Resource Element Group (eREGs);

calculating a number of valid resource elements except other overheads in each eREG of the N eREGs in each of the physical resource block pairs, wherein N is an integer greater than 0, and the other overheads comprise at least one of the following: a common reference signal (CRS), a physical downlink control channel (PDCCH), a physical broadcast channel (PBCH), a positioning reference signal (PRS), a primary synchronization signal (PSS), and a secondary synchronization signal (SSS);

mapping each eCCE of the at least one eCCE onto M eREGs according to the number of valid resource elements comprised in each eREG of the N eREGs, wherein M is an integer greater than 0; and sending the at least one eCCE by using the resource elements comprised in the eREG.

2. The method according to claim 1, wherein mapping from each of the eCCEs to the M eREGs makes a difference not greater than 5, wherein the difference is a difference between the numbers of valid resource elements occupied by two of the eCCEs.

3. The method according to claim 1, wherein mapping each eCCE of the at least one eCCE onto M eREGs according to the number of valid resource elements comprised in each eREG of the N eREGs comprises:

grouping N eREGs in each of the physical resource block pairs into a first eREG group and a second eREG group according to the number of valid resource elements comprised in the eREG, and mapping each eCCE of the at least one eCCE onto M eREGs of the first eREG group and the second eREG group, wherein, in the M eREGs mapped from each eCCE, the first M/2 eREGs of the M eREGs are in the first eREG group, the number of valid resource elements comprised in each eREG of the first M/2 eREGs is a different value, the last M/2 eREGs of the M eREGs are in the second eREG group, and the number of valid resource elements comprised in each eREG of the last M/2 eREGs is a different value.

4. The method according to claim 1, wherein the mapping each eCCE of the at least one eCCE onto M eREGs according to the number of valid resource elements comprised in each eREG of the N eREGs comprises:

numbering the N eREGs in each of the physical resource block pairs as 0, 1, 2, . . . , N−1, and using $S^i$ to denote a set of eREGs in the N eREGs, wherein the number of valid resource elements comprised in each eREG in the set is $D^i$ (i=1, 2, . . . , t), $D^1<D^2< \ldots <D^t$, and t is an integer greater than 0;

selecting one eREG respectively from each of the sets $S^1$, $S^t$, $S^2$, $S^{t-1}$ . . . sequentially until M eREGs are selected in total, and mapping one eCCE in the at least one eCCE onto M eREGs;

removing the selected eREGs from corresponding sets, reselecting M eREGs; and mapping another eCCE in the at least one eCCE onto the reselected M eREGs until all the N eREGs of the physical resource block pair are mapped onto.

5. The method according to claim 1, wherein the eREGs corresponding to the resource elements of the physical resource block pairs have sequence numbers; and wherein mapping each eCCE of the at least one eCCE onto M eREGs comprises calculating the sequence numbers, in the corresponding physical resource block pairs, of the M eREGs mapped from each eCCE; and mapping each eCCE of the at least one eCCE onto M eREGs corresponding to M eREG sequence numbers corresponding to the sequence numbers according to the sequence numbers.

6. The method according to claim 5, wherein L=1, and the method further comprises calculating the sequence numbers of the at least one eCCE corresponding to the eREGs in each physical resource block pair according to the following formula: the sequence number of the eCCE corresponding to the $j^{th}$ eREG of each physical resource block pair is Loc_eCCE_i=j mod K, wherein K is the number of eCCEs borne in each physical resource block pair, and j=0, 1, . . . , or K−1.

7. A control channel transmission method, comprising:

determining L physical resource block pairs that are used to transmit a control channel, wherein L is an integer greater than 0;

grouping resource elements except a demodulation reference signal (DMRS) in each physical resource block pair of the L physical resource block pairs into at least one enhanced Resource Element Group (eREG);

obtaining, according to an aggregation level of the control channel, a number of enhanced Control Channel Element (eCCEs) that form the control channel and sequence numbers of eREGs mapped from each eCCE;

when L is greater than 1, numbering the eREGs differently in different physical resource block pairs of the L physical resource block pairs;

when L is equal to 1, numbering the eREGs of the physical resource block pair differently according to different transmitting time points of the control channel; and sending the eCCEs by using the resource elements comprised in the eREGs corresponding to the sequence numbers of the eREGs mapped from the eCCEs.

8. The method according to claim 7, wherein the numbering the eREGs differently in different physical resource block pairs of the L physical resource block pairs comprises:

numbering the eREGs in a first physical resource block pair of the L physical resource block pairs; and performing a cyclic shift for the sequence numbers of the eREGs in the first physical resource block pair to obtain sequence numbers of the eREGs in a second physical resource block pair of the L physical resource block pairs.

9. The method according to claim 7, wherein the numbering the eREGs differently in different physical resource block pairs of the L physical resource block pairs comprises:

numbering the eREGs in a first physical resource block pair of the L physical resource block pairs; and performing L−1 cyclic shifts for the sequence numbers of the eREGs in the first physical resource block pair to obtain sequence numbers of the eREGs in other L−1 physical resource block pairs except the first physical resource block pair of the L physical resource block pairs respectively.

10. A control channel transmission apparatus, comprising:

a processor; and a computer-readable storage medium storing a program to be executed by the processor, the program including instructions for:

determining L physical resource block pairs that are used to transmit a control channel, wherein L is an integer greater than 0, and the control channel is formed by at least one enhanced Control Channel Element (eCCE);

grouping resource elements except a demodulation reference signal (DMRS) in each physical resource block pair of the L physical resource block pairs determined by the processor into N enhanced Resource Element Group (eREGs);

calculating a number of valid resource elements except other overheads in each eREG of the N eREGs in each of the physical resource block pairs, wherein N is an integer greater than 0, and the other overheads comprise at least one of the following: a common reference signal (CRS), a physical downlink control channel (PDCCH), a physical broadcast channel (PBCH), a positioning reference signal (PRS), a primary synchronization signal (PSS), and a secondary synchronization signal (SSS);

mapping each eCCE of the at least one eCCE onto M eREGs according to the number of valid resource elements comprised in each eREG of the N eREGs of each physical resource block pair, wherein the number of valid resource elements is calculated by the processor, and M is an integer greater than 0; and a transmitter, configured to send the at least one eCCE by using the resource elements comprised in the eREG mapped by the processor.

11. The control channel transmission apparatus according to claim 10, wherein the mapping from each of the eCCEs to the M eREGs makes a difference not greater than 5, wherein the difference is a difference between the numbers of valid resource elements occupied by two of the eCCEs.

12. The control channel transmission apparatus according to claim 10, wherein the processor is programmed to group N eREGs in each of the physical resource block pairs into a first eREG group and a second eREG group according to the number of valid resource elements comprised in the eREG, and map each eCCE onto M eREGs of the first eREG group and the second eREG group, wherein, in the M eREGs mapped from each eCCE, the first M/2 eREGs of the M eREGs are in the first eREG group, the number of valid resource elements comprised in each of the first M/2 eREGs is a same value or a different value, the last M/2 eREGs of the M eREGs are in the second eREG group, and the number of valid resource elements comprised in each of the last M/2 eREGs is a same value or a different value.

13. The apparatus according to claim 10, wherein the eREGs corresponding to the resource elements of the physical resource block pairs have sequence numbers;

wherein the processor is programmed to calculate the sequence numbers, in the corresponding physical resource block pairs, of the M eREGs mapped from each eCCE; and the processor is programmed to map each eCCE of the at least one eCCE onto M eREGs corresponding to M eREG sequence numbers corresponding to the sequence numbers according to the sequence numbers.

14. The apparatus according to claim 13, wherein the processor is programmed to calculate the sequence number of the at least one eCCE corresponding to the $j^{th}$ eREG of each physical resource block pair by using Loc_eCCE_i=j mod K, wherein K is the number of eCCEs borne in each physical resource block pair, and j=0, 1, . . . , or K−1.

15. A control channel transmission apparatus, comprising:

a processor; and a computer-readable storage medium storing a program to be executed by the processor, the program including instructions for:

determining L physical resource block pairs that are used to transmit a control channel, and group resource elements except a demodulation reference signal (DMRS) in each physical resource block pair of the L physical resource block pairs into at least one enhanced Resource Element Group (eREG), wherein L is an integer greater than 0;

obtaining, according to an aggregation level of the control channel, a number of enhanced Control Channel Element (eCCEs) that form the control channel and sequence numbers of eREGs mapped from each eCCE, wherein when L is greater than 1, number the eREGs differently in different physical resource block pairs of the L physical resource block pairs; and when L is equal to 1, number the eREGs of the physical resource block pair differently according to different transmitting time points of the control channel; and a transmitter, configured to send the eCCEs by using the resource elements comprised in the eREGs corresponding to the sequence numbers of the eREGs mapped from the eCCE.

16. The apparatus according to claim 15, wherein the processor is programmed to:

number the eREGs in a first physical resource block pair of the L physical resource block pairs; and perform a cyclic shift for the sequence numbers of the eREGs in the first physical resource block pair to obtain sequence numbers of the eREGs in a second physical resource block pair of the L physical resource block pairs.

17. The apparatus according to claim 15, wherein the processor is programmed to:

number the eREGs in a first physical resource block pair of the L physical resource block pairs; and perform L−1 cyclic shifts for the sequence numbers of the eREGs in the first physical resource block pair to obtain sequence numbers of the eREGs in other L−1 physical resource block pairs except the first physical resource block pair of the L physical resource block pairs respectively.

* * * * *